(12) United States Patent
Davis

(10) Patent No.: US 12,079,879 B2
(45) Date of Patent: Sep. 3, 2024

(54) COMPUTER SYSTEMS AND SOFTWARE FOR SELF-EXECUTING CODE AND DISTRIBUTED DATABASE

(71) Applicant: Joshua Paul Davis, Plano, TX (US)

(72) Inventor: Joshua Paul Davis, Plano, TX (US)

( * ) Notice: Subject to any disclaimer, the term of this patent is extended or adjusted under 35 U.S.C. 154(b) by 0 days.

(21) Appl. No.: 18/160,822

(22) Filed: Jan. 27, 2023

(65) Prior Publication Data

US 2023/0177619 A1 Jun. 8, 2023

Related U.S. Application Data

(63) Continuation of application No. 16/997,882, filed on Aug. 19, 2020, now Pat. No. 11,568,495.

(60) Provisional application No. 62/889,503, filed on Aug. 20, 2019.

(51) Int. Cl.
| | |
|---|---|
| *G06Q 20/10* | (2012.01) |
| *G06Q 10/10* | (2023.01) |
| *G06Q 20/36* | (2012.01) |
| *G06Q 40/08* | (2012.01) |

(52) U.S. Cl.
CPC ............. *G06Q 40/08* (2013.01); *G06Q 10/10* (2013.01); *G06Q 20/102* (2013.01); *G06Q 20/36* (2013.01)

(58) Field of Classification Search
None
See application file for complete search history.

(56) References Cited

U.S. PATENT DOCUMENTS

| | | |
|---|---|---|
| 5,988,857 A | 11/1999 | Ozawa et al. |
| 6,842,899 B2 | 1/2005 | Moody et al. |
| 7,310,626 B2 | 12/2007 | Scarborough et al. |

(Continued)

FOREIGN PATENT DOCUMENTS

WO 0188811 A2 11/2001

OTHER PUBLICATIONS

Davis, Joshua, "The Case for Stablecoins-3," available at https://medium.com/@joshuadavis31.com/the-case-for-stablecoins-3-386782a4ae8a, Feb. 5, 2019, retrieved Nov. 9, 2021, 27 pages.

(Continued)

*Primary Examiner* — Joseph W. King
(74) *Attorney, Agent, or Firm* — Slater Matsil, LLP

(57) ABSTRACT

A computer-implemented method includes creating a premiums escrow, with a zero balance, for a group of policyholders and managed using a distributed ledger and self-executing agreement. At a term beginning, the self-executing agreement receives premium payments sing cryptocurrency from each policyholder and allocates the premium payments to the premiums escrow. During the term the self-executing agreement receives a notification of an incident claim associated with a claimant policyholders. At a term end, the self-executing agreement receives payment instructions from the policyholders; pays, using cryptocurrency from the premiums escrow, the claimant an incident claim payment larger than the premium payment and determined according to the payment instructions; and distributes to the policyholders a rebate payment equal to or lower than the premium payment from the premiums escrow, which returns to a zero balance. The self-executing agreement stores a record of the incident claim in a tamper-proof, publicly-available, non-repudiable distributed ledger.

33 Claims, 12 Drawing Sheets

(56) References Cited

U.S. PATENT DOCUMENTS

| | | | |
|---|---|---|---|
| 8,140,681 | B2 | 3/2012 | Adam et al. |
| 9,608,829 | B2 | 3/2017 | Spanos et al. |
| 10,505,726 | B1 | 12/2019 | Andon et al. |
| 10,635,471 | B2 | 4/2020 | Davis et al. |
| 11,416,944 | B1 | 8/2022 | Floyd |
| 2002/0032591 | A1 | 3/2002 | Mahaffy et al. |
| 2005/0027386 | A1 | 2/2005 | Weigand et al. |
| 2005/0273511 | A1 | 12/2005 | Ferreira et al. |
| 2007/0192146 | A1 | 8/2007 | Menocal et al. |
| 2010/0293026 | A1 | 11/2010 | Vojinovic et al. |
| 2013/0326067 | A1 | 12/2013 | Smith, II et al. |
| 2014/0236864 | A1 | 8/2014 | Roth et al. |
| 2015/0332283 | A1 | 11/2015 | Witchey |
| 2016/0140653 | A1 | 5/2016 | McKenzie |
| 2016/0226881 | A1 | 8/2016 | Huang et al. |
| 2016/0260095 | A1 | 9/2016 | Ford |
| 2016/0292672 | A1 | 10/2016 | Fay et al. |
| 2016/0335533 | A1 | 11/2016 | Davis et al. |
| 2017/0011460 | A1 | 1/2017 | Molinari et al. |
| 2019/0392434 | A1 | 12/2019 | Castinado et al. |
| 2020/0005254 | A1 | 1/2020 | Wright et al. |
| 2020/0084194 | A1* | 3/2020 | McMurdie ............ H04L 9/0833 |
| 2020/0177478 | A1 | 6/2020 | Dakshinyam et al. |
| 2020/0225974 | A1 | 7/2020 | Davis et al. |
| 2020/0389363 | A1 | 12/2020 | McConnell et al. |
| 2021/0182838 | A1 | 6/2021 | Khare et al. |
| 2021/0303350 | A1 | 9/2021 | Hill et al. |

OTHER PUBLICATIONS

Davis, Joshua, "The Law and Smart Contracts," available at https://medium.com/predict/the-law-and-smart-contracts-9611e9d7e783, Oct. 16, 2019, 12 pages.

Davis, Joshua, "The Myth of the Trustless Dapp: What do we mean when we say an app is "trustless"" available at https://medium.com/@joshuadavis31.com/the-myth-of-the-trustless-dapp-e8ff5a4ecbd3, Aug. 6, 2019, 18 pages.

Davis, Joshua, "The Politics of Sexual Harassment Data," available at https://medium.com/illumination/the-politics-of-sexual-harassment-data-8265203e6fd9, Dec. 12, 2019, 26 pages.

Davis, Joshua, "Treatment of Bitcoin under U.S. Property Law," available at https://blog.goodaudience.com/treatment-of-bitcoin-under-u-s-property-law-f31d871e3ece, Apr. 5, 2018, 14 pages.

Davis, Joshua, "True Peer-to-peer Insurance Requires the Blockchain to Work," available at https://medium.com/@joshuadavis31.com/true-p2p-insurance-requires-the-blockchain-to-work-661024d50920, Aug. 16, 2019, 13 pages.

Davis, Joshua, "Unity—A New Model for Generalized Peer to Peer Insurance," available at https://medium.com/@joshuadavis31/unity-a-new-model-for-generalized-peer-to-peer-insurance-b4df867e09d6, May 2, 2018, 7 pages.

Davis, Joshua, "What problems does blockchain technology actually solve in insurance?," available at https://blog.goodaudience.com/what-problems-does-blockchain-technology-actually-solve-in-insurance-8416652d5642, Apr. 6, 2018, 14 pages.

Davis, Joshua, "Why am I working on police brutality insurance?" available at https://medium.com/@joshuadavis31.com/why-am-i-working-on-police-brutality-insurance-70a3d08d8de5, Jul. 2, 2019, 11 pages.

Davis, Joshua, "Why am I working on police brutality insurance?" available at https://medium.com/@joshuadavis31.com/why-am-i-working-on-police-brutality-insurance-70a3d08d8de5, Jul. 2, 2019, retrieved Nov. 9, 2021, 17 pages.

Davis, Joshua, "Why TandaPay is Going to Work," available at https://medium.com/@joshuadavis31.com/why-tandapay-is-going-to-work-784c12298428, Aug. 21, 2018, 11 pages.

Davis, Joshua, "TandaPay Cannot Be Regulated-1," available at https://medium.com/@joshuadavis31.com/tandapay-cannot-be-regulated-1-8f5a0935f8e4, Aug. 30, 2018, retrieved Nov. 9, 2021, 8 pages.

Davis, Joshua, "One Problem Preventing Widespread Use of Cryptocurrency," available at https://blog.goodaudience.com/one-problem-preventing-widespread-use-of-cryptocurrency-6cd0662ccf5e, Oct. 14, 2018, 11 pages.

Ethereum.org/en/wallets/, "Ethereum Wallets," https://web.archive.org/web/20200803115345/https://ethereum.org/en/wallets/, updated Aug. 3, 2020, 4 pages.

Fortney, Luke, "Blockchain Explained," retrieved from https://web.archive.org/web/20190809184828/https://www.investopedia.com/terms/b/blockchain.asp, updated Jun. 25, 2019, 29 pages.

Gattaschi, Valentina, et al., "Blockchain and Smart Contracts for Insurance: Is the Technology Mature Enough?," Future Internet, MDPI, www.mdpi.com/journal/futureinternet, Feb. 20, 2018, 16 pages.

Gerring, Taylor, "Ethereum, Dapps, and the rise of a new Internet," bitcoinmagazine.com/articles/ethereum-dapps-rise-new-internet-1391459994/, Feb. 3, 2014, 6 pages.

Huckstep, Rick, "Introducing the Third Wave of Peer-to-Peer Insurance," The Digital Insurer, https://www.the-digital-insurer.com/blog/insurtech-teambrella-and-the-third-wave-of-peer-to-peer-insurance/, retrieved from https://web.archive.org/web/20181114144451/https://www.the-digital-insurer.com/blog/insurtech-teambrella-and-the-third-wave-of-peer-to-peer-insurance/, Issue No. 43, Nov. 14, 2018, 12 pages.

Huckstep, Rick, "Introducing the Third Wave of Peer-to-Peer Insurance," The Digital Insurer, https://www.the-digital-insurer.com/blog/insurtech-teambrella-and-the-third-wave-of-peer-to-peer-insurance/, Nov. 4, 2020, 11 pages.

Iansiti et al., "The Truth About Blockchain", hbr.org/webinar/2017/02/the-truth-about-blockchain, From the Magazine (Jan.-Feb. 2017), 15 pages.

Javeri, Prashun, "Smart Contracts and Blockchains," https://medium.com/@prashunjaveri/smart-contracts-and-blockchains-c24538418bf6, Jan. 9, 2019, 17 pages.

Kim, Jina, "The Portal is now open—Formatic fiat on-ramp is in public beta!" https://medium.com/fortmatic/the-portal-is-how-open-fortmatic-fiat-on-ramp-is-in-public-beta-26c53caded8b, Nov. 28, 2019, 4 pages.

Ledger.com,"What are Public Keys and Private Keys?," https://www.ledger.com/academy/blockchain/what-are-public-keys-and-private-keys, Oct. 23, 2019, retrieved Jan. 27, 2021, 5 pages.

Lemonade, "Forget Everything You Know About Insurance," lemonade.com, retrieved from https://web.archive.org/web/20210805090609/https://www.lemonade.com/, Aug. 5, 2021, 8 pages.

Lemonade, "Forget Everything You Know About Insurance," lemonade.com, retrieved from https://web.archive.org/web/20200815200824/https://www.lemonade.com/, Aug. 15, 2020, 3 pages.

Lemonade, "Forget Everything You Know About Insurance," lemonade.com, retrieved from https://web.archive.org/web/20190818211313/https://www.lemonade.com/de/en, Aug. 18, 2019, 7 pages.

Lemonade, "Forget Everything You Know About Insurance," lemonade.com, retrieved from https://web.archive.org/web/20210209201217/https://www.lemonade.com/, Feb. 9, 2021, 3 pages.

Mabon, Andrew, "TandaPay Cannot Be Regulated-3," https://medium.com@joshuadavis31.com/tandapay-cannot-be-regulated-3-d908c3ba05b5, Sep. 13, 2018, 8 pages.

Mabon, Andrew, "TandaPay Cannot Be Regulated-2," https://medium.com@joshuadavis31.com/tandapay-cannot-be-regulated-2-6982b997fe6, Sep. 1, 2018, 9 pages.

Mattson, Kurt, "Legal Protections to Thwart Fraud in TandaPay," https://medium.com/@joshuadavis31.com/my-startup-journey-c1fd743969c5, Nov. 1, 2019, 13 pages.

Mattson, Kurt, "TandaPay Cannot Be Regulated-4," https://medium.com@joshuadavis31.com/tandapay-cannot-be-regulated-4-700fbbb756cb, Sep. 15, 2018, 13 pages.

Mattson, Kurt, "The Law and Smart Contracts,", https://medium.com/@joshuadavis31.com/review-the-law-and-smart-contracts-a88b1c9bb49a, Nov. 1, 2019, 11 pages.

National Association of Insurance Commissioners & the Center for Insurance Policy and Research, "Peer-to-Peer (P2P) Insurance," https://content.naic.org/cipr_topics/topic_peer_to_peer_p2p_insurance.htm, Jan. 10, 2020 (updated Jun. 11, 2020), 4 pages.

(56) References Cited

OTHER PUBLICATIONS

Michael Abramowicz, "Cryptoinsurance," presented Mar. 27, 2015 at the Wake Forest Law Review 2015 Spring Symposium (Year: 2015).

Reuben Jackson, "Are Smart Contracts Changing How We Do Business?", 4: Insurance Databases (Oct. 17, 2017) (Year: 2017).

P2P Foundation Wiki, "Breadfunds," http://wiki.p2pfoundation.net/Bread_Funds, retrieved from https://web.archive.org/web/20210303052426/http://wiki.p2pfoundation.net/Bread_Funds, Mar. 3, 2021, 2 pages.

P2P Foundation Wiki, "Broodfonds," https://wiki.p2pfoundation.net/Broodfonds, retrieved from https://web.archive.org/web/20190326095335/https://wiki.p2pfoundation.net/Broodfonds, Mar. 26, 2019, 4 pages.

U.S. Appl. No. 17/396,203, filed Aug. 6, 2021, 151 pages.

Perez, Sarah, "Yahoo shuts down social savings app Tanda only months after launch," https://techcrunch.com/2018/05/25/yahoo-shuts-down-social-savings-app-tanda-only-months-after-launch/, May 25, 2018, 8 pages.

Pilgrim, Charles W. et al. "Organisational Social Influence on Directed Hierarchical Graphs, from Tyranny to Anarchy." Scientific Reports 10 (2020): 24 pages.

Rouviere, Simon de la, "Burning Bridges to Greener Grass: Incentivizing Tokenized Forking," https://medium.com/@simondlr/burning-bridges-to-greener-grass-incentivizing-tokenized-forking-393c69dfecab, Jun. 13, 2018, 5 pages.

Rouviere, Simon de la, "The Moloch DAO: Collapsing the Firm," https://medium.com/@simondlr/the-moloch-dao-collapsing-the-firm-2a800b3aa2e7, Jan. 16, 2019, 17 pages.

Sagalow, Ty R., "Peer-to-Peer Insurance," National Association of Insurance Commissioners & the Center for Insurance Policy and Research, Apr. 1, 2016, New Orleans, LA, 8 pages.

Sirivianos, Michael, et al., "FaceTrust: Assessing the Credibility of Online Personas via Social Networks," Proceedings of the 4th USENIX conference on Hot topics in security, 6 pages.

Teambrella, teambrella.com, https://web.archive.org/web/20200806194501/http://teambrella.com/, Aug. 6, 2020, 9 pages.

Teambrella, teambrella.com, https://web.archive.org/web/20210627204138/https://teambrella.com/, Jun. 27, 2021, 7 pages.

Teambrella, teambrella.com, https://web.archive.org/web/20190706100614/http://teambrella.com/, Jul. 6, 2019, 9 pages.

Teambrella, teambrella.com, https://web.archive.org/web/20201108092547/https://teambrella.com/, Nov. 8, 2020, 9 pages.

Van Wirdum, Aaron, "Teambrella Wants to Revolutionize Insurance Coverage with Peer-To-Peer Bitcoin Payments," Bitcoin Magazine, https://bitcoinmagazine.com/technical/teambrella-wants-to-revolutionize-insurance-coverage-with-peer-to-peer-bitcoin-payments-1459521851, Apr. 1, 2016, 16 pages.

Verstraete, Mark, "The Stakes of Smart Contracts", Loyola University Chicago Law Journal, vol. 50, Issue 3, Spring 2019, Article 13, 54 pages.

Vidrih, Marko, "What is a Block in the Blockchain?," https://medium.datadriveninvestor.com/what-is-a-block-in-the-blockchain-c7a420270373 Dec. 29, 2018, retrieved Jan. 27, 2021, 6 pages.

Wikipedia, "Broodfonds," https://en.wikipedia.org/wiki/Broodfonds, retrieved from https://web.archive.org/web/20170607081848/https://en.wikipedia.org/wiki/Broodfonds, Jun. 7, 2017, 3 pages.

Wikipedia, "Rotating savings and credit association," https://en.wikipedia.org/wiki/Rotating_savings_and_credit_association, retrieved from https://web.archive.org/web/20180530220339/https://en.wikipedia.org/wiki/Rotating_savings_and_credit_association, May 30, 2018, 5 pages.

Wikipedia, "Smart contract," https://en.wikipedia.org/wiki/Smart_contract, retrieved from https://web.archive.org/web/20180808221712/https://en.wikipedia.org/wiki/Smart_contract, Aug. 8, 2018, 5 pages.

Wikipedia, "Tanda," https://en.wikipedia.org/wiki/Tanda_(informal_loan_club), retrieved from https://web.archive.org/web/20190413000146/https://en.wikipedia.org/wiki/Tanda_(informal_loan_club), Apr. 13, 2019, 2 pages.

Wikipedia, "Public Key Infrastructure," https://en.wikipedia.org/wiki/Public_key_infrastructure, retrieved from https://web.archive.org/web/20190810105048/https://en.wikipedia.org/wiki/Public_key_infrastructure, Aug. 10, 2019, 9 pages.

Wood, Dr. Gavin, "Ethereum: A Secure Decentralised Generalised Transaction Ledger," EIP-150 Revision. 32 pages.

Abramowicz, Michael B., "Cryptoinsurance", 50 Wake Forest L. Rev. 671 (2015), GWU Law School Public Law Research Paper No. 2019-17, GWU Legal Studies Research Paper No. 2019-17, available at SSRN: https://ssrn.com/abstract=3366634 or http://dx.doi.org/10.2139/ssrn.3366634, 30 pages.

Affidavit Under 37 C.F.R. § 1.130, filed Feb. 13, 2019, including Exhibit A "Peer to Peer Insurance on an Ethereum Blockchain," Joshua Davis; U.S. Appl. No. 15/052,681 Docket History (Year: 2019), and including Exhibit B, 17 pages.

Affidavit Under 37 CFR 1.130, filed Feb. 13, 2019, including Exhibit A—"Peer to Peer Insurance on an Ethereum Blockchain", Joshua Davis; U.S. Appl. No. 15/052,681 Docket History (Year: 2019).

Andrew, Paul, "Bitcoin Censorship Resistance Explained," available at https://coincentral.com/bitcoin-censorship-resistance/, Apr. 23, 2018, 12 pages.

Ayres et al., "Information Escrows," Michigan Law Review, vol. 111, No. 2, Michigan Law Review Association, 2012, pp. 145-196, http://www.jstor.org/stable/41703439, 53 pages.

Buterin, Vitalik, "Ethereum White Paper: A Next Generation Smart Contract & Decentralized Application Platform", Dec. 28, 2014. 36 pages.

Davis, Joshua, "A New Technology that Can Save Lives," https://medium.com/predict/a-new-technology-that-can-save-lives-5f9edc612445, Feb. 14, 2020, 12 pages.

Davis, Joshua, "A New Type of Immortality," https://medium.com/predict/the-spirit-of-tandapay-168eec5919cd, Aug. 12, 2018, 8 pages.

Davis, Joshua, "A Solution to the Oracle Problem," https://medium.com/@joshuadavis31.com/a-discussion-of-the-oracle-problem-6cbec7872c10, May 28, 2019, 12 pages.

Davis, Joshua, "A Solution to the Oracle Problem," https://medium.com/@joshuadavis31.com/a-discussion-of-the-oracle-problem-6cbec7872c10, May 28, 2019, retrieved Nov. 9, 2021, 17 pages.

Davis, Joshua, "Bancor could be used for governance," https://medium.com/@joshuadavis31.com/bancor-could-be-used-for-governance-2f632228989a, Mar. 10, 2018, 13 pages.

Davis, Joshua, "Bancor does crowdfunding better," https://medium.com/@joshuadavis31.com/bancor-can-change-crowdfunding-3b71610c8988, Aug. 12, 2017, 13 pages.

Davis, Joshua, "Bancor is a fractional reserve protocol-1," https://medium.com/@joshuadavis31.com/bancor-is-a-fractional-reserve-protocol-f561288d08e6, Jan. 26, 2018, 11 pages.

Davis, Joshua, "Bancor is a fractional reserve protocol-2," https://medium.com/@joshuadavis31.com/bancor-is-a-fractional-reserve-protocol-2-7cb9a289d3c, Mar. 3, 2018, 16 pages.

Davis, Joshua, "Bancor is a fractional reserve protocol-3," https://medium.com/@joshuadavis31.com/bancor-is-a-fractional-reserve-protocol-3-824e4a158fdd, Mar. 8, 2018, 12 pages.

Davis, Joshua, "Blockchain retrospective," https://medium.com/@joshuadavis31.com/joshua-davis-is-illuminated-1193c6046f90, Apr. 14, 2020, 24 pages.

Davis, Joshua, "Blockchains can be used to Solve Difficult Class Inequality Problems," https://medium.com/@joshuadavis31.com/we-use-blockchain-to-solve-some-of-americas-most-difficult-class-inequality-problems-in-one-phone-dd77b44082e9, Jun. 16, 2018, 15 pages.

Davis, Joshua, "Blockchains can be used to Solve Difficult Class Inequality Problems," https://medium.com/@joshuadavis31.com/we-use-blockchain-to-solve-some-of-americas-most-difficult-class-inequality-problems-in-one-phone-dd77b44082e9. Jun. 16, 2018, retrieved Nov. 9, 2021, 20 pages.

Davis, Joshua, "Counter-intuitive assumptions required to build TandaPay," https://medium.com/@joshuadavis31.com/counter-intuitive-assumptions-required-to-build-tandapay-63a8845168db, Jun. 16, 2020, 9 pages.

(56) References Cited

OTHER PUBLICATIONS

Davis, Joshua, "Crowdfunding is Now Guaranteed to be Better with Peerback," https://medium.com/@joshuadavis31.com/crowdfunding-is-now-guaranteed-to-be-better-with-peerback-9905abb89a7b, Mar. 28, 2017, 4 pages.
Davis, Joshua, "Does Cannabis Insurance on the Blockchain make sense?" available at https://medium.com/@joshuadavis31.com/does-cannabis-insurance-on-the-blockchain-make-sense-b272dd1f3087, Mar. 2, 2018, 5 pages.
Davis, Joshua, "Fraud Protections within TandaPay," available at https://medium.com/@joshuadavis31.com/concerns-about-fraud-within-tandapay-a414ea8c0e0, Oct. 8, 2019, 16 pages.
Davis, Joshua, "Groups Need an Easier Way to Hold Funds," available at https://medium.com/predict/groups-can-now-easily-hold-funds-bc91f9b51d45, Oct. 14, 2019, 17 pages.
Davis, Joshua, "How P2P insurance can empower social justice in local communities," available at https://medium.com/predict/what-p2p-insurance-means-to-me-133f358e1289, Jun. 17, 2019, 10 pages.
Davis, Joshua, "How TandaPay Gets Built," available at https://medium.com/@joshuadavis31/getting-tandapay-built-5785524edef7, Nov. 30, 2018, 9 pages.
Davis, Joshua, "Hyperlocal Insurance Uses Bancor-1," available at https://medium.com/@joshuadavis31/hyperlocal-insurance-uses-bancor-c809c0f28ee1, May 10, 2018, 7 pages.
Davis, Joshua, "Incremental payments vs. lump sum payments," available at https://medium.com/@joshuadavis31.com/incremental-payments-vs-lump-sum-payments-1833b969b492, Apr. 7, 2018, 10 pages.
Davis, Joshua, "Information Escrows Get a Power-up," available at https://medium.com/@joshuadavis31.com/information-escrows-get-a-power-up-7a5152a26c63, May 25, 2020, 12 pages.
Davis, Joshua, "Join the Financial Escrow Revolution," available at https://medium.com/predict/join-the-financial-escrow-revolution-accbf9b6b81c, Aug. 12, 2020, 11 pages.
Davis, Joshua, "Kerner Commissio■ s Prescription for Effective Grievance-Response," available at https://medium.com/illumination/kerner-commissions-prescription-for-effective-grievance-response-d40c6a8d1a2, Jul. 24, 2020, 17 pages.
Davis, Joshua, "My Questions Concerning TandaPay and Worker▲ Compensation insurance," available at https://medium.com/@joshuadavis31.com/my-questions-concerning-tandapay-and-workers-compensation-insurance-e948654d3ef7, Jul. 21, 2018, 11 pages.
Davis, Joshua, "My Questions Concerning TandaPay and Worker▲ Compensation insurance," available at https://medium.com/@joshuadavis31.com/my-questions-concerning-tandapay-and-workers-compensation-insurance-e948654d3ef7, Jul. 21, 2018, retrieved Nov. 10, 2021, 6 pages.
Davis, Joshua,"My Startup Journey," available at https://medium.com/@joshuadavis31.com/my-startup-journey-c1fd743969c5, Dec. 31, 2019, 19 pages.
Davis, Joshua, "P2P Insurance at its most basic level: Which features are essential for eliminating fraud and why?," available at https://medium.com/@joshuadavis31.com/p2p-insurance-at-its-most-basic-level-709d04af9ce2, Apr. 1, 2019, retrieved Nov. 9, 2021, 17 pages.

Davis, Joshua, "P2P Insurance in the Coming Year," available at https://medium.com/@joshuadavis31.com/p2p-insurance-in-the-coming-year-1405f826a2e7, Apr. 18, 2019, 3 pages.
Davis, Joshua, "P2P Insurance at its most basic level: Which features are essential for eliminating fraud and why?," available at https://medium.com/@joshuadavis31.com/p2p-insurance-at-its-most-basic-level-709d04af9ce2, Apr. 1, 2019, 11 pages.
Davis, Joshua, "Peer to Peer Insurance on an Ethereum Blockchain: General Consideration of the Fundamentals of Peer to Peer Insurance," white paper, at least as of Mar. 24, 2015, 12 pages.
Davis, Joshua, "Say Goodbye to the $500 Deductible: How to eliminate it with communities and blockchain," available at https://medium.com/@joshuadavis31.com/say-goodbye-to-the-500-deductible-5bbd2585ce7f, Aug. 8, 2018, 15 pages.
Davis, Joshua, "TandaPay Cannot Be Regulated-1," available at https://medium.com/@joshuadavis31.com/tandapay-cannot-be-regulated-1-8f5a0935f8e4, Aug. 30, 2018, 4 pages.
Davis, Joshua, "TandaPay DMCA Legal Defense Funds," available at https://medium.com/predict/tandapay-dmca-legal-defense-funds-baa57d05b65d, Sep. 26, 2019, 13 pages.
Davis, Joshua, "TandaPay Explained: How decentralized peer-to-peer insurance works," available at https://medium.com/@joshuadavis31.com/tandapay-explained-e452411b5e59, Jul. 15, 2019, 13 pages.
Davis, Joshua, "TandaPay Explained: How decentralized peer-to-peer insurance works," available at https://medium.com/@joshuadavis31.com/tandapay-explained-e452411b5e59, Jul. 15, 2019, retrieved Nov. 9, 2021, 20 pages.
Davis, Joshua, "TandaPay is a Weak Insurance Protocol," available at https://medium.com/@joshuadavis31.com/tandapay-is-a-weak-insurance-protocol-895ef7cd8724, Apr. 20, 2019, 6 pages.
Davis, Joshua, "TandaPay is a Weak Insurance Protocol," available at https://medium.com/@joshuadavis31.com/tandapay-is-a-weak-insurance-protocol-895ef7cd8724, Apr. 20, 2019, retrieved Nov. 9, 2021, 11 pages.
Davis, Joshua, "TandaPay is Whistleblowing Software: For community reporting of police brutality and abuse," available at https://medium.com/@joshuadavis31.com/tandapay-progress-thus-far-8c173b7879ae, Aug. 22, 2018, retrieved Nov. 9, 2021, 10 pages.
Davis, Joshua, "TandaPay Locker-Smart Contract Art," available at https://medium.com/@joshuadavis31.com/tandapay-locker-smart-contract-art-1-3e943002013c, Sep. 21, 2018, 8 pages.
Davis, Joshua, "TandaPay Progress Thus Far," available at https://medium.com/@joshuadavis31.com/tandapay-progress-thus-far-8c173b7879ae, Aug. 22, 2018, 4 pages.
Davis, Joshua, "The Case for Stablecoins-1," available at https://medium.com/@joshuadavis31.com/the-case-for-stablecoins-1-9ca3d2ab9e9a, Jan. 14, 2019, 11 pages.
Davis, Joshua, "The Case for Stablecoins-2," available at https://medium.com/@joshuadavis31.com/the-case-for-stablecoins-2-2723a5a78efa, Jan. 18, 2019, 10 pages.
Davis, Joshua, "The Case for Stablecoins-3," available at https://medium.com/@joshuadavis31.com/the-case-for-stablecoins-3-386782a4ae8a, Feb. 5, 2019, 22 pages.

\* cited by examiner

|  | Honest Policyholders Rewarded | Dishonest Policyholders Penalized |
|---|---|---|
| Current Group | Group Harmony: Payment of valid claims produces group attestation, which demonstrates consensus.<br><br>1002 | Dishonest defectors who withhold payment of valid claims are removed from the group.<br><br>1006 |
| Future Group | Minority group of civil dissenters (e.g., first wave of defectors) are allowed to reorganize and build a new group while the current group collapses.<br><br>1004 | Majority group who colludes to pay an invalid claim are not allowed to reorganize and build a new group once the current group collapses.<br><br>1008 |

FIGURE 10

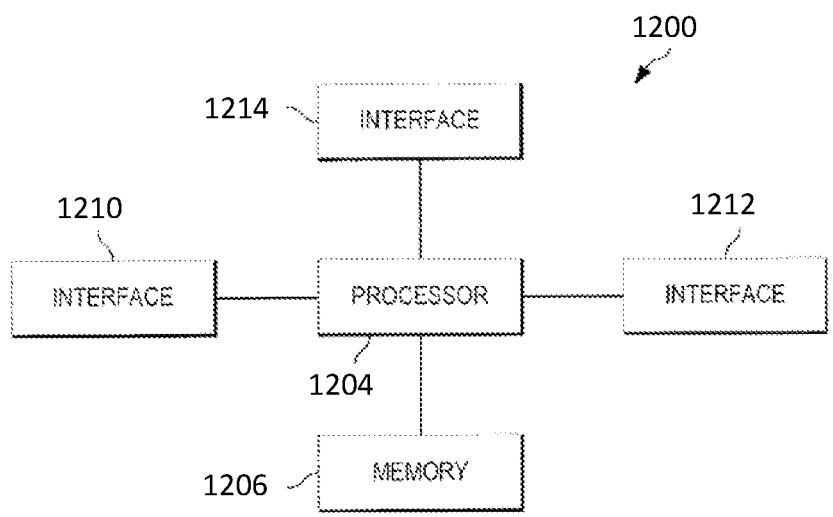

FIGURE 12

COMPUTER SYSTEMS AND SOFTWARE FOR SELF-EXECUTING CODE AND DISTRIBUTED DATABASE

CROSS-REFERENCE TO RELATED APPLICATIONS

This application is a continuation of U.S. patent application Ser. No. 16/997,882, filed Aug. 19, 2020, which claims the benefit of U.S. Provisional Application No. 62/889,503, filed on Aug. 20, 2019. All of the aforementioned applications are incorporated herein by reference.

TECHNICAL FIELD

This disclosure relates generally to computer systems, and, in particular embodiments, to computer systems and software for self-executing code and distributed database.

BACKGROUND

Distributed ledger technology allows data and transactions to be stored in a distributed database, making it very difficult or impossible to tamper with the data, falsify the data, or otherwise deny the occurrence of a transaction recorded on the distributed ledger. This attribute of distributed ledger technology is known as non-repudiation. Self-executing agreements, commonly referred to as smart contracts, execute in a distributed ledger environment.

SUMMARY

In certain embodiments, a computer-implemented method includes creating a premiums escrow, with a zero balance, for a group of policyholders and managed using a distributed ledger and self-executing agreement. At a term beginning, the self-executing agreement receives premium payments sing cryptocurrency from each policyholder and allocates the premium payments to the premiums escrow. During the term the self-executing agreement receives a notification of an incident claim associated with a claimant policyholder. At a term end, the self-executing agreement receives payment instructions from the policyholders; pays, using cryptocurrency from the premiums escrow, the claimant an incident claim payment larger than the premium payment and determined according to the payment instructions; and distributes to the policyholders a rebate payment equal to or lower than the premium payment from the premiums escrow, which returns to a zero balance. The self-executing agreement stores a record of the incident claim in a tamper-proof, publicly-available, non-repudiable distributed ledger.

In certain embodiments, a system includes one or more processors and a non-transitory computer-readable medium storing instructions that, when executed by the one or more processors, cause the one or more processors to perform operations. The operations include, at a beginning of a term, receiving a premium payment using cryptocurrency from each policyholder that is a member of a group and allocating each of the first premium payments to a premiums escrow managed using a distributed ledger and associated self-executing agreement. The operations include, during the term, receiving one or more incident claims from a corresponding claimant of the policyholders. The operations include, at an end of the term: for each incident claim, paying the corresponding claimant a respective incident claim payment using cryptocurrency from the premiums escrow; and if any funds remain in the premiums escrow, distributing to each of the policyholders a rebate payment from the premiums escrow so that the premiums escrow returns to a zero balance, the rebate payment being equal to or lower than the premium payment. The operations include storing at least one record for the one or more incident claims in a database operating in a distributed ledger system.

BRIEF DESCRIPTION OF THE DRAWINGS

For a more complete understanding of this disclosure, and the advantages thereof, reference is now made to the following descriptions taken in conjunction with the accompanying drawings, in which:

FIG. 10 is a graphic illustrating example consequences of being an honest or dishonest group member, according to certain embodiments of this disclosure;

FIG. 12 illustrates a block diagram of an example processing system, according to certain embodiments of the present disclosure.

DETAILED DESCRIPTION OF ILLUSTRATIVE EMBODIMENTS

Figure 1:
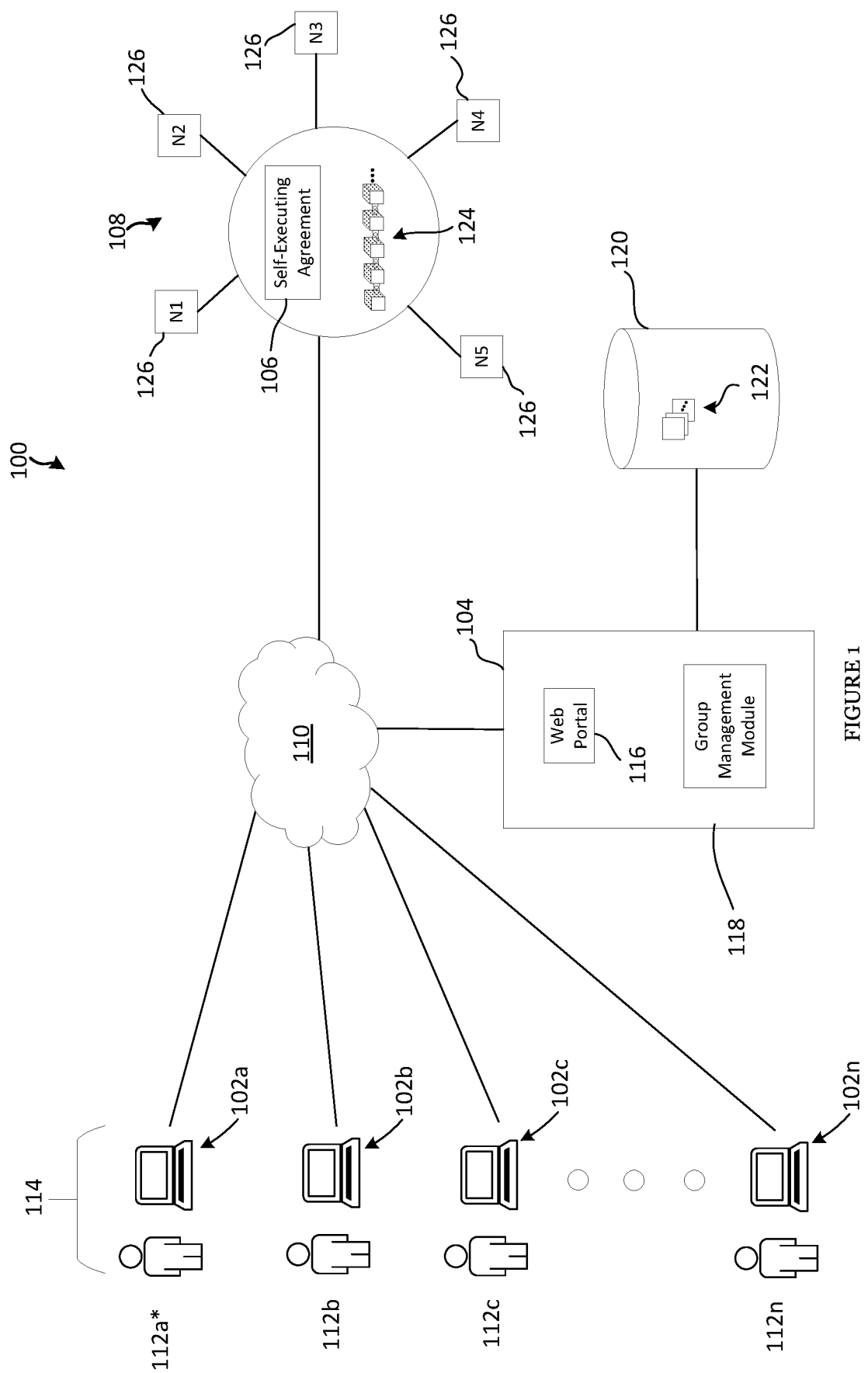
FIG. 1 illustrates a block diagram of an example system for providing group coverage for and creating a record of an incident using a self-executing agreement and distributed ledger, according to certain embodiments of this disclosure.

Individuals may form groups for a variety of reasons. For example, individuals may form a group to further a common goal. As another example, individuals may form a group to pool resources, such as funds, that can be used by members of the group when an agreed-upon event occurs.

In a particular example, individuals may form a group to provide group coverage for incidents when a member of the group submits what the group members perceive to be a valid incident claim. Furthermore, the group may desire to create a record of the incident claim and the group's decision to approve an incident claim (as determined by a leader (referred to as a secretary) of the group after group discussion) and, on a member-by-member basis, finalize payment for the approved incident claim, such as by creating a publicly-available and immutable record of the processing, by the group, of the incident claim in a way that can be used to demonstrate the validity (or invalidity) of the incident claim. As just a few examples, the types of incidents that could be the subject of such groups include whistleblower-type incidents (e.g., sexual harassment incidents, police brutality incidents, etc.), worker's compensation-type incidents, and insurance-type incidents (e.g., automobile, homeowners, renters, and health insurance deductibles). This disclosure contemplates any suitable types of incidents.

Taking "whistleblower" incidents, and specifically sexual harassment incidents, as a particular example, a group of individuals may wish to provide group coverage to one another to provide a financial payment to an individual who submits what the group members perceive to be a valid claim of sexual harassment during a particular term (e.g., monthly). Other example incidents could include date rape, adultery, or any type of corporate or public whistleblowing.

Taking insurance-related incidents as another particular example, a group of individuals may wish to provide group coverage to one another to cover the cost of a certain number of deductibles for group members over particular term (e.g., monthly). Furthermore, some communities may lack access to certain traditional insurance or other monetary resources (e.g., banks), and a mechanism for providing a mutual benefit to group members may provide those groups with access to an alternative to those traditional insurance or other monetary resources.

Embodiments of this disclosure provide an escrow functionality rooted in technology, including both distributed ledger technology and self-executing agreement technology. For example, in the whistleblower scenario the escrow not only holds funds for distribution on the occurrence of predetermined events, as triggered by the self-executing agreement, but using a distributed ledger also creates a secure, publicly-available, and non-repudiable record of what occurred. This type of escrow may be referred to as a financial allegation escrow. As another example, in the insurance-related incident scenario, the escrow holds funds for distribution on the occurrence of predetermined events, as triggered by the self-executing agreement, and using a distributed ledger also creates a secure, publicly-available, and non-repudiable record of what occurred.

In certain embodiments, a group includes multiple participants (or users or policyholders) who pay premiums at the beginning of a term (e.g., a month or other suitable time period). Each participant makes premium payments using cryptocurrency (e.g., DAI) into a premiums escrow. The premiums escrow is a cryptocurrency account stored on a distributed ledger. During the term, one or more participants are each entitled to submit a single incident claim. If an incident claim is approved, the participant (claimant) who submitted the incident claim receives a claim credit, which entitles the claimant to receive a claim payment from the premiums escrow at the end of the term. In certain embodiments, more than one incident claim may be approved in a term. At the end of the term, the self-executing agreement distributes all of the remaining funds of the premiums escrow to all of the participants in equal shares as a rebate payment. In other words, zero reserves are kept by the premiums escrow from one term to the next.

In certain embodiments, a participant is permitted to request a full refund (e.g., defect from the group) of the premium at the end of the term. If the participant requests a full refund, the self-executing agreement pays a full refund to the participant from the premiums escrow prior to paying any incident claim payments to the claimant(s) or rebate payments to the policyholders. This ability to request a refund allows participants to voice their opinion, honestly or potentially dishonestly, about the validity of previously approved claim credit(s) that are eligible for payment. If a participant believes that an invalid incident claim was approved for a claim credit, the participant can request a full refund of his or her premium payment. Therefore, there is an incentive to approve only valid claims for eligibility to receive a claim credit. Otherwise, the approval of an invalid claim for a claim credit likely will result in multiple defections from the group (with participants leaving the group with their premiums), a scenario in which the cost of premiums increases for group members due to the inflexibility of a coverage requirement (described below), potentially leading the group to collapse immediately or sometime in the future.

In certain other embodiments, participants are not permitted to request a refund of the premium.

Certain embodiments include a subgroup/overpayment mechanism to create accountability among smaller groups of participants who know each other. For example, the group may include multiple subgroups. As a particular example, a group of 50 participants may include a plurality of subgroups, each subgroup including 4 to 7 participants. Each subgroup has its own overpayment escrow. Each overpayment escrow is a cryptocurrency account stored on a distributed ledger. Each participant of the group also belongs to one subgroup. At the beginning of the term, each participant of a subgroup makes an overpayment into the respective subgroup's overpayment escrow. When a participant defects from the group, the overpayment escrow for the subgroup associated with the defector automatically (via a self-executing agreement) refunds the overpayment to the defector from the overpayment escrow. The defector also receives a refund of his or her premium payment from the premiums escrow for the group. As a penalty to any remaining subgroup members (of the subgroup that associated with the defector) who chose not to defect, the overpayment escrow for the subgroup (via the self-executing agreement) automatically makes a payment from the overpayment escrow into the premiums escrow for the group to make up for the amount refunded from the premiums escrow to the defector. Subgroups and overpayments are described in greater detail below with reference to the figures of the description.

Certain embodiments implement a zero-reserve architecture account. That is, the premiums escrow for the group that holds, aggregates, and/or bundles premiums together to pay incident claim payments, rebates, and possibly refunds for defectors (if permitted) returns to a zero balance at the end of each term. In certain embodiments, all premiums paid into the premiums escrow for the group have a one-hundred percent probability of being paid out in full (one-hundred percent of the cash value in the premiums escrow for the group) to claimants (for whom an incident claim is approved) and policyholders (as rebates or refunds, if permitted), leaving zero premiums in the premiums escrow for the group at the end of the term. Incident claims paid from the premiums escrow for the group (which in this example is a zero-reserve architecture account) may be referred to as zero-reserve architecture incident claim payments, rebates paid from the premiums escrow for the group (which in this example is a zero-reserve architecture account) may be referred to as zero-reserve architecture incident rebate payments, and refunds paid from the premiums escrow for the group (which in this example is a zero-reserve architecture account) may be referred to as zero-reserve architecture incident refund payments. Furthermore, as will be described in greater detail below, in certain embodiments, incident claims may be underpaid if the value of incident claims in a term exceeds the value of funds (reserves) remaining in the premiums escrow for the group.

In certain embodiments, a record of an incident is created using a self-executing agreement (e.g., a smart contract), a distributed ledger system (e.g., a blockchain system), and cryptocurrency. The self-executing agreement includes computer instructions that when executed by a node in the distributed ledger system operate one or more escrow accounts that receive payments, store payments, and release payments, all under conditions set by the computer instructions. Furthermore, because self-executing agreement operates in the distributed ledger system (e.g., blockchain environment), self-executing agreement uses cryptocurrency for executing transactions and stores those transactions on the distributed ledger in a way that is available to the public. This creates an essentially immutable but transparent record of the transactions executed by the self-executing agreement that is stored in a distributed database and verified by the nodes in the distributed ledger system. Additionally, using self-executing agreement and associate cryptocurrency managed in the distributed ledger system reduces or eliminates the need for a third party to manage the funds/escrow(s) of the group.

FIG. 1 illustrates a block diagram of an example system 100 for providing group coverage for and creating a record of an incident using a self-executing agreement and distributed ledger, according to certain embodiments of this disclosure. In this example, system 100 includes user devices 102 (user devices iota through 102n), group management processing system 104, and a self-executing agreement 106 implemented on a distributed ledger system 108, all of which are configured to communicate via network no. Although this particular implementation of system 100 is illustrated and described, this disclosure contemplates system 100 being implemented in any suitable manner, according to particular needs.

In general, users of user devices 102 interact with group management processing system 104 to form and manage a group for implementing some type of group financial coverage for certain types of incidents. Users of user devices 102 also interact with self-executing agreement 106 and distributed ledger system 108 to implement a financial escrow for providing the group's financial coverage, the financial escrow operating according to a set of rules defined in self-executing agreement 106, and to create a digital, publicly-available, and non-repudiable record of the incidents and the group's handling of those incidents.

User devices 102 may include any suitable computing devices, such as desktop computers, laptop computers, smartphones, tablets, wearable devices, or any other suitable web-enabled computing devices, in any suitable combination. In such embodiments, user devices 102 may include one or more memory devices and one or more processors configured to execute instructions stored on the one or more memory devices. Thus, user devices 102 may execute the computer instructions to implement the various operations described herein in reference to user devices 102. User devices 102 may be configured to communicate with one or more of group management processing system 104 and distributed ledger system 108, via network no for example.

User devices 102 have corresponding users 112 (users 112a through 112n). In the illustrated example, users 112 are members of a group 114 (group members) formed to provide group coverage for certain types of incidents. In this example, user 112a is the secretary of group 114, as indicated by the asterisk. The meaning and role of the secretary are described in greater detail below.

Group 114 is a collection of individuals (users 112) who provide each other group coverage for a certain category of incident claim. Throughout this disclosure, group 114 also may be referred to as a community and users 112 also may be referred to as group members. In certain embodiments, group 114 is 50 to 100 people; however, group 114 may include any suitable number of group members that is appropriate for a particular implementation. Group members of group 114 pay premiums into a premiums escrow implemented using a self-executing agreement 106 at the start of each term, which is a predetermined time period of any length established by group 114. At the end of the term, group 114, via self-executing agreement 106, uses these premiums to pay out valid incident claims for the term. After paying out valid incident claims for the term, group 114 (via self-executing agreement 106) pays out the remaining funds as rebates to policyholders (which may be some or all of the group members, as described below), which effectively returns the premiums escrow of group 114 to a balance of zero. In certain embodiments, in a case where the value of valid incident claims exceeds the value of available premiums, each valid incident claim divides the available premiums equally. The cycle then repeats itself indefinitely until group 114 decides to disband or an invalid incident claim results in a collapse of group 114.

Group management processing system 104 may be a server or other computing device able to communicate with user devices 102 and distributed ledger system 108 via network no. In certain embodiments, group management processing system 104 may include one or more memory devices and one or more processors configured to execute instructions stored in the one or more memory devices. In certain embodiments, group management processing system 104 may include multiple computing elements including, for example, multiple central processing units (CPUs) or multiple graphical processing units (GPUs).

Group management processing system 104 generally serves as an intermediary to facilitate the establishment of groups by users (e.g., group 114 by users 112) and the management of those groups. Group management processing system 104 also may facilitate interaction by users 112 (via corresponding user devices 102) with self-executing agreement 106 and distributed ledger system 108.

Group management processing system 104 includes web portal 116 and group management module 118. Web portal 116 provides an interface to user devices 102 through which users 112 of user devices 102 can manage aspects of group 114 and the group coverage provided for group 114.

For example, web portal 116 may provide a user 112 with an interface for establishing an account with group management processing system 104, an account which may be linked to group 114. As another example, web portal 116 may provide a group member of group 114 with a dashboard or other user interface to view and manage the group member's account, to see the current status of group 114, to determine the current time within the current term (e.g., where in the particular term the group currently is), to view incident claims for the current term and their associated statuses, to view historical information related to previous incident claims, to view a group charter for group 114 (described below), to view and sign a group pledge (described below), to access a forum to discuss incident claims and other issues related to group 114, and to access other information or features. In certain embodiments, some or all of web portal 116 is implemented using JavaScript.

Group management module 118 provides at least certain features accessible to user devices 102 through web portal 116, including features for managing group 114. Such features may include the ability for a user 112 (e.g., user 112a, the secretary) to create a group, manage group membership, send invitations to individuals to become group members, and store information associated with group 114 (as will be described in further detail below), among others. In certain embodiments, group management module 118 provides the logic and associated computer code underlying the features made available through web portal 116. Furthermore, group management module 118 may communicate with distributed ledger system 108 (including, potentially, self-executing agreement 106), where appropriate.

Group management processing system 104 may have access to a storage module 120, and may store group information 122 in storage module 120. Storage module 120 may take the form of volatile or non-volatile memory including, without limitation, magnetic media, optical media, RAM, ROM, removable media, or any other suitable memory component. In certain embodiments, a portion of all of storage module 120 may include a database, such as one or more structured query language (SQL) servers or relational databases. Storage module 120 may store a variety of information that may be used by group management processing system 104 and/or distributed ledger system 108 (if appropriate), including group information 122. Group information 122 is described first below with reference to FIG. 2 before returning to FIG. 1.

Figure 2:
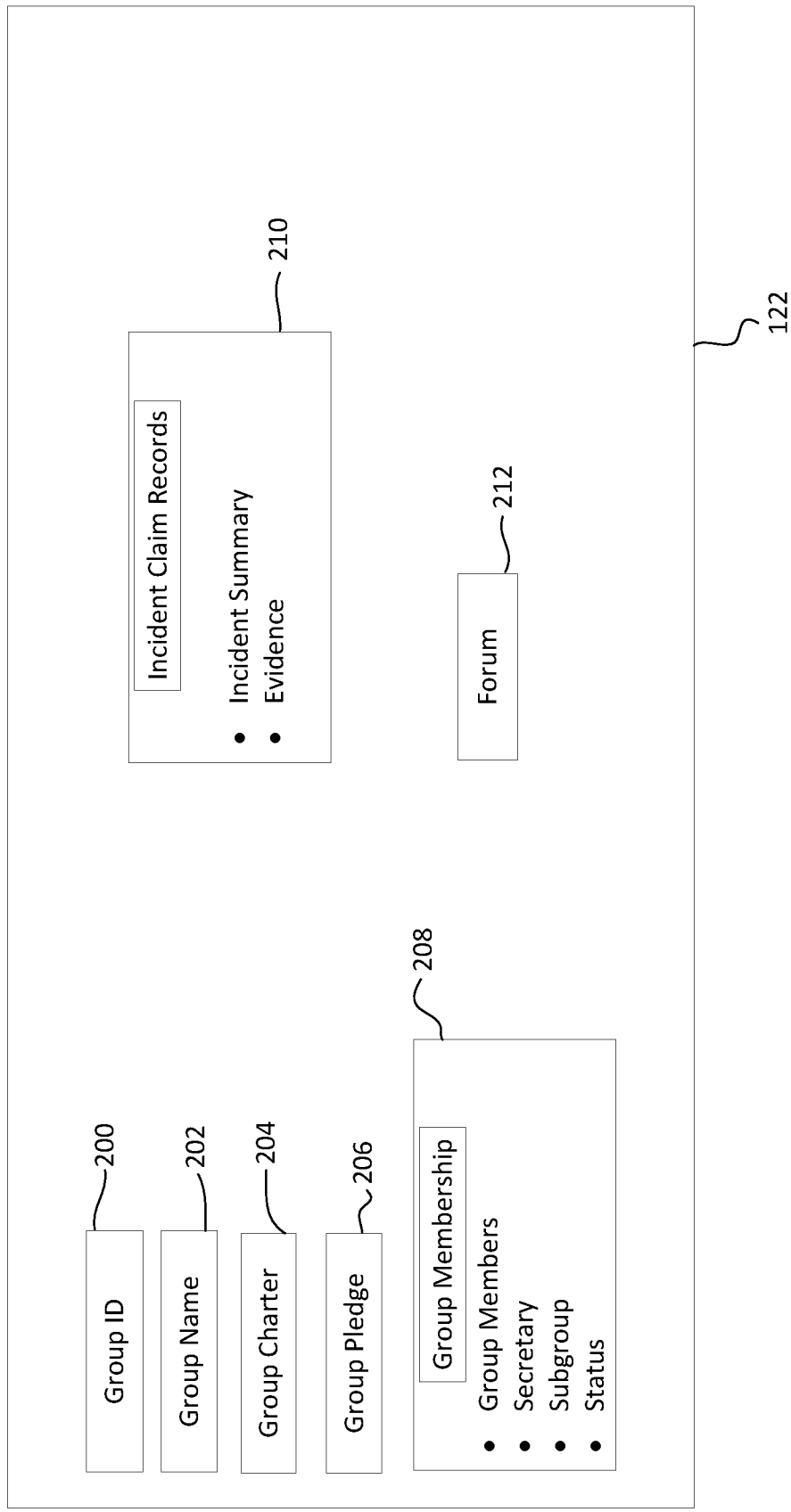
FIG. 2 illustrates example group information, according to certain embodiments of this disclosure.

FIG. 2 illustrates example group information 122, according to certain embodiments of this disclosure. In the illustrated example, group information 122 includes a group identifier (ID) 200 for group 114, a group name 202 for group 114, a group charter 204 for group 114, a group pledge 206 for group 114, group membership 208 for group 114, incident claims records 210 for group 114, and forum 212 (or a link to a forum) for group 114. Although group information 122 is illustrated and described as including particular information, group information 122 may include any suitable information according to particular needs.

Group ID 200 may be a unique identifier, such as character sequence generated by group management module 118, and group name 202 for group 114 may be a group moniker selected by group 114.

Group information 122 may include group charter 204 and group pledge 206 for group 114. Certain embodiments use a group charter and group pledge system to enforce adherence to a set of social norms. Group members pledge to uphold the social norms outlined in group charter 204. In addition to signing group pledge 206, group members agree to obtain coverage by paying a premium. This type of system combines social contracts and financial escrows into a single social-financial protocol. Social-financial protocols can allow entities outside group 114 to identify whether an incident claim has caused a fracture in the consensus of group 114. A record of payments to approved incident claims is the basis for an attestation by group 114 that an incident claim is valid.

Group charter 204 may be a published document that identifies the rules that govern group 114, and that outlines how group 114 will manage the affairs of group 114. Although group charter 204 is described below as including particular information, this disclosure contemplates group charter 204 including any suitable information.

In certain embodiments, group charter 204 includes information establishing group 114, information regarding which incident claims are eligible to be approved to receive a claim credit (which also may be referred to as a claim award), and information regarding which users 112 are eligible to be group members and/or policyholders.

Information establishing group 114 may include the identity of the group leader (e.g., the identity of the group secretary), information regarding how a new leader can be elected, and information regarding how group charter 204 can be changed. Group charter 204 may identify how many incident claims group 114 anticipates paying per term and the value of each claim (e.g., coverage requirement). In certain embodiments, the coverage requirement is equal to the value of each incident claim in a term multiplied by the number of incident claims group 114 anticipates paying each term. In certain embodiments, group charter 204 does not specify the value of a premium, but group charter 204 specifies a coverage requirement for group 114. The value of premiums can vary each term depending on the number of policyholders within group 114. The coverage requirement for group 114, however, might remain fixed each term and be changed by altering group charter 204. The coverage requirement for group 114 may be enforced by the software code running within self-executing agreement 106. In an alternative embodiment, group charter 204 specifies the value of a premium.

In certain embodiments, premiums are variable because the coverage requirement is fixed by group charter 204. In certain embodiments, the design of premiums is intended to produce groups that collapse after losing a critical number of policyholders. As group members leave group 114, the cost of premiums in subsequent terms increases. As premiums increase fewer participants may choose to continue with group 114. This process may continue until no policyholders remain who are willing to pay the required premium.

This disclosure contemplates the incident claim payment and premiums being any suitable amount, as determined by the group members. The incident claim payment provided by the group coverage might or might not be intended to compensate the claimant for the incident. In certain embodiments, such as may be the case in an insurance deductible implementation, the incident claim payment may actually cover the cost of the claimant's deductible for another insurance policy (e.g., an automobile insurance policy).

Additionally or alternatively, the incident claim payment may be more symbolic of the group's confidence that the incident actually occurred in a way that meets the qualifications determined by group 114 (e.g., as specified in group charter 204). Taking a whistleblower example, the amount of the incident claim payment might or might not provide a significant financial benefit to the claimant or group 114. For example, the amount of the incident claim payment might not approach the type of incident claim payment that could be recovered by filing a claim in a court of law. For each policyholder, however, the amount for the premium may be relatively significant and may speak to the belief by group members (and specifically policyholders) that a qualifying incident actually occurred. This group is, to use a colloquial phrase, putting their money where their mouth is, with premiums paid in advance that the group members have promised to pay if a valid claim (per group charter 204 to which they have pledged) is presented.

Adding further reliability, the subgroup/overpayment mechanism means that a small, trusted group is betting that they will see eye-to-eye on claims, and if they do not, some group members will have to cover the cost of a group member who dissents. These and other factors, coupled with the ability to defect, provide a strong sense that some validity exists in the incident claims (if it is granted with few defectors) and, if large groups of defectors occur, group 114 will disband, now or later.

Group charter 204 also may specify the length of a term. This disclosure contemplates a term having any suitable length, including almost immediate up to any suitable length. In certain embodiments, the term is thirty days. In certain embodiments, the term includes additional stages at the beginning and/or end of the term. As just one example, a term of 36 days may be used, with an active stage being 30 days and the remaining 6 days overlapping with adjacent terms as follows: (1) a pre-stage of 3 days for the payment of premiums; (2) a coverage period (active stage) of 30 days in which incident claims may be submitted; and (3) a post-stage of 3 days to allow for either the defection or finalization of premiums to incident claims approved during the coverage period. This is just one example of how a term may be implemented and is not intended to limit this disclosure.

Information regarding which claims are eligible may include what events trigger an incident claim that is eligible for coverage; what specific requirements determine whether an incident claim is valid or invalid; what, if any, actions may disqualify a claimant from submitting an incident claim; any special circumstances under which an incident claim is disqualified; and the types of evidence that should (or must) be submitted and how such evidence should be verified. Regarding the evidence, group charter 204 may specify who is responsible for verifying the evidence, including potentially which evidence is submitted only to the secretary for evaluation and which evidence is submitted to group 114 for evaluation. The information regarding which incident claims are eligible may indicate appropriate next steps a claimant and other group members of group 114 should take if there is insufficient evidence or evidence that fails to meet the threshold of proof to determine the incident claim's validity.

Group charter 204 may identify a method for determining which incident claims are eligible for a claimant who submitted that incident claim to be approved to receive a claim award, entitling the claimant to receive an incident claim payment from the premiums escrow at the end of the term. In certain embodiments, the identified method provides an unambiguous standard for determining the validity of an incident claim (e.g., the criteria for validity, described below).

Group charter 204 may provide written guidelines that allow group members (e.g., users 112) to determine whether an incident claim is valid. A primary purpose for the existence of group 114 is to provide guidance on the evaluation of incident claims. In general, group charter 204 allows an average group member to determine whether an approved incident claim (e.g., approved by the secretary) is valid before the group member agrees to pay the approved incident claim (or, alternatively in certain embodiments, to defect from the group). Defection is an action taken by a group member who is a policyholder to deny payment to an approved incident claim (e.g., an incident claim approved by the secretary).

In certain embodiments, a goal of group 114 (and system boo generally) is to create a permanent, tamper-proof, authoritative legal record. This record takes the form of a notarized database that time stamps transactions. A transaction to either pay or defect against an approved incident claim allows a policyholder to express his or her judgement about that incident claim. When taken collectively, the entirety of all transactions within group 114 allows an outside entity to determine whether an incident claim fractured a social consensus of group 114. By monitoring the effect an incident claim has on the social consensus of group 114, outside observers can gain valuable information about the validity of an incident claim. Without knowing any details about an incident claim, payments made to a claimant provide a tamper proof record of attestations made by policyholders. This provides group 114 with leverage the group members can use to convince outside entities as to the belief of group 114 about an incident claim. If system 100 provides a model for determining the likelihood that a single invalid incident claim could result in the collapse of group 114, then this attestation is valuable. Embodiments of this disclosure provide a simple heuristic that allows outsiders to determine the likelihood of the validity of an incident claim.

In certain embodiments, as clarity of group charter 204 declines, particularly regarding the method for evaluating incident claims, the likelihood of having honest defectors may decrease. If honest defectors are less likely to exist, then the ability of group 114 to collapse also decreases. If group 114 is less likely to or cannot collapse, then the value in the attestation of payments made to the claimant (e.g., attestation of incident claims) may be reduced.

It should be understood that the particular criteria for validity may depend on the types of incident claims contemplated by group 114 and the associated goals of the group members. For example, the criteria for validity of a sexual harassment incident claim may differ (partially or wholly) from the criteria for a police brutality incident claim or from the criteria for a health insurance deductible incident claim. Furthermore, even with a same category of incident claim (e.g., sexual harassment incident), different groups 114 (each having their own respective group charter 204, etc.) may establish different criteria for validity that apply to that group 114.

The information in group charter 204 regarding which participants are eligible to be group members and/or policyholders may include what training group 114 undertakes to prepare group members for the correct submission of incident claims, what training is required of the secretary to prepare the secretary to approve/deny incident claims, how quickly an incident claim must be opened from the time an incident occurs, what actions allow an individual to acquire group membership and eligibility for coverage from group 114, what actions result in group members becoming ineligible and being removed from group 114, and/or guidelines for dispute resolution within group 114.

Group pledge 206 includes a group member's affirmation to uphold the values of group charter 204. Just as group charter 204 may include a commitment to provide coverage to eligible policyholders, group pledge 206 is a group member's promise to enforce the rules specified in group charter 204. Although group pledge 206 is described below as including particular information, this disclosure contemplates group charter 204 including any suitable information.

In certain embodiments, group pledge 206 includes one or more of the following: an affirmation of the values held by group 114, a clear statement of the purpose of group 114, a clear statement of what the individual (the to-be group member) hopes to accomplish by participating in group 114, a promise to attend all required trainings for maintaining group membership, a promise to uphold the guidelines and standards taught in the training, a promise to always pay valid incident claims that meet the requirements of group charter 204 for group 114, a promise to defect against any invalid incident claims that is approved and receives a claim credit, a promise to immediately discontinue participation in group 114 once fraud is discovered (possibly even if fraud occurred in past terms), a promise to join subgroups that include policyholders that the group member knows and trusts, an agreement to pay an overpayment in addition to a base premium, and/or an acknowledgement that any dishonest defector (e.g., a policyholder who defects against a valid incident claim) will result in the subgroup members of the dishonest defector's subgroup forfeiting their overpayment.

Group membership information 208 may include may include any suitable information about the group 114. For example, group membership information 208 may include identifiers of the group members (users 112) of group 114, an identity of a secretary (described below) of group 114, the identity of a subgroup (described below) for each group member, the policyholder status (described below) of each group member (e.g., whether the group member is a policyholder for a current term), and any other suitable information about group members and group membership.

After receiving an invitation to participate in the group by the secretary, the recipient may access web portal 116 for group 114 to complete a group membership process. For example, the invitation may include an email link that the recipient can use to log into web portal 116 for group 114. The recipient can then create an account and sign group pledge 206 to uphold group charter 204. Once an individual signs group pledge 206 and completes the registration, the individual can log into web portal 116 for group 114 using the individual's registered account. In certain embodiments, having a registered account does not qualify the individual to pay a premium and receive coverage because only policyholders are eligible to pay premiums. The invitation also may include links or other information to facilitate the recipient obtaining a distributed ledger system interaction module (e.g., a digital wallet), described in greater detail below with reference to FIG. 3, for interacting with distributed ledger system 108 and making or receiving payments in cryptocurrency.

In certain embodiments, a particular group member is designated the leader, or secretary, of group 114. In the illustrated example, user 112a is designated the secretary, as indicated by the asterisk. The secretary may coordinate the activities of group 114. In certain embodiments, the secretary has access to certain features via web portal 116 to which other group members (other users 112) do not have access. For example, the secretary may be able to perform one or more of sending invites to individuals to become group members, removing group members, accessing unredacted versions of evidence submitted to support an incident claim, posting redacted versions of such evidence, approve/deny claim incidents, or other suitable features associated with managing group 114.

The secretary may have one or more of the following responsibilities: initializing group 114; facilitating conversion of premiums, refunds, rebates, and incident claim payments (e.g., in special cases where the secretary provides exchange services only); approving/denying incident claims, removing group members, and reorganizing group 114. Each of these responsibilities is described below.

Group initialization may include drafting the language of group charter 204 and group pledge 206. Group initialization may include establishing the parameters in group management processing system 104 that allow group members (e.g., users 112) to log into web portal 116 for group 114. These parameters also may serve to generate the an account of group 114 with distributed ledger system 108, including with self-executing agreement 106 and an associated cryptocurrency escrow(s) for group 114. In certain embodiments, the secretary, as part of group initialization, may personally invite each desired individual to be a group member and form subgroups with other group members. Group initialization may include training group members, including informing the group members of the rights and responsibilities of a group member. In certain embodiments, the secretary is required to participate in group 114 as a policyholder, including being a member of a subgroup, to obtain coverage.

The secretary may facilitate payments made through system 100. This may include assisting group members with using web portal 116 to pay premiums, access rebates, access refunds, finalize payment of incident claim awards, and/or access incident claim payments.

In certain embodiments, the secretary is responsible for approving or denying incident claims. In other words, the secretary may determine whether an incident claim should be approved to receive a claim credit, which entitles the associated claimant to receive an incident claim payment. As part of this determination, the secretary may hear the claimant and consider whether the evidence presented satisfies the criteria for validity established in group charter 204. If the secretary determines that the evidence presented satisfies the criteria for validity established in group charter 204, then the secretary approves the claim to receive a claim credit. As described in greater detail below, granting a claim credit to a claimant for an incident claim (based on approving the incident claim) may include whitelisting a payment address in distributed ledger system 108 for payment of incident claim payments and/or creating a claim token within distributed ledger system 108.

The secretary may be responsible for removing group members from group 114. In certain embodiments, the secretary is the only group member who can formally exclude existing group members from participating further in group 114. As just one example, a group member may be removed for violating group pledge 206 to uphold group charter 204. On the other hand, in certain embodiments, group members may leave group 114 of their own volition at any time.

The secretary may handle group reorganization, if appropriate. For example, the secretary may facilitate movement of group members between subgroups after group members pay their premiums. In certain embodiments, group members should move from subgroups with 2 or 3 members to subgroups with 4, 5, or 6 members to obtain coverage (become policyholders). In certain embodiments, the secretary is the only group member who can perform this function.

As described above, group information 122 may include incident claim records 210, which may include information regarding incident claims submitted by claimants. A claimant is a policyholder who feels he or she has an eligible incident claim that satisfies the requirements of group charter 204. To receive approval for a claim credit, a claimant discusses (verbally or in writing) the incident claim with the secretary. In certain embodiments, the secretary uses web portal 116 of group 114 to open a forum 212 through which policyholders can discuss the incident claim. Forum 212 could be hosted by group management system 104 or could be hosted by a third-party service.

An incident summary may be drafted or otherwise prepared. For example, the secretary may draft a summary of the incident associated with the incident claim based on the secretary's discussion with the claimant. As another example, the claimant may draft the summary, and the secretary may review (and possibly revise) the summary.

The incident summary and evidence associated with the incident claim may be uploaded to storage module 120 or another location (e.g., to a file sharing service) so that the other policyholders can review the evidence. For example, this evidence may include documents, which may be partially redacted for privacy concerns if appropriate. The secretary may verify the original unredacted documents. After consensus has been reached in the forum as to the validity of the incident claim, the secretary determines whether the incident claim is approved or denied to receive a claim credit. Once an incident claim is approved, a claim credit is issued which entitles the claimant to a claim payment at the end of the term.

Returning to FIG. 1, as described above, system 100 may include a distributed ledger system 108. Distributed ledger system 108 may be implemented as a decentralized blockchain platform. Distributed ledger system 108 provides distributed storage of data using a distributed ledger 124. In certain embodiments, distributed ledger 124 is a blockchain. Distributed ledger system 108 includes nodes 126 (N1, N2, N3, N4, N5, etc.) that interact in a peer-to-peer network, each storing a copy of distributed ledger 124.

The distributed ledger architecture described herein may be implemented in a computer or network of computers (e.g., nodes 126) having one or more processors executing instructions of software programs that are stored in one or more computer-readable storage. Nodes 126 may be connected through a public network, such as through the internet, in some embodiments. In other embodiments, nodes 126 may be connected through a private network, such as an internal company network, e.g., an intranet. In specific embodiments, nodes 126 are connected through a local area network (LAN). Although a particular number of nodes 126 are illustrated, distributed ledger system 108 may include any suitable number of nodes 126. In particular embodiments, distributed ledger system 108 includes 100 or more nodes 126.

The group policy for group 114 may be governed at least partially by a self-executing agreement 106 (e.g., a smart contract) operating on distributed ledger system 108 (operating on blockchain technology). For example, as described above, self-executing agreement 106 may implement one or more financial escrows for group 114. Self-executing agreement 106 may be implemented on multiple computing nodes (nodes 126) in a computer network. Nodes 126 may collaborate in a decentralized manner to operate a consensus network using blockchain or another distributed ledger technology. For example, distributed ledger system 108 uses a public or global ledger (distributed ledger 124) to confirm each transaction and operation on the global ledger using consensus. For example, the ETHERIUM platform uses a global ledger or blockchain that hosts and executes a Turing complete instruction set.

In certain embodiments, self-executing agreement 106 operates on the ETHEREUM blockchain which executes cryptocurrency transactions, known as ether powered transactions, as resource transactions and implements the software instructions of self-executing agreement 106 submitted to the ETHEREUM blockchain. In other embodiments, self-executing agreement 106 may operate on another type of decentralized computing system.

Distributed ledger 124 is an expanding list of records (blocks) that are linked using some form of cryptography. In distributed ledger system 108, a copy of distributed ledger 124 is stored on multiple (and possibly all) nodes 126 of distributed ledger system 108. Each record (block) in distributed ledger 124 includes a header and data for the current block, along with a hash of the header of the previous block in distributed ledger 124. An example record in the context of system 100 is described in greater detail below with reference to FIG. 7.

In certain embodiments, distributed ledger system 108 creates an immutable record of transactions (distributed ledger 124) that is stored in multiple (and possibly all) nodes 126 of distributed ledger system 108.

Self-executing agreement 106, which also may be referred to as a "smart contract," provides a set of instructions (e.g., software code) that perform certain actions based on the occurrence of certain events. Distributed ledger system 108 supports the use of public key cryptography, which enables users to sign transactions using the user's unique, specially generated cryptographic codes. A public key, which is a string of characters, is an address on the blockchain. A user 112 stores a private key (e.g., on user device 102), which operates like a pen generating unforgeable signatures that can later be verified by software running on distributed ledger system 108 (e.g., blockchain software) as authorizing transactions to move funds (e.g., cryptocurrency or other digital assets) from an associated public key address, which is known to distributed ledger system 108, including self-executing agreement 106. The public, however, including other users 112 and those other than users 112, may generally view published versions of distributed ledger 124. Transactions signed with private keys in a public key infrastructure have the property of being non-repudiable.

Self-executing agreement 106 implements the logic of the group policy implemented by group 114. Self-executing agreement 106 may be implemented as software code that is stored on multiple nodes 126 (and possibly all nodes 126) of distributed ledger system 108 and executed by the nodes 126 on which it is stored so that transactions are executed by each of those nodes 126, verified by each of those nodes 126, and stored on the version of distributed ledger 124 maintained by each of those nodes 126.

To pay premiums, group members may convert dollars (or another appropriate fiat currency) to cryptocurrency (e.g., a stablecoin, such as DAI) because self-executing agreement 106 may process and hold cryptocurrency (but possibly not fiat currency).

Self-executing agreement 106 escrows premiums in cryptocurrency each term, and pays out approved incident claims (to claimants who have received a claim credit) according to a set of rules written into the code of self-executing agreement 106. These rules are determined in part by group charter 204 and in part by the structure of the group coverage system. A copy of the code of self-executing agreement 106 is stored by each node 126 in distributed ledger system 108. When a particular number of nodes 126 have the same state after execution of self-executing agreement 106 within distributed ledger system 108, a consensus is reached. Transactions are transparent, but are anonymous or pseudonymous.

Self-executing agreement 106 is stored and executed in a distributed ledger, such as a block chain. Each transaction associated with self-executing agreement 106 is stored and verified by each of multiple nodes 126 in distributed ledger system 108 (e.g., a peer-to-peer network) that supports the distributed ledger 124. Nodes 126 verify each transaction. The use of self-executing agreement 106 and distributed ledger 124 provides a verifiable public record that is difficult or impossible to be repudiated by the parties to self-executing agreement 106. Distributed ledger 124 provides a distributed public record of the transactions associated with self-executing agreement 106. Thus, this system provides both non-repudiation and transparency.

Self-executing agreement 106 and distributed ledger system 108 may implement a self-executing agreement (e.g., smart contract) escrow for implementing the group policy desired by group 114. These financial escrows exist on distribute ledger 124 (e.g., blockchain) such as ETHEREUM and are enforced by self-executing agreement code. A smart contract is a self-executing agreement that establishes the terms of an agreement between members of a group that wish to provide each other group coverage for a certain category of incident claim. This agreement and the associated financial obligations of the participants are written into lines of code. This code is maintained within a distributed database (e.g., a decentralized blockchain network) and executed when transactions are sent across the decentralized blockchain network. These escrows effectively hold participant's premiums for a set term of any suitable length. At the end of the term, these escrows enforce the payment of valid claims approved by the group and verified by policyholders.

In operation of an example embodiment of self-executing agreement 106, self-executing agreement 106 may receive information regarding group 114. For example, self-executing agreement 106 may receive the information regarding group 114 from group management processing system 104. The information may include the group ID, an identification of the group members (which, in certain embodiments, are addresses of users 112 on distributed ledger system 108), a number of group members, information from group charter 204 for group 114, and any other suitable information that may be used by self-executing agreement 106 to implement the functions self-executing agreement 106 is designed to provide. In certain embodiments, the information from group charter 204 may include a length of a term, including a length of a premium payment stage (a pre-stage), a length of an active stage during which incident claims may be submitted), a length of a policyholder instruction and incident claim payment stage (a post-stage), a predetermined incident claim payment amount, and any other suitable information.

Self-executing agreement 106 may receive premiums from users 112, which as described above are group members of group 114. In certain embodiments, as described above, a group member must be a policyholder to be able to pay a premium. Thus, in certain embodiments, self-executing agreement 106 compares an identify of a user 112 who submits a premium to the group information received by self-executing agreement 106 to ensure that the user 112 from which a premium is received is qualified to submit such a premium. If self-executing agreement 106 determines that a particular user 112 is not qualified to submit a premium, then self-executing agreement 106 may reject the premium and not allocate the premium to a premiums escrow of group 114.

Self-executing agreement 106 may allocate received premiums to a premiums escrow for group 114. The premiums escrow is a cryptocurrency account stored on distributed ledger 124. In certain embodiments, the premiums escrow for the group was previously established by a member (e.g., a secretary) of group 114. In certain embodiments, allocating premiums to the cryptocurrency for group 114 includes actually depositing the premiums in the premiums escrow for group 114. In certain other embodiments, allocating premiums to the premiums escrow for group 114 merely identifies those premiums as having been preliminarily indicated by the policyholder to be possibly payable to a claimant at a later time.

The active stage then begins. As described above, the active stage is a time during which incident claims may be submitted by a claimant (who is a policyholder) for consideration by other policyholders. Self-executing agreement 106 may receive one or more notifications of incident claims. In certain embodiments, self-executing agreement 106 receiving a notification of an incident claim means the secretary approved the incident claim to receive a claim credit, entitling the claimant who submitted the incident claim to receive a payment from the premiums escrow for group 114. In certain embodiments, granting a claim credit to a claimant for an incident claim may include whitelisting a payment address in distributed ledger system 108 for payment of incident claim payments and/or creating a claim token within distributed ledger system 108.

For example, whitelisting a payment address may include the secretary notifying self-executing agreement 106 that a payment address (on distributed ledger 124) associated with the claimant who submitted the approved claim is approved for receiving payments from the premiums escrow for group 114 (e.g., as finalized by policyholders). In certain embodiments, ownership of an address (including a whitelisted address) associated with distributed ledger system 108 may not be transferred to another entity.

As another example, granting a claim credit to a claimant for an incident claim may include granting the claimant a token, such as an ERC-20 (or ERC-20-compatible) token. These tokens represent the entitlement of the claimant to receive an incident claim payment, potentially up to an amount equal to the coverage requirement divided by the estimated number of approved claims per term. Of course, in certain scenarios, the claimant may not actually receive an amount equal to the coverage requirement divided by the estimated number of approved claims per term. A token is transferrable, meaning that the claimant can assign the token to another entity (possibly for a payment or other consideration). The claimant could pursue this option for a number of reasons, including that the claimant would prefer an immediate cash payment (rather than waiting to the end of the term) or the claimant may wish to "sell" the risk that the actual incident claim payment is less than an amount equal to the coverage requirement divided by the estimated number of approved claims per term.

It is possible that during a particular active stage, no incident claims are received. In certain embodiments, in such a scenario, the policyholders receive a full rebate of the previously paid premiums, with the possibility that those premiums may be applied to a future term's premiums. For purposes of this example, it will be assumed that at least one incident claim is received. The active stage for submission of incident claims then ends.

Self-executing agreement 106 may receive premium-handling instructions, which also may be referred to as payment instructions, for one or more policyholders for each incident claim. As described above, a policyholder may finalize a premium, meaning that the policyholder is validating the incident claim and agreeing that an appropriate portion of the policyholder's premium be paid to the claimant as an incident claim payment. As another example, a policyholder may defect, meaning that the policyholder does not agree with the secretary's decision to approve the incident claim and requests a refund of the premium.

One or more policyholders may fail to provide an explicit premium-handling instruction. In certain embodiments, if a particular policyholder does not provide premium-handling instructions for an incident claim, the lack of instructions will be considered a finalization of the premium such that it will be paid to the claimant. In other words, in such embodiments, self-executing agreement 106 will assume that a lack of instruction from a policyholder is an instruction to validate the incident claim (and pay an incident claim payment to the claimant).

Self-executing agreement 106 may determine, based on the premium-handling instructions from policyholders, whether any refunds of premiums are requested. In other words, self-executing agreement 106 determines whether any policyholders are defecting from group 114. The request for a refund from a policyholder may be considered a defection request.

If self-executing agreement 106 determines that one or more policyholders have requested a refund of their premium, then self-executing agreement 106 causes those policyholders to have their respective premiums paid as a refund from the premiums escrow of group 114. For example, self-executing agreement 106 may cause the policyholder who requested a refund to be paid their respective premiums from the premiums escrow of group 114 by causing a payment in the amount of the premium to be transferred from the premiums escrow of group 114 to the cryptocurrency account of the defecting policyholder. Self-executing agreement 106 then calculates the available funds in the premiums escrow of group 114, as described below.

If self-executing agreement 106 determines that no policyholders have requested a refund of their premium, self-executing agreement 106 calculates the available funds in the premiums escrow of group 114 according to the premium-handling instructions from policyholders, the number of incident claims, and other information.

Self-executing agreement 106 may calculate incident claim payments to be paid to the one or more claimants associated with the incident claims for which notifications were received.

Self-executing agreement 106 may cause the one or more claimants to be paid the determined incident claim payments. For example, self-executing agreement 106 may cause the one or more claimants to be paid the determined incident claim payments from the premiums escrow of group 114 by causing a payment in the amount of the incident claim payment to be transferred to the respective cryptocurrency accounts of the one or more claimants.

The value of an incident claim payment may be provided in group charter 204. If sufficient funds exist in the premiums escrow for group 114 to pay all incident claim payments for the current term in full, then self-executing agreement 106 attempts to do so. If insufficient funds exist in the premiums escrow for group 114 to pay all incident claims for the current term in full, then self-executing agreement 106 may divide the available funds between all incident claim payments issued in the same term. Because the premiums escrow for group 114 does not hold reserves, some incident claim payments may be underpaid. If policyholders are willing to pay large monthly premiums in expectation of receiving large rebates, this dynamic may change. When premiums are large, the number of incident claim payments that can be paid in full increases.

If, for a term, the premiums paid by group members exceed the value of the approved incident claims for the term, then the following may be true:

$$\frac{\text{Premiums paid}}{\text{Claims awarded}} = \text{full claim payment} + \text{rebates}$$

If, for a term, the value of the approved incident claims exceeds the premiums paid by group members, then the following may be true:

$$\frac{\text{Premiums paid}}{\text{Claims awarded}} = \text{partial claim payment}$$

Additionally, the following may be true:

$$\frac{\text{Expected premiums}}{(\text{Estimated \# claims})(\text{value of claim payment})} =$$

expected claim payment is $X$ % of claim award

As an example:

$$\frac{\$1000}{(x \leq 2)(\$500)} = 100\%$$

After paying incident claim payments, self-executing agreement 106 may determine whether funds remain in the premiums escrow of group 114. For example, after paying refunds to defecting policyholders (if applicable) and incident claim payments to one or more claimants, the premiums escrow of group 114 may still include funds. If self-executing agreement 106 determines that no funds remain in the premiums escrow of group 114, then self-executing agreement 106 may not pay a rebate to remaining policyholders.

If self-executing agreement 106 determines that funds remain in the premiums escrow of group 114, then self-executing agreement 106 calculates rebates for one or more qualifying policyholders. Self-executing agreement 106 causes the one or more qualifying policyholders to be paid the calculated rebates from the remaining funds of the premiums escrow of group 114 by causing a payment in the amount of the rebate to be transferred to the respective cryptocurrency accounts of the qualifying policyholders.

Self-executing agreement 106 may generate one or more records. For example, self-executing agreement 106 may generate a record for each incident claim. As another example, self-executing agreement 106 may generate a record 700 that includes all of the incident claims for the current (as in just completed) active stage of the term. An example record is described below with reference to FIG. 7.

Self-executing agreement 106 may validate the one or more generated records with other nodes 126 (e.g., other than the node 126 on which this instance of self-executing agreement 106 is executing) in distributed ledger system 108. For example, self-executing agreement (and the associated node 126 on which this instance of self-executing agreement 106 is executing) may use any of a variety of consensus techniques for validating the one or more records 700. Such consensus techniques may include one or more of practical Byzantine fault tolerance, proof-of-work, proof-of-stake, delegated proof-of-stake, or any other suitable consensus mechanism executed by nodes 126 of distributed ledger system 108.

If the one or more records are not validated, then the node 126 on which this instance of self-executing agreement 106 is executing discards the one or more records 700 and obtains a validated copy of the one or more records from another node 126 in distributed ledger system 108. If the one or more records are validated, then self-executing agreement 106 causes the one or more records to be stored in an instance of distributed ledger 124 stored by the node 126 on which this instance of self-executing agreement 106 is executing.

Self-executing agreement 106 may determine whether group 114 terminated. For example, self-executing agreement 106 may receive a notification that group 114 terminated prior to a next active stage for group 114. If self-executing agreement 106 determines that group 114 has not terminated, then self-executing agreement 106 may wait for any updates to the information regarding group 114 until the next term begins.

Additional details regarding defection, subgroups and overpayments, and group collapse are now described. Valid incident claims may be submitted by claimants, approved by a secretary, and then paid by policyholders. In certain embodiments, any policyholder can defect against an incident claim and deny payment of that incident claim. Defectors receive back the premium they paid at the start of the term, as well as their overpayment if applicable. In certain embodiments, policyholders who defect against incident claims are barred from further participation with group 114.

Certain embodiments provide a subgroup/overpayment mechanism to provide additionally accountability among smaller groups with the overall group. A subgroup may be a set of group members (e.g., some or all of users 112) who are eligible to obtain coverage from group 114. In certain embodiments, a subgroup is 4 to 7 group members; however, subgroups may be different sizes if determined to be appropriate for particular implementations. In certain embodiments, after being invited to participate in group 114, group members (e.g., users 112) may be required to form subgroups. Subgroup formation allows group members to approve others for coverage who have a similar risk profile to themselves. If a group member cannot form a subgroup with other group members, it may be because the risk profile of that group member is perceived to be much higher than the average policyholder. In certain embodiments, without joining an appropriate subgroup (e.g., with a target size of 4 to 7 group members), a group member cannot become a policyholder. In certain embodiments, if a group member is not a policyholder, the group member is not permitted to pay a premium. In certain embodiments, without paying a premium, the group member is not qualified to obtain coverage from group 114. In certain embodiments, subgroup members are generally likeminded individuals who have decided beforehand to either defect or remain as a group rather than act selfishly as individuals.

In certain embodiments, members of a subgroup pay an overpayment. That is, the total premium paid by a member of a subgroup includes a base premium (allocated to the premiums escrow of group 114) and an overpayment (allocated to an overpayment escrow of the member's subgroup). An overpayment may be a bet that the other subgroup members of a policyholder's subgroup will not become dishonest defectors. A dishonest defector is one that defects against a valid claim. In certain embodiments, it may be assumed that dishonest defectors act alone or in pairs. When a dishonest defector denies paying a valid incident claim (e.g., by defecting), the remaining subgroup members of the subgroup compensate to pay the defector's missing portion. An overpayment is a fraction of the value of a premium. In certain embodiments, the following formula may be used to determine the amount of an overpayment from each subgroup member:

$$\frac{1}{(1 - \# \text{ subgroup members})} * \text{premium} = \text{overpayment}$$

When a dishonest defector in a particular policyholder's subgroup defects against a claim the particular policyholder believes is valid, the particular policyholder's overpayment is lost to compensate for the defection of the dishonest defector (who is refunded his/her base premium and overpayment upon defecting). When a particular policyholder has no defections in the particular policyholder's subgroup, the particular policyholder is refunded the particular policyholder's overpayment. The cycle of paying an overpayment and having the overpayment returned continues until a defection occurs. Because a defector leaves with the defector's overpayment, policyholders are encouraged to defect as a group to avoid imposing a financial penalty upon other members of their subgroup. The potential for incurring a small financial penalty encourages subgroup members to act corporately to either defect or pay claims together.

In a particular example, five group members form a subgroup, each paying an overpayment of $5.00, for a total of $25.00. In this example, it also will be assumed that the base premium is $20.00. Thus, if one of the subgroup members defects (meaning that defector receives back both their base premium ($20.00) and their overpayment ($5.00)), the remaining 4 group members of the subgroup can cover the cost of the defecting group member's premium with their collective overpayments (totaling $20.00, the cost of the base premium).

If all subgroup members in a subgroup defect, all subgroup members of the subgroup are refunded both their base premium and their overpayment. In certain embodiments, a group member only loses their overpayment bet if that group member is a loyalist and the subgroup contains a dishonest defector.

In certain embodiments, a policyholder includes a group member who belongs to a subgroup that includes an appropriate range of (e.g., 4-7) other group members. In certain embodiments, policyholders are encouraged, if not required, to know and trust the other policyholders of the subgroup. Because policyholders are financially punished if their subgroup contains a dishonest defector, policyholders may be financially and/or socially discouraged from forming a subgroup with other policyholders not personally trusted. Policyholders may have one or more of the following responsibilities: forming subgroups, paying premiums, validating claims (where appropriate), and defecting (where appropriate). Each of these responsibilities is described below.

In certain embodiments, policyholders are not obligated to form a subgroup with anyone they do not personally trust. Other members may have a higher than average risk profile. By excluding high risk individuals from joining their subgroup the members of a community are given the choice to exclude high risk individuals from obtaining coverage.

In certain embodiments, policyholders pay a premium into a premiums escrow for group 114 at the start of each term (e.g., the start of each month), the premiums escrow being managed by self-executing agreement 106. In certain embodiments, policyholders are obligated to pay an overpayment (e.g., as part of the subgroup membership) into an overpayment escrow for the subgroup to deter members of their subgroup from becoming dishonest defectors, the overpayment escrow being managed by self-executing agreement 106.

In certain embodiments, policyholders review claims that are approved by the secretary to receive a claim credit and determine whether the claims satisfy the criteria for validity established by group charter 204. A policyholder may finalize payment of premium to all valid claimants. If a policyholder believes that an approved claim (a claim approved by the secretary) is invalid, the policyholder may defect with the policyholder's premium.

In certain embodiments, if a policyholder defects, the policyholder leaves the group with the policyholder's premium and overpayment. Subgroups and overpayments seek to discourage dishonest defectors and encourage honest defectors. They accomplish this by encouraging subgroup members to coordinate prior to defecting against a claim, so that the subgroup members can recover their overpayments. Subgroups are designed to provide financial incentives for the policyholders in a subgroup to make the same decision. Ideally, the appropriate decisions for a policyholder (and the policyholder's subgroup) are to finalize payment to valid incident claims and defect against invalid incident claims. However, a policyholder also may choose to deny payment of a valid incident claim (likely by defecting) or finalize payment to an invalid incident claim.

In certain embodiment, an outside entity is interested in confirming that invalid incident claims are denied payment and is not concerned with instances in which valid claims are denied payment. For example, this may be because denying valid claims only impacts those within the group. Approving invalid incident claims, however, could potentially negatively impact others outside the group.

In certain embodiments, three types of defectors exist: dishonest defectors, contingent defectors, and honest defectors. A dishonest defector is a policyholder within a subgroup who defects alone, typically against a valid claim. A contingent defector cannot be immediately identified as either a dishonest or an honest defector without additional information. When a pair of policyholders from the same subgroup defects within the same term they are initially labeled as contingent defectors. Contingent on other pieces of information from other subgroups, these contingent defectors are later determined to be either dishonest defectors or honest defectors. An honest defector is a policyholder in a group of three or more policyholders from the same subgroup who defect together. It may be possible to determine the validity of a defection on the basis of its relationship to other subgroup members. This is because policyholders are incentivized to defect together.

If an invalid incident claim is approved to receive a claim credit, policyholders have the option to defect and leave the group. For example, if the secretary approves an incident claim that a policyholder believes is invalid (e.g., according to the methods and standards defined in group charter 204), then that policyholder can withhold payment of that policyholder's premium to the claimant and instead request a refund of the premium.

Returning to the components of system 100 shown in FIG. 1, network 110 facilitates wireless or wireline communication. Network no may communicate, for example, IP packets, Frame Relay frames, Asynchronous Transfer Mode (ATM) cells, voice, video, data, and other suitable information between network addresses. Network no may include one or more LANs, radio access networks (RANs), metropolitan area networks (MANs), wide area networks (WANs), mobile networks (e.g., using WiMax (802.16), WiFi (802.11), 3G, 4G, 5G, or any other suitable wireless technologies in any suitable combination), all or a portion of the global computer network known as the Internet, and/or any other communication system or systems at one or more locations, any of which may be any suitable combination of wireless and wireline.

To provide a concrete example implementation of a group policy, assume an example group ("Group XYZ") that includes 100 group members is implemented. In this example, it will be assumed that Group XYZ has formed to provide a group with coverage for sexual harassment incidents. The group charter describes a detailed standard for evaluating sexual harassment claims, and all 100 group members have signed the group pledge (thus making them "group members"). The term is 36 days, with a 3 day pre-stage for payment of premiums followed by a 30 day active stage during which claims may be submitted. A 3 day post-stage for receiving instructions from policyholders (finalize payment or refund request (defection)) and payment of any incident claim payments, refunds, and/or rebates follows the 30 day active stage. The charter establishes an incident claim payment amount of $1000, with an estimated number of approved incident claims (claim credits) per month being 2.

All 100 group members have joined a subgroup. For ease of illustration, it will be assumed that the subgroups each have 5 group members, meaning that 20 subgroups exist. In reality, subgroups might or might not all have the same number of members.

Because all group members have joined a subgroup, in this example all group members are eligible to become policyholders and are obligated to pay a premium, which includes a base premium and an overpayment. The base premium is calculated by multiplying the estimated number of approved incident claims (claim credits) per month (2 in this example) by the incident claim payment amount established in the group charter ($1000 in this example) (for a total of $2000), and then dividing the result by the number of policyholders (100 in this example). In this example, the base premium is $20 ($2000/100). The base premiums are allocated to a premiums escrow for Group XYZ. Because each subgroup includes 5 group members, the overpayment due for covering the cost of 1 dishonest defector within the subgroup is $5. Each subgroup has an associated overpayment escrow, to which overpayments paid by subgroup members are allocated. This means the total premium owed by each policyholder is $25 for one term, $20 for the base premium and $5 for the subgroup overpayment. The premiums escrow for Group XYZ includes a total of $2000 from base premium payments, and each subgroup overpayment escrow includes $25, with a total of the subgroup overpayment escrows being $500. In an alternative example, the premiums escrow of Group XYZ and the overpayment escrows of the subgroups could be combined into a single escrow.

Continuing with the example for Group XYZ, assume that all 100 group members of Group XYZ paid their premiums within the 3 day pre-stage of the term for paying premiums. In certain embodiments, each group member of Group XYZ uses web portal 116 to facilitate payment of premiums, by accessing self-executing agreement 106 and indicating a desire to designate a cryptocurrency payment (likely in DAI or another similar stablecoin or stable asset cryptocurrency) from the group member's cryptocurrency account to the premiums escrow for Group XYZ, signing the designation with the group member's private key. In this example, the group member indicates a desire to pay the base premium amount ($20) to the Group XYZ's premiums escrow and a desire to pay the overpayment amount ($5) to the subgroup overpayment escrow. Self-executing agreement 106 then apportions that group member's cryptocurrency base premium payment to the premiums escrow for Group XYZ and the group member's cryptocurrency overpayment amount to the subgroup's (the particular subgroup of which this group member is a member) overpayment escrow. After the 3 day pre-stage for paying premiums, the active stage of the term begins.

In a first concrete example, during the active stage, suppose a single claimant submits an incident claim. The claimant may discuss the incident with the secretary of Group XYZ, and the secretary may create an online forum for group members to discuss the incident claim. If applicable, any documents or other evidence may be stored in storage module 120 (e.g., as part of group records 122). If appropriate, the secretary may upload the documents, with suitable redactions (e.g., to maintain anonymity of the claimant and/or other individuals connected to the incident), with the secretary possibly maintaining an unredacted original version. The group members may then discuss the merits of the incident claim, while adhering to the standards established by the group charter. Based on this discussion, the secretary may approve or deny the incident claim. If the secretary approves the claim incident claim, the claimant is granted a claim credit.

If the secretary denies the single incident claim, then all group members receive a full rebate of their base premiums (which was contingent on there being funds remaining in the premiums escrow) at the end of the post-stage. If there are no defectors, then all subgroup members receive a full return of their overpayment (which was contingent on there being no defectors in a given subgroup) at the end of the post stage. This takes place during the, for example, 3-day post stage for payment of any incident claim payments, refunds, and/or rebates. The policyholder is then free to apply this rebate to a future term's premium payment. If any group member is sufficiently unhappy with the decision, that group member is free to leave Group XYZ by not paying the premium for the next term.

If the secretary approves the incident claim, then the secretary creates a record of the incident claim with self-executing agreement 106. Group members of Group XYZ can then access self-executing agreement 106 and finalize a payment to the claimant or request a refund (defect from Group XYZ). Suppose a single group member defects, and that group member is a member of subgroup H. At the end of the active stage (e.g., during the 3 day post-stage for payment of any incident claim payments, refunds, and/or rebates), self-executing agreement 106 performs a number of calculations and executes certain actions.

For example, self-executing agreement 106 automatically refunds the single defector's premium to the single defector. The amount refunded to the single defector includes both the base premium ($20) from the premiums escrow of Group XYZ and the overpayment ($5) from the overpayment escrow of subgroup H. The remaining four members of subgroup H lose their overpayments ($5 each for a total of $20), which is allocated to the premiums escrow of Group XYZ to make up for the lost base premium of the defecting member of subgroup H.

Taking into account the number of defectors and the amounts that will be refunded to those defectors, as well as the amounts contributed to the premiums escrow for Group XYZ (in this example, $20 from the overpayment escrow of subgroup H), self-executing agreement 106 calculates the remaining amount in the premiums escrow of Group XYZ, which in this example is the full $2000. Self-executing agreement 106 causes the incident claim payment amount of $1000 to be paid to the claimant using funds from the premiums escrow of Group XYZ.

Because an amount still remains in the premiums escrow for Group XYZ at the end of the term ($2000 minus the $100$n$ paid to the single claimant for a remaining amount of $100$n$), self-executing agreement 106 will cause a rebate to be paid to the remaining (non-defecting) 99 group members. In other words, self-executing agreement 106 will cause a rebate payment of $1000/99 to be paid to each remaining policyholder from the premiums escrow for Group XYZ. This means that all 99 remaining group members receive a rebate of approximately half of the base premium because only 1 incident claim payment was paid and only one policyholder defected. The remaining four group members of subgroup H each lose their overpayment ($5 each) from the overpayment escrow for subgroup H to make up for the lost premium of the defecting group member from subgroup H, while the other group members of Group XYZ (95 group members) receive a return of their overpayment ($5 each). Thus, self-executing agreement 106 calculates the amounts and causes the rebates to be paid from the remaining amount in the premiums escrow for Group XYZ and from the remaining 19 subgroup overpayment escrows to the respective subgroup members of Group XYZ.

Self-executing agreement 106 generates a record of the incident claim and the transactions associated with the processing of the incident claim by group XYZ. The record may be a collection of records (e.g., blocks) stored by self-executing agreement 106 executing on a node 126 in that node's version of distributed ledger 124 (e.g., blockchain), each record in the collection of records verified by coming to a consensus with other nodes 126. The records may include a profile of Group XYZ (including, in certain embodiments, group ID of Group XYZ/group name of Group XYZ, group charter 204 of Group XYZ, group pledge 206 of Group XYZ, and incident validity information associated with incident claims of which self-executing agreement 106 was notified for the current term. The incident validity information may indicate whether or not the claim was paid by policyholders, including the number of policyholders who defected against the incident claim; for each policyholder who defected against the incident claim, a category of the defector (e.g., honest, dishonest, or contingent); an indication of how many policyholders were left in subgroups with less than a minimum allowable number of group members (e.g., 3 group members in one example) after defections of policyholders are determined; and an indication of whether Group XYZ collapsed as a result of defections and an increase in the number of ineligible policyholders.

Returning to the active stage, in a second concrete example, suppose two claimants submit incident claims in the active stage rather than just one. If the secretary denies both incident claims, then all group members receive a full rebate of their base premiums (which was contingent on their being funds remaining in the premiums escrow) at the end of the post stage. This rebate may then be applied to the policyholder's premium payment in a future term. If there are no defectors, then all subgroup members receive a full return of their overpayment (which was contingent on there being no defectors in a given subgroup) at the end of the post stage. This return of the policyholder's overpayment may then be applied to the policyholder's next overpayment in a future term.

If any group member is sufficiently unhappy with either decision, that group member is free to leave Group XYZ by not paying the premium for the next or another future term. If the secretary denies one incident claim but approves the other incident claim, then the scenario essentially tracks the scenario described above with one incident claim approved (except that if any group member is sufficiently unhappy with the decision to deny the one incident claim, that group member is free to leave Group XYZ by not paying the premium for the next or another future term).

If the secretary approves both incident claims, then the secretary creates a record of each incident claim with self-executing agreement 106. Group members of Group XYZ can then access self-executing agreement 106 and finalize payment to the claimants or request a refund (defect from the group) for either incident claim. If a group member requests a refund for either incident claim for this term, then the group member defects from Group XYZ with a full refund of both the base premium and the overpayment. Suppose in this example that a single group member defects, and that group member is a member of subgroup H.

At the end of the active stage (e.g., during the 3 day post-stage for payment of any incident claim payments, refunds, and/or rebates), self-executing agreement 106 performs a number of calculations and executes certain actions. For example, self-executing agreement 106 automatically refunds the single defector's premium to the single defector. The amount refunded to the single defector includes both the base premium ($20) from the premiums escrow of Group XYZ and the overpayment ($5) from the overpayment cryptocurrency escrow of subgroup H. The remaining four members of subgroup H lose their overpayments ($5 each for a total of $20), which self-executing agreement 106 allocates to the premiums escrow of Group XYZ to make up for the lost base premium of the defecting member of subgroup H.

Taking into account the number of defectors and the amounts that will be refunded to those defectors, as well as the amounts contributed to the premiums escrow for Group XYZ (in this example, $20 from the overpayment escrow of subgroup H), self-executing agreement 106 calculates the remaining amount in the premiums escrow of Group XYZ, which in this example is the full $2000. Self-executing agreement 106 causes an incident claim payment amount of $1000 to be paid to each of the two claimants using funds from the premiums escrow of Group XYZ.

Because no amount remains in the premiums escrow for Group XYZ at the end of the term, in this example self-executing agreement 106 does not cause a rebate to be paid to the remaining (non-defecting) group members. The remaining four group members of subgroup H each lose their overpayment ($5 each) to make up for the lost premium of the defecting group member from subgroup H, while self-executing agreement 106 causes the other group members of Group XYZ (95 group members) to receive a rebate of their overpayment ($5) from each members' respective subgroup overpayment escrow. Self-executing agreement 106 generates records associated with the incident claims and the transactions associated with the processing of the incident claims by group 114, as described above.

Returning to the active stage of the second concrete example (with two incident claims), suppose in a third concrete example that the secretary approves both incident claims and that all members of subgroup H request a refund (defect). In this scenario, self-executing agreement 106 causes all five members of subgroup H receive a refund of both the base premium ($20.00 each) from the premiums escrow for Group XYZ and the overpayment ($20 each) from the subgroup overpayment escrow for subgroup H. Self-executing agreement 106 determines that the remaining amount in the premiums escrow for Group XYZ is $1900 ($2000 minus the $100 in premiums from the five defecting members of subgroup H).

In this scenario, the agreed-upon incident claim amount (coverage requirement), per group charter 204, is $1000 per incident claim, and, due to the defections, paying both incident claims ($2000) would exceed the total amount in the premiums escrow for Group XYZ ($1900). In this scenario, self-executing agreement 106 divides the amount available in the premiums escrow for Group XYZ ($1900) by the number of claimants (2), meaning that each claimant will receive $950. Additionally, because all funds from the premiums escrow for Group XYZ are being paid out to claimants, self-executing agreement 106 does not cause a rebate to be paid to the remaining 95 group members. On the other hand, because all 95 remaining group members are members of subgroups from which no one defected, self-executing agreement 106 causes all 95 remaining group members to receive a rebate of their overpayment ($20) from each members' respective subgroup overpayment escrow. Self-executing agreement 106 generates records associated with the incident claims and the transactions associated with the processing of the incident claims by group 114, as described above.

In certain embodiments, the fallout from the third concrete example includes that the five defectors are removed from Group XYZ and during a future term, premiums rise to meet the coverage requirement. In particular, because the coverage requirement remains $1000 for each of two claim incidents (for a total of $2000), the base premiums for the remaining 95 members is approximately $21.05, and the overpayment is approximately $5.26. This example demonstrates how establishing the coverage requirement in group charter 204 can cause premiums to be variable, generally rising as group members defect, which can by design destabilize a group if the group loses the ability to reach consensuses on the validity of incident claims.

Returning to the active stage, suppose in a fourth concrete example that three claimants submit incident claims in the active stage rather than just one, that the secretary approves all three incident claims, and that no group members defect. In this scenario, the agree-upon incident claim amount (coverage requirement), per group charter 204, is $1000, and paying all three incident claims would exceed the total amount in the premiums escrow for Group XYZ ($2000). In this scenario, self-executing agreement 106 divides the amount available in the premiums escrow for Group XYZ ($2000 since no one defected), which is sourced by the base premiums for the term, by the number of claimants (3), meaning that each claimant will receive approximately $666.67. Additionally, because all funds from the premiums escrow for Group XYZ are being paid out to claimants, self-executing agreement 106 does not cause a rebate to be paid to the group members. On the other hand, because no group member defected, self-executing agreement 106 causes all group members to receive a rebate of their overpayment ($20) from each member's respective subgroup overpayment escrow. Self-executing agreement 106 generates records associated with the incident claims and the transactions associated with the processing of the incident claims by Group XYZ, as described above.

It should be understood that Group XYZ and aspects associated with Group XYZ described above are used for illustrative purposes only. The particular numbers used and scenarios described might or might not be applicable to particular implementations.

Figure 3:
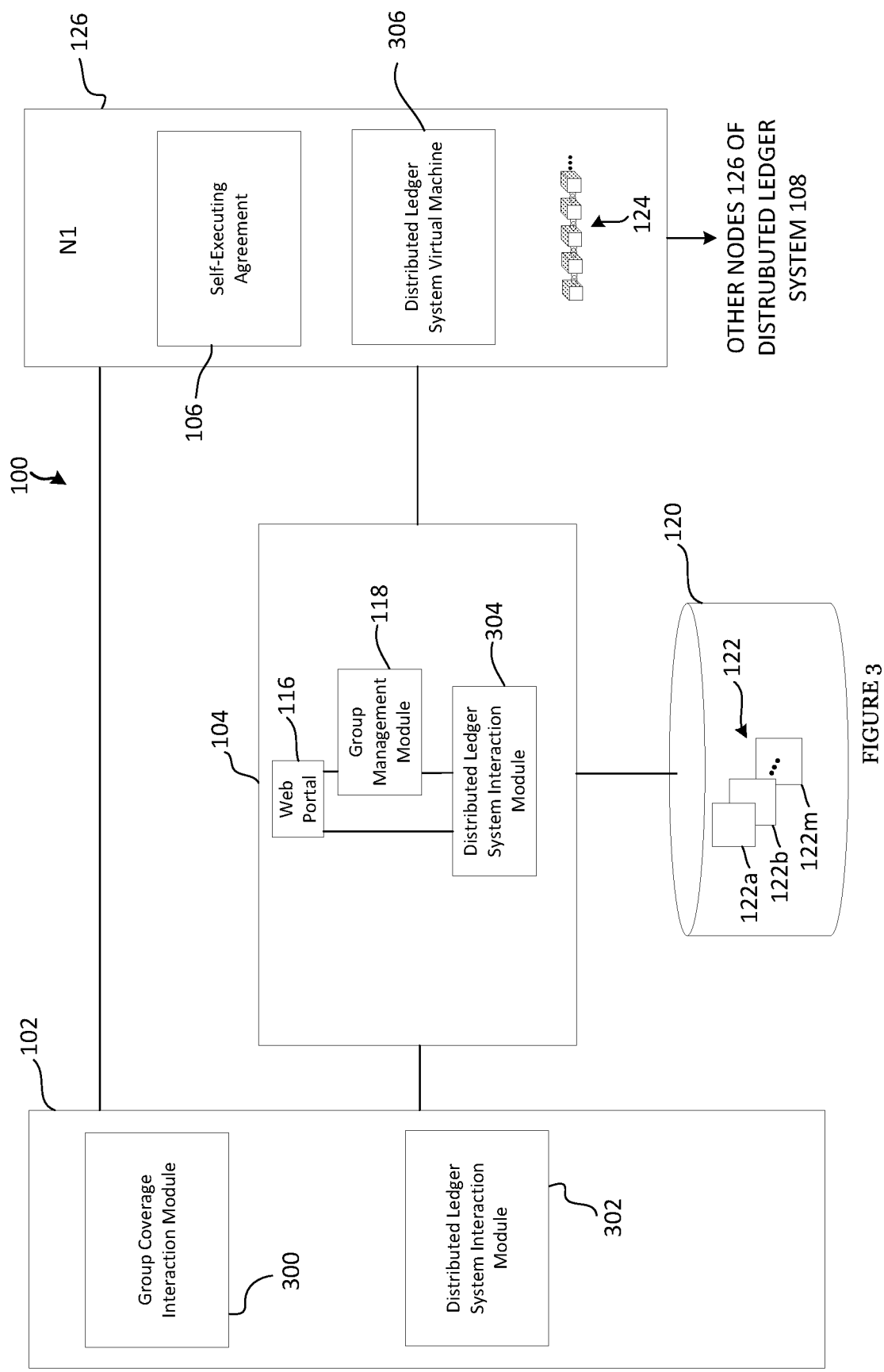
FIG. 3 illustrates additional details of certain components of the system of FIG. 1, according to certain embodiments of this disclosure.

FIG. 3 illustrates additional details of certain components of system 100, according to certain embodiments of this disclosure. In particular, FIG. 3 illustrates additional details of user device 102, group management processing system 104, and a node 126 of distributed ledger system 108. According to various embodiments, user device 102, group management processing system 104, and node 126 are coupled together to communicate information and implement the various functions of system 100.

In the example of FIG. 3, user device 102 includes group coverage interaction module 300. Group coverage interaction module 300 may be implemented in a web browser, an application (e.g., a desktop application and/or a mobile application), or in any other suitable manner. As just one example, in an embodiment in which group coverage interaction module 300 operates in a web browser of user device 102, group coverage interaction module may be implemented using Hypertext Markup Language (HTML).

In general, group coverage interaction module 300 provides a user 112 of user device 102 with access to web portal 116, and potentially to other features available via network 110 of FIG. 3. For example, a user 112 of user device 102 may access web portal 116 using group coverage interaction module 300 to perform operations made available to users 112 via web portal 116.

Distributed ledger system interaction module 302 may be implemented as a browser extension/plug-in, desktop application, mobile application, web application, or in another suitable manner. In one example, distributed ledger system interaction module 302 is cryptocurrency wallet software that is configured to facilitate communication between user device 102 and distributed ledger system 108, in part to implement transactions in distributed ledger system 108 on behalf of the user 112 of user device 102. As just a few examples, distributed ledger system interaction module 302 may be METAMASK, MYCRYPTO, TRUSTWALLET, MYETHERWALLET, ARGENT, COINBASE WALLET, GNOSIS SAFE, and the like.

Distributed ledger system interaction module 302 may be configured to assist a user 112 of user device 102 with establishing a cryptocurrency account, obtaining an address (e.g., an ETHEREUM wallet) for use with transactions effected using distributed ledger system 108, and facilitating transactions (e.g., exchange/transfer/receipt of cryptocurrency) on behalf of user 112. For example, distributed ledger system interaction module 302 may generate public-private key pairs using a cryptographic method (e.g., elliptic curve cryptography) on behalf of user 112 that is compliant with distributed ledger system 108 (e.g., the ETHEREUM blockchain). Distributed ledger system interaction module 302 may use these key pairs to sign transactions that authorize payments from addresses holding cryptocurrency, allow user 112 to interact with self-executing agreement 106, or perform other actions particular to user 112 when interacting with distributed ledger system 108. To that end, distributed ledger system interaction module 302 may perform key management for user 112, including receiving and storing user 112's resource allocation address and access key, such as cryptocurrency public and private keys. In certain embodiments, because self-executing agreement 106 may be publically available on distributed ledger 124, which is often the case for decentralized blockchain technologies, the storage and management of private keys may be maintained on the side of the user (e.g., by distributed ledger system interaction module 302). In certain embodiments, distributed ledger system interaction module 302 generates the public-private keypair on user device 102.

User 112 of user device 102 may interact directly with distributed ledger system 108 (including with self-executing agreement 106 and distributed ledger 124) or may interact with distributed ledger system 108 (including with self-executing agreement 106 and distributed ledger 124) via web portal 116.

Group management processing system 104, as described above with reference to FIG. 1, may include web portal 116 and group management module 118. Additionally, in certain embodiments, group management processing system 104 includes distributed ledger system interaction module 304. Distributed ledger system interaction module 304 may be implemented as a browser extension/plug-in, desktop application, mobile application, web application, or in another suitable manner. In one example, distributed ledger system interaction module 304 is cryptocurrency wallet software that is configured to facilitate communication between group management processing system 104 and distributed ledger system 108, in part to implement transactions in distributed ledger system 108 on behalf of the group 114. As just a few examples, distributed ledger system interaction module 304 may be METAMASK, MYCRYPTO, TRUSTWALLET, MYETHERWALLET, ARGENT, COINBASE WALLET, GNOSIS SAFE, and the like.

Distributed ledger system interaction module 304 may be configured to assist the secretary (e.g., user 112a) of group 114 with obtaining an address (e.g., an ETHEREUM wallet) for use with transactions effected using distributed ledger system 108, initiating a premiums escrow for group 114, and facilitating transactions (e.g., exchange/transfer/receipt of cryptocurrency) on behalf of group 114. In certain embodiments, distributed ledger system interaction module 304 may assist a user (e.g., the secretary or another authorized individual) to modify self-executing agreement 106, if appropriate. Specifically, distributed ledger system interaction module 304 may generate public-private key pairs using a cryptographic method (e.g., elliptic curve cryptography) on behalf of user 112a that is compliant with distributed ledger system 108 (e.g., the ETHEREUM blockchain). Distributed ledger system interaction module 304 may use these key pairs to sign transactions that authorize payments from addresses holding cryptocurrency, allows user 112a to interact with self-executing agreement 106 on behalf of group 114, or perform other actions particular to group 114 when interacting with distributed ledger system 108. To that end, distributed ledger system interaction module 304 may perform key management for group 114, including receiving and storing user 114's resource allocation address and access key, such as cryptocurrency public and private keys. In certain embodiments, some of the features available with distributed ledger system interaction module 304 are provided through web portal 116; however, in certain embodiments, only particular users (e.g., the secretary) may use some or all of those features. Access to those features may be restricted in any suitable manner, according to particular needs.

As described above with reference to FIG. 1, group management processing system 104 may have access to storage module 120, and may store group information 122 in storage module 120. Group management processing system 104 may be used to manage multiple groups, each of which may have the same or different purpose behind providing group coverage and which might or might not have overlapping group members. Thus, in certain embodiments, group information 122 may include multiple instances of group information (e.g., group information 122*a* through 122*m*) and may be organized by group, such that the group information 122 for a particular group is accessible only to members of the particular group.

In certain embodiments, storage module 120 may store a correlation between identities of users 112 (members of group 114) and public keys of users 112, as part of group information 122 (e.g., as part of group membership information 208) for group 114. For example, when a user 112 registers the user's identity through web portal 116 (e.g., in response to an invitation from the secretary), group management processing system 104 may correlate the public key of user 112 with the identity of user 112. As such, the public key of user 112 may be stored by group management processing system 104 (e.g., in storage module 120) as part of group information 122. The identity of user 112 might not be public, but the public key is public. In certain embodiments, a user 112 can only register with group management processing system 104 (via web portal 116) with an email address to which the secretary sent the invitation to join group 114. In certain embodiments, the secretary is able to verify that each digital persona (e.g., associated with a respective public key) has a single unique offline real identity in a possession of a user device 102 that is granted permission to pay a premium.

Turning to node 126, which for purposes of this example is one node (N1) of the nodes 126 of distributed ledger system 108, node 126 includes self-executing agreement 106, distributed ledger 124, and distributed ledger system virtual machine 306.

Self-executing agreement 106 is includes the instruction base and associated data (e.g., related to group 114) of the self-executing agreement that is to be executed by node 126 (N1), as well as by other nodes in distributed ledger system 108.

Distributed ledger system virtual machine 306 may be a virtual machine one which self-executing agreement 106 executes and which is responsible for maintaining distributed ledger 124 and communication with other nodes 126 in relation to reaching a consensus regarding the results of executing self-executing agreement 106 and the content of records in distributed ledger 124. In an example in which self-executing agreement 106 and distributed ledger 124 are implemented using ETHEREUM, distributed ledger system virtual machine 306 may be the ETHEREUM virtual machine (EVM).

In certain embodiments, the instruction base for self-executing agreement 106 accessible to node 126 includes all the instructions or software code of self-executing agreement 106 available for execution on distributed ledger system 108 (e.g., on the blockchain). Distributed ledger system virtual machine 306 may be a virtual machine running the instructions of self-executing agreement 106 on, for example, the ETHEREUM blockchain and may perform some of the main operations of system 100 to perform the escrow operations of the group coverage arranged by group 114. These operations may include maintaining a premiums (cryptocurrency) escrow for group 114, processing payment of premiums (e.g., both base premiums and overpayments) by users 112 (policyholders), processing payment of rebates, processing payment of refunds, processing payment of incident claim payments, enforcing rules established by group 114 (rules that are written into the instruction base of self-executing agreement 106) related to when such payments are appropriate and who may make those payments, and storing a permanent record of transactions executed using self-executing agreement 106 in distributed ledger 124.

Figure 4:
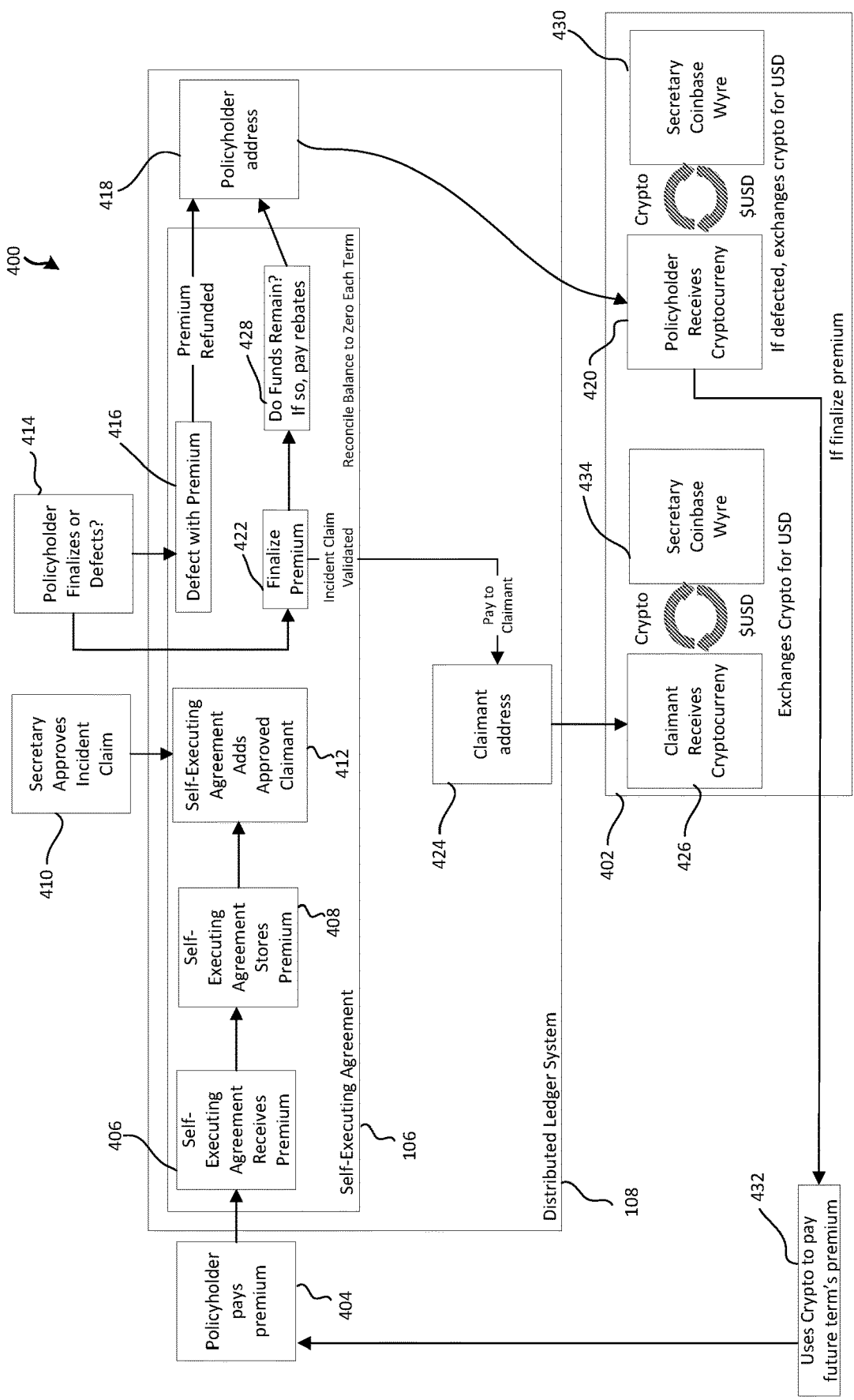
FIG. 4 illustrates an example premiums escrow layer and associated processing, according to certain embodiments of this disclosure.

FIG. 4 illustrates an example premiums escrow layer 400 and associated processing, according to certain embodiments of this disclosure. In this example, premiums escrow layer 400 includes self-executing agreement 106, distributed ledger system 108 (e.g., the ETHEREUM blockchain system), and an exchange layer 402.

As shown at block 404, a policyholder (e.g., a user 112 of a user device 102) pays a premium for a term (e.g., an upcoming term) during a pre-stage for paying premiums.

As shown at block 406, self-executing agreement 106 receives the premium the policyholder paid for the term. In certain embodiments, the premium includes a base premium and an overpayment, which may be made as a consolidated or as separate payments. Processing of an overpayment is described below with reference to FIG. 5, as well as elsewhere in this description. At block 408, self-executing agreement 106 stores the base premium in a premiums escrow for group 114. While the premiums escrow is for group 114, in certain embodiments, self-executing agreement 106 keeps premiums from different group members separated.

At block 410, at some point during the term, the secretary (e.g., user 112*a* in FIG. 1) approves an incident claim to receive a claim credit. As described above, this approval may follow interaction among group members 112 of group 104 regarding the merits of the incident claim in relation to the standards established in group charter 204.

At block 412, self-executing agreement 106 adds the claimant associated with the approved incident claim. For example, self-executing agreement 106 may open a record for the approved claimant, and the record may include an address of the claimant.

As shown at block 414, a policyholder finalizes an incident claim payment (a partial or complete payment of the policyholder's premium) to the claimant or defects with the policyholder's premium. This act by the policyholder is performed via self-executing agreement 106, so that self-executing agreement 106 can initiate actions based on the act of the policyholder (as well as the acts of other policyholders).

If the policyholder defects with premium (as shown at block 416), self-executing agreement 106 causes the policyholder's premium (including the base premium and, if applicable, the overpayment) to be refunded using the policyholder's address with distributed ledger system 108, as shown at block 418, and the processing proceeds to block 420, described below.

Returning to block 414, if the policyholder finalizes payment of an incident claim payment to the claimant (at block 422), then the claim is validated by that policyholder and at least a portion of the policyholder's premium is paid to the claimant using the claimant's address with distributed ledger system 108, as shown at block 424. The process then proceeds to block 426, described below. At block 428, self-executing agreement 106 determines whether funds remain in the premiums escrow for group 114, and if funds remain, self-executing agreement 106 rebates any remaining portion of the policyholder's premium to the policyholder's address with distributed ledger system 108, as shown at block 418. Although a single incident claim is described with respect to FIG. 4, more than one incident claim may be approved (and potentially validated by the policyholder) within a particular term. In certain embodiments, as part of this process, self-executing agreement 106 may return all balances to zero at the end of the term.

At block 420 (following either a refund of the policyholder's premium or a rebate to the policyholder's address at block 418), the policyholder receives the refund or rebate as cryptocurrency. The cryptocurrency may be stablecoin, such as DAI. If the policyholder received the cryptocurrency (at block 420) as a result of defecting at block 416, then the policyholder may exchange the cryptocurrency received at block 420 for fiat currency (e.g., U.S. dollars). If the policyholder received the cryptocurrency (at block 420) as a result of a rebate after finalizing payment of an incident claim payment to the claimant at block 422, then the policyholder may use the cryptocurrency received at block 420 as partial or full payment for a future term's premium as shown at block 432.

At block 426, following payment of an incident claim payment to the claimant at the claimant's address (at block 424), the claimant receives the cryptocurrency at block 426. The claimant may then exchange the cryptocurrency for fiat currency at block 434.

In the illustrated example, blocks 420, 426, 430, and 434 are part of an exchange layer 402, which is a functional layer responsible for converting funds between cryptocurrency and fiat currency (e.g., U.S. dollars).

Figure 5:
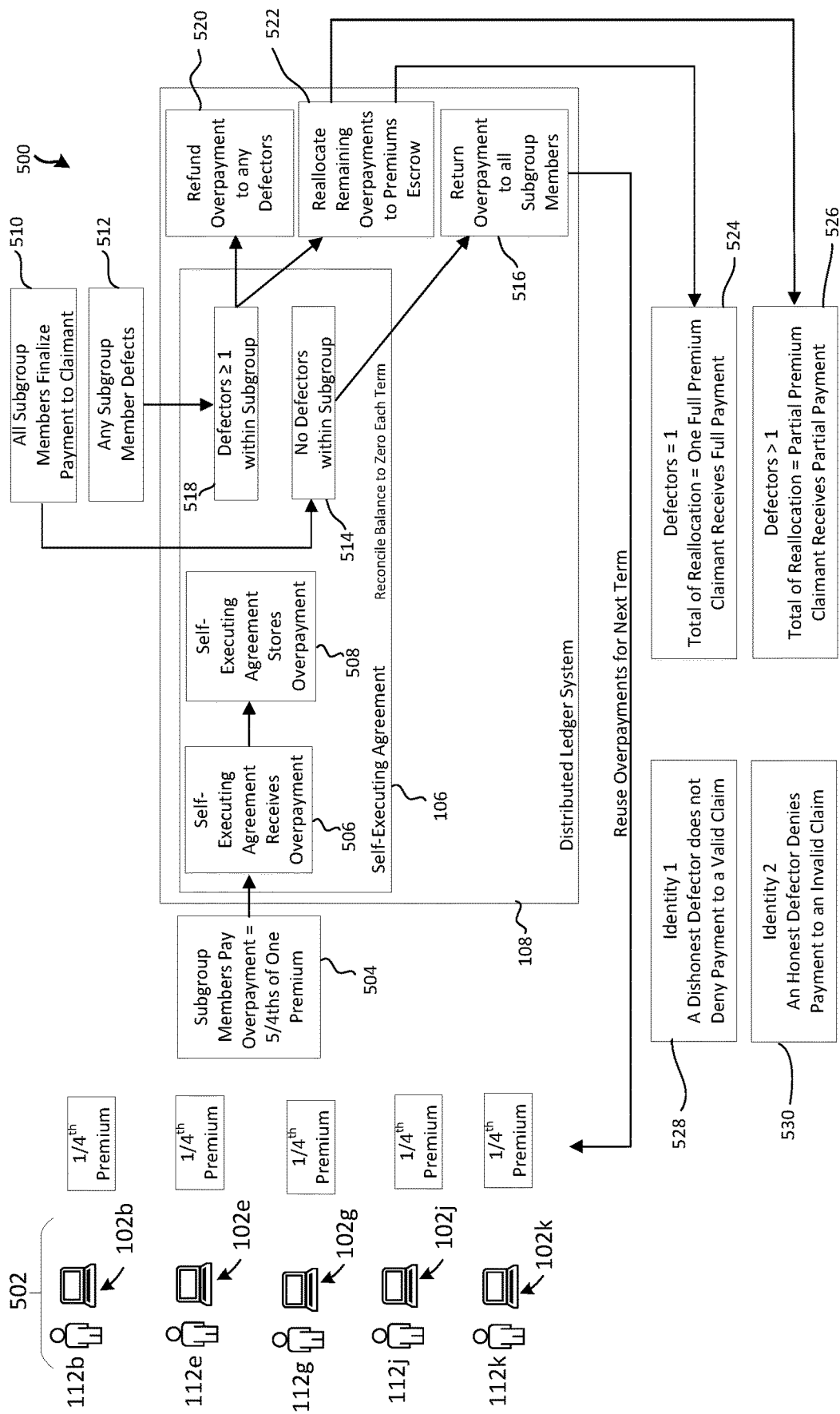
FIG. 5 illustrates an example overpayment escrow layer and associated processing, according to certain embodiments of this disclosure.

FIG. 5 illustrates an example overpayment escrow layer 500 and associated processing, according to certain embodiments of this disclosure. In this example, overpayment escrow layer 500 includes self-executing agreement 106 and distributed ledger system 108 (e.g., the ETHEREUM blockchain system).

In this example, users 112*b*, 112*e*, 112*g*, 112*j*, and 112*k* are members of subgroup 502, which is one of multiple subgroups of larger group (e.g., group 114). Furthermore, as described above, users 112*b*, 112*e*, 112*g*, 112*j*, and 112*k* likely know one another such that these users can hold each other accountable socially for actions taken regarding subgroup 502 and incident claims. Furthermore, self-executing agreement 106 is aware of the subgroup relationship of users 112*b*, 112*e*, 112*g*, 112*j*, and 112*k*, which can impact certain calculations and determinations made by self-executing agreement 106.

As shown at block 504, the members of subgroup 502 each pay an overpayment for a term (e.g., the immediately upcoming term) during a pre-stage for paying premiums. Since there are five subgroup members, each subgroup member pays an overpayment equal to $\frac{1}{4}^{th}$ of the (base) premium. The total of all overpayments of the subgroup members is $5/4^{ths}$ of a (base) premium such that if one subgroup member later defects, the other subgroup members can make up for the lost premium of the defecting subgroup member (who receives a refund of both the premium and the overpayment). As shown at block sob, self-executing agreement 106 receives the overpayment the subgroup member paid for the term. At block 508, self-executing agreement 106 stores the overpayment in an overpayment escrow for subgroup 502.

At some point during the active stage of the term, the secretary (e.g., user 112*a* in FIG. 1) approves an incident claim to receive a claim credit and notifies self-executing agreement 106 of the incident claim. As described above, this approval may follow interaction among group members 112 of group 104 regarding the merits of the incident claim in relation to the standards established in group charter 204. As described above, self-executing agreement 106 may add the approved claimant, such as by opening a record for the approved claimant that may include an address of the claimant.

As shown at blocks 510 and 512, members of subgroup 502 submit payment instructions, which may include finalizing payment to the claimant (block 510) or defecting (block 512). Members of subgroup 502 (and of other subgroups of the larger group (e.g., group 114)) may submit payment instructions via self-executing agreement 106, so that self-executing agreement 106 can initiate actions based on the act of the members of subgroup 502 (as well as the acts of members of other subgroups). Furthermore, in certain embodiments, as part of this process, self-executing agreement 106 may return the balance of the overpayment escrow of subgroup 502 (and all subgroups of the larger group (e.g., group 114)) to zero at the end of the term in the manner described below.

If all members of subgroup 502 finalize an incident claim payment (a partial or complete payment of the policyholder's premium) to the claimant, as shown at block 510, then at block 514 self-executing agreement 106 determines that no defectors from subgroup 502 exist, and at block 516, self-executing agreement 106 causes all members of subgroup 502 to receive a rebate of their overpayment (e.g., in a post-stage of the term), which can then be applied to paying some or all of the overpayment of a future term. For example, self-executing agreement 106 may rebate to each member of subgroup 502 that member's overpayment by transferring a payment in the amount of the overpayment from the overpayment escrow of subgroup 502 to the address with distributed ledger system 108 of that member of subgroup 502.

If any member of subgroup 502 defects, as shown at block 512, then at block 518, self-executing agreement determines that one or more defectors of subgroup 502 exists. At block 520, for any defecting member of subgroup 502, self-executing agreement 106 causes the defecting subgroup member's overpayment to be refunded from the overpayment escrow for subgroup 502 to the policyholder's address with distributed ledger system 108, as shown at block 520. As discussed above, self-executing agreement 106 also may refund the subgroup member's premium payment from the premiums escrow of the group (e.g., group 114). As shown at block 522, self-executing agreement 106 reallocates remaining overpayments in the overpayment escrow of subgroup 502 to the premiums escrow of the larger group (e.g., group 114). In other words, to at least partially make up for the loss of the one or more premiums of the defecting one or more members of subgroup 502, the other members of subgroup 502 lose their overpayments, which are added to the premiums escrow for the larger group.

As shown at block 524, if only one member of subgroup 502 defects (defectors=1), then the total of the reallocation performed at block 522 is one full premium payment and, assuming that the number of incident claims do not exceed the coverage requirement specified in group charter 204, the claimant receives (or claimants each receive) a full incident claim payment. That is, the total of the overpayments of the non-defecting members of subgroup 502 is sufficient to make up for the one lost premium that is refunded to the defecting member of subgroup 502.

As shown at block 526, if multiple members of subgroup 502 defect (defectors≥1), then the total of the reallocation performed at block 522 is a partial premium payment and the claimant may receive (or claimants each may receive) a partial incident claim payment. That is, the total of the overpayments of the non-defecting members of subgroup 502 is insufficient to make up for the multiple lost premiums that are refunded to the defecting members of subgroup 502.

As shown at blocks 528 and 530, certain assumptions may be made based on when analyzing defections from a subgroup, such as subgroup 502.

For example, as shown at block 528 (and what is referred to as Identity 1), one assumption is that a dishonest defector does not result in payment being denied to a valid claim (and further assuming that the number of claims do not exceed the coverage requirement). That is, in certain embodiments, a lone defector from a subgroup is considered a dishonest defector, and due to the remaining members of the subgroup making up for the loss of that lone defector's premium with the overpayments of the remaining members, the defection of that lone defector does not prevent payment of the incident claim in full (again, further assuming that the number of claims do not exceed the coverage requirement).

As another example, as shown at block 530 (and what is referred to as Identity 2), another assumption is that an honest defector may result in payment being denied (at least partially) to an invalid claim. An honest defector may be considered a defector in a subgroup (e.g., subgroup 502) who defects with at least one other member of the subgroup. For example, in certain embodiments, assuming that the estimated number of incident claims are awarded a claim credit for a given term as specified in group charter 204, the defection of at least two members of subgroup 502 means that the overpayments of the remaining members of subgroup 502 are insufficient to make up for the lost premiums of the at least two defecting members of subgroup 502, meaning that the claimants only receive a partial payment of an incident claim.

Additional aspects of the subgroup/overpayment mechanism of certain embodiments of this disclosure are described elsewhere in this disclosure and are incorporated by reference to the description of FIG. 5.

Figure 6:
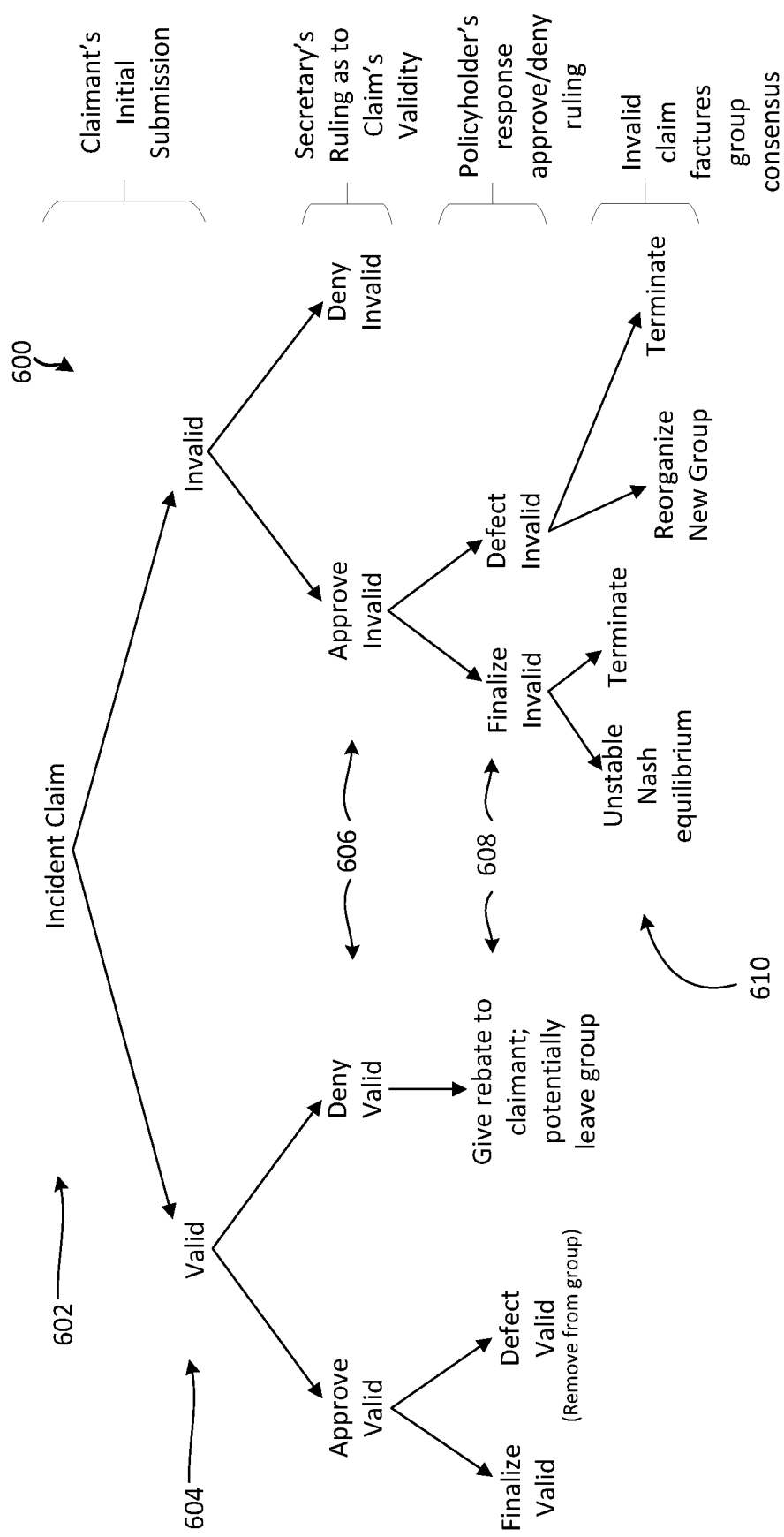
FIG. 6 illustrates an example chart of outcomes of handling a claim, according to certain embodiments of this disclosure.

FIG. 6 illustrates an example chart 600 of outcomes of handling a claim, according to certain embodiments of this disclosure.

Level 602 of chart 600 (e.g., the root of chart 600) is a claim. The claim may be submitted by a policyholder of group 114.

Level 604 of chart 600 indicates whether the claim is valid or invalid. The indication of validity at level 604 reflects the truth about the claim according to group charter 204 rather than a decision made by a policyholder (including the secretary). In other words, the indication of validity at level 604 indicates whether the claim correctly should be determined to be valid or correctly should be determined to be invalid according to the terms established by group charter 204.

Level 606 of chart 600 indicates the decision by the secretary of whether to approve or deny the claim. In other words, level 606 indicates the possible decisions of the secretary as to the validity of the claim, with the two possible decisions being to approve the claim or deny the claim. Because the claim may be either actually valid or actually invalid (per level 604 of chart 600), this leads to four possible outcomes: (1) approve valid; (2) deny valid; (3) approve invalid; and (4) deny invalid. For example, the secretary may approve a claim that is actually valid, deny a claim that is actually valid, approve a claim that is actually invalid, or deny a claim that is actually invalid. After the secretary's decision, the claim is reviewed by the other policyholders in the group for evaluation.

Level 608 of chart 600 shows the possible outcomes based on an individual policyholder's possible evaluation of the claim. Each possible outcome is described below.

For example, for an actually valid claim that also was approved by the secretary, the individual policyholder may finalize the claim as a valid claim or defect. If the individual policyholder defects in this scenario, the individual policyholder will be removed from the group. As another example, for an actually valid claim that was denied by the secretary, the individual policyholder may determine whether or not to leave group 114. In this scenario, the policyholder's (claimant included) may receive their premiums back as rebate payments. As another example, for an actually invalid claim that was approved by the secretary, the individual policyholder may finalize the invalid claim, which essentially clears the path for payment of the incident claim payment to the claimant, or defect. As another example, for an actually invalid claim that was denied by the secretary, no action may be needed by the individual policyholders.

Level 610 of chart 600 shows the possibly outcomes for group 114 depending on how the individual policyholders responded to an approved invalid claim at level 608. In particular, in response to an actually invalid claim being finalized, it may be appropriate for group 114 to coordinate to determine an appropriate joint response.

Taking first the possible scenario in which an individual policyholder finalizes an actually invalid claim, group 114 may determine to continue as a group or to terminate. If group 114 decides to continue as a group, then the policyholders likely see value in continuing group 114 despite the finalization of an actually invalid claim. If group 114 decides to terminate, then the policyholders likely no longer trust group charter 204 or possibly other members to accomplish the original objectives of group 114 as set forth in group charter 204.

Taking second the possible scenario in which an individual policyholder defects in response to the secretary approving an invalid claim, group 114 may determine to continue in some reorganized manner or to terminate. If group 114 decides to continue as a group, then the policyholders likely see value in continuing group 114 despite at least one policyholder defecting. If group 114 decides to terminate, then the policyholders likely no longer trust group charter 204 or possibly other members to accomplish the original objectives of group 114 as set forth in group charter 204.

Figure 7:
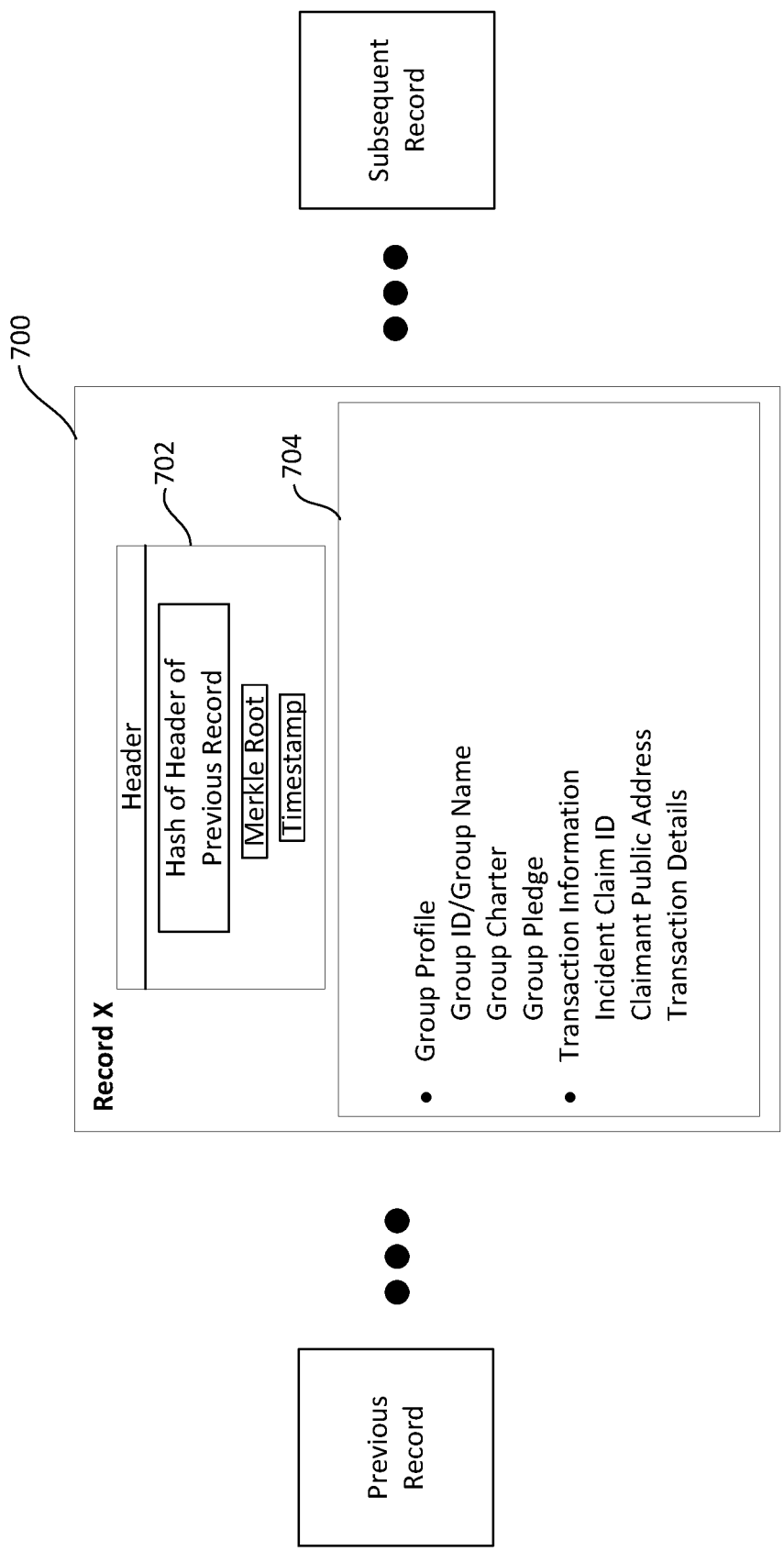
FIG. 7 illustrates an example record that may be stored in a distributed ledger, according to certain embodiments of this disclosure.

FIG. 7 illustrates an example record 700 that may be stored in distributed ledger 124, according to certain embodiments of this disclosure. For example, in an implementation in which distributed ledger 124 is a blockchain, record 700 may be a block in the blockchain. Although record 700 is illustrated and described as including particular information arranged in a particular way, this disclosure contemplates record 700 include any suitable information arranged in any suitable way. In this illustrated example, record 700 includes a header 702 and a data portion 704.

In certain embodiments, self-executing agreement 106 is configured to trigger the generation of a record 700 for storage in distributed ledger 124 of distributed ledger system 108. For example, self-executing agreement 106 may trigger generation of a record 700 for each transaction associated with group 114 that is processed use self-executing agreement 106. A collection of records 700 forms the record of transactions for a particular group 700 and can be analyzed to determine various information about group 114 over the life of the group's existence, including incident claim validity information.

Header 702 includes a hash of the header of the previous record in distributed ledger 124. This disclosure contemplates the use of any suitable hash mechanism. Header 702 includes a Merkle root, which may be a hash of all the data (e.g., which may include information and/or transactions) of the current record (record 700). In certain embodiments, header 702 includes a timestamp.

Data portion 704 includes the information and/or transactions stored by record 700. Particular embodiments of record 700 may include none, some, or all of the information described below in connection with data portion 704. In the illustrated example, data portion 704 includes a group profile and transaction information. Examples of a group profile and transaction information are described below.

In certain embodiments, some or all of the group profile is sent to distributed ledger system 108 from group management processing system 104. For example, group management module 118 may access at least some of group information 122 and send that information to distributed ledger system 108 for inclusion in one or more records (e.g., record 700) of distributed ledger 124. The group profile may include one or more of the following: a group ID and/or group name of group 114; the group charter associated with group 114; the group pledge associated with group 114; the number of group members (e.g. users 112) in group 114; the length of time group 114 has been operating; the number of group members 112 that have departed group 114 since the creation of group 114; the number of group members 112 that have joined group 112 since the creation of group 114; the historical track record of payment of premiums and incident claims for group 114; the number of incident claim payments for each term since the creation of group 114; the amount of a premium; the value of an incident claim payment (e.g., as specified in the group charter and/or as actually paid); the number of incident claims group 114 estimates paying in full each term; and sizes of subgroups of group 114.

The transaction information of data portion 704 of record 700 may include an incident claim identifier, a claimant public address, and transaction details. In this example, record 700 relates to a transaction associated with a particular incident, and an incident identifier is stored in record 700. A claimant public address may include the public address to which policyholders may direct finalization of payment, if appropriate. Because this particular record relates to a claim incident, the transaction recorded by record 700 might, for example, relate to the initial notification by the secretary to self-execution agreement 106 of the incident claim or to a decision by a policyholder whether or not to finalize payment to the claimant or to request a refund (defect). In the latter case, the transaction details may include the payment details, such as the policyholder address of the policyholder providing payment instructions and the payee's address (which could be the claimant's address if the policyholder's instructions are to finalize payment to the claimant or could be the policyholder's address if the policyholder is requesting a refund (defecting). In certain embodiments, the name of the person who submitted an incident claim and/or the details of the incident associated with the incident claim are not included in record 700; however, this disclosure contemplates record 700 including the name of the person who submitted an incident claim and/or the details of the incident associated with the incident claim, if appropriate for a particular implementation. By analyzing a collection of records 700 for group 114 related to the incident claim associated with the incident claim identifier, a reviewer of the public record created by the collection of records 700 can determine information demonstrating whether or not an incident claim was paid by policyholders.

Although the record 700 relates to an incident claim, other records 700 associated with other aspects of group 114 might or might not relate to an incident claim. For example, other records may pertain to transactions related to group membership (including, potentially, subgroup membership), premium payment (including base premium payment and/or overpayment payment), or any other suitable transactions associated with interaction with self-executing agreement 106 and/or distributed ledger system 108.

In certain embodiments, the data portion of a collection of records 700 over time can be analyzed to determine one or more of the following: the number of policyholders who defected against the incident claim; for each policyholder who defected against the incident claim, a category of the defector (e.g., honest, dishonest, or contingent); an indication of how many policyholders were left in subgroups with less than a minimum allowable number of group members (e.g., 3 group members in one example) after defections of policyholders are determined; and an indication of whether group 114 collapsed as a result of defections and an increase in the number of ineligible policyholders.

In terms of evaluating records 700, such as by an entity outside group 114, it may be useful to keep certain concepts in mind.

First, defections may provide a key signal as to the validity of an incident claim. The absence of defections may indicate that group 114 has reached consensus, but the existence of honest defectors may signal a fracture in group 114 over an incident claim. Additionally, defections provide a key mechanism used to collapse groups (e.g., group 114), punishing group 114 that approve invalid claims. Further, defections may signaling certain beliefs in the validity of an incident claim to others inside and outside group 114. Selfish defections may be considered noise, whereas honest defections may reveal a fracture within group 114.

Second, the collapse of group 114, if it occurs, may provide a key signal that an incident claim is invalid. That is, embodiments of the mechanism described herein are designed to spiral when invalid claims are approved for payment. That spiral includes defectors leaving the group and harming the reputation of group 114, premiums increasing due to the coverage requirement, remaining policyholders losing confidence due to increased premiums, additional policyholders deciding to leave group 114, premiums further increasing, and additional loss of confidence, potentially culminating in collapse of group 114.

Third, the group attestation record (e.g., records 700) stored on distributed ledger 124 may allow people to evaluate group charters 204 and group pledges 206 for quality. Higher quality group charters 204 may produce better-trained policyholders, and better-trained policyholders may produce a better indication of the validity of an incident claim. The group attestation record is publicly available, transparent, auditable, and tamper-proof due to the characteristics of distributed ledger system 108. Additionally, distributed ledger system may provide a property of non-repudiation for payments and defections, and may help ensure protection of a claimant's anonymity, as public keys do not record or leak a claimant's personal information. The group attestation record may provide a quantitative proof of the validity of an incident claim by accurately recording the number of defections against the incident claim.

Figure 8:
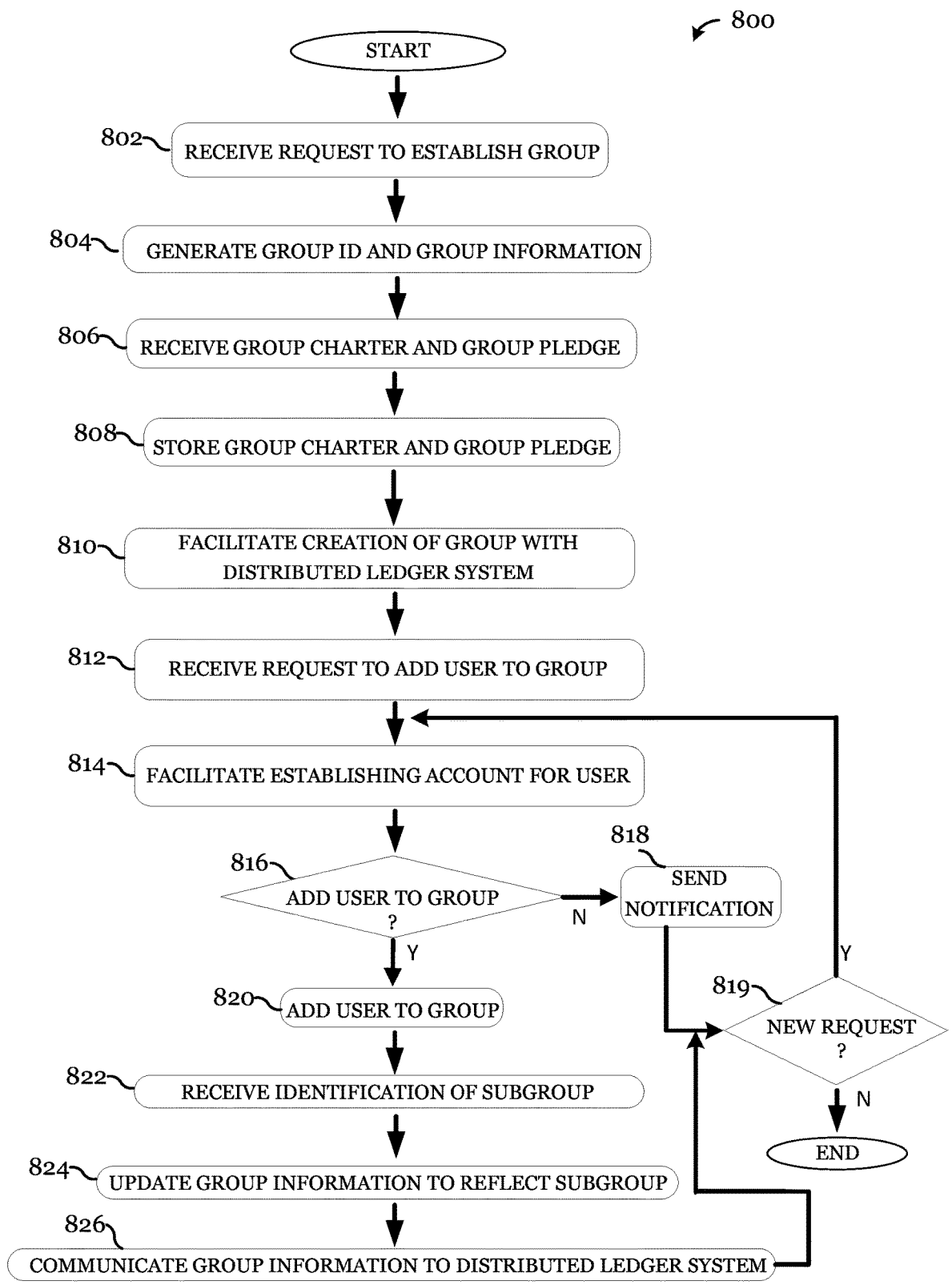
FIG. 8 illustrates an example method for forming a group, according to certain embodiments of this disclosure.

FIG. 8 illustrates an example method 800 for forming group 114, according to certain embodiments of this disclosure. In certain embodiments, method 800 is performed by group management processing system 104. This disclosure, however, contemplates any suitable components of system 100 performing operations associated with forming group 114.

At step 802, group management processing system 104 receives a request to establish a group. For example, a user 112 of a user device 102 (e.g., user 112*a*, the secretary, of user device 102*a*) may submit the request to establish the group via web portal 116. At step 804, group management processing system 104 (e.g., group management module 118) may generate a group ID and associated group information 122 in storage module 120.

At step 806, group management processing system 104 receives group charter 204 and group pledge 206. For example, a user 112 of a user device 102 (e.g., user 112*a*, the secretary, of user device 102*a*) may submit group charter 204 and group pledge 206 via web portal 116. At this stage, group pledge 206 might or might not be signed.

At step 808, group management processing system 104 stores group charter 204 and group pledge 206 in the appropriate group information 122 in storage module 120, where group charter 204 and group pledge 206 can be accessed by group members of group 114.

At step 810, group management processing system 104 facilitates creation of group 114 with distributed ledger system 108. For example, group management module 118, through web portal 116, may provide users 112 (e.g., user 112*a*, the secretary) with access to an interface for creating an account for group 114 with distributed ledger system 108, along with an associated premiums escrow for group 114 and/or overpayments escrow for subgroups of group 114, which may initially have a zero balance. As another example, group management module 118, through web portal 116, may provide users 112 with access to an interface for submitting parameters for a establishing a self-executing agreement 106 appropriate for implementing the objectives defined in the group charter for group 114. Self-executing agreement 106 also may be linked to the account for group 114 in distributed ledger system 108 and to the premiums escrow for group 114.

At step 812, group management processing system 104 receives a request to add a user 112 to group 114. For example, user 112*a* (the secretary) may send an email to a particular user 112*b* with a link to web portal 116, through which user 112*b* can request to be added to group 114. In certain embodiments, web portal 116 provides functionality for sending group invites.

At step 814, group management processing system 104 facilitates establishing an account for the user (user 112*b* in this example). Establishing an account for user 112*b* may include setting up user name and password for the user to access features associated with group 114 (and potentially group information 122 once user 112*b* is added as a group member), providing user 112*b* access to the group chart, providing user 112*b* with access to and an ability to sign (e.g., possibly digitally sign) group pledge 206.

In certain embodiments, web portal 116 also facilitates user 112*b* establishing an account with distributed ledger system 108 (to the extent user 112*b* does not already have such an account). For example, web portal 116 may provide links for user 112*b* to access with user device 102*b* suitable web sites and/or application stores for establishing an account with distributed ledger system 108 and obtaining software for interacting with distributed ledger system 108.

At step 816, group management processing system 104 determines whether to add user 112*b* to group 114. If group management processing system 104 determines at step 816 that user 112*b* should not be added to group 114 at this time, at step 818 then group management processing system 104 sends a notification (e.g., to user 112*b* and/or the secretary (e.g., user 112*a*)) that user 112*b* is not added at this time. Group management processing system 104 may deny adding user 112*b* for a variety of reasons, including failure of user 112*b* to submit a signed group pledge 206, failure of user 112*b* to confirm establishment of a user account with distributed ledger system 108, or for any other suitable reason.

Method 800 then proceeds to step 819 to determine at step 819 whether a new request to add a user 112 to group 114 has been received. If group management processing system 104 determines at step 819 that a new request to add a user 112 to group 114 has been received, then method 800 returns to step 814 to process the new request. If group management processing system 104 determines at step 819 that no new request to add a user 122 has been received, then method 800 may end. In certain embodiments, a new request to add a user 112 to group 114 may be received at any time (or at designated times), and method 800 may enter step 812 upon group management processing system 104 receiving such a request.

If group management processing system 104 determines at step 816 that user 112*b* can be added to group 114, then at step 820 group management processing system 104 adds user 112*b* to group 114. For example, group management processing system 104 may update the group information 122 for group 114 to reflect that user 112*b* is a group member. Obtaining group member status also may allow user 112*b* to access certain additional features via web portal 116. For example, as a group member, user 112*b* may be able to pay premiums, join a subgroup, finalize payment, defect, and perform other suitable actions that are accessible to group members.

At step 822, group management processing system 104 receives an identification of a subgroup for user 112*b*. For example, user 112*b* may specify using user device 102*b* and via web portal 116 the subgroup that user 112*b* is joining. If user 112*b* attempts to join a subgroup that already has a maximum number of group members (e.g., 7 in certain embodiments), then group management processing system 104 may reject user 112*b*'s attempt to join that subgroup and suggest that user 112*b* join a different existing subgroup or create a new subgroup. If user 112*b* is the first group member to join that subgroup, then group management processing system 104 may establish the subgroup and leave the subgroup open for additional group members of group 114 to join. When a next term starts, if the subgroup identified by user 112*b* does not have a minimum number of group members (e.g., 4 certain embodiments), then group management processing system 104 may suggest that user 112*b* join a different subgroup, as in certain embodiments self-executing agreement 106 rejects a group member's attempt to pay a premium if the group member is not in a subgroup or is in a subgroup with too few group members. In certain embodiments, a group member also being member of a subgroup is a prerequisite to the user being able to pay premiums and thereby become a policyholder.

At step 824, group management processing system 104 (e.g., group management module 118) updates group information 122 for group 114 to reflect the subgroup that user 112*b* joined.

At step 826, group management processing system 104 communicates at least some of the information specified in group information 122 (including, among other information, the public addresses/keys of users 112 and subgroup membership information of users 112) to distributed ledger system 108, such as to self-executing agreement 106. For example, as users 112 provide information via web portal 116, group management module 118 may automatically update self-executing agreement 106, as appropriate. As another example, users 112 may interact directly with self-executing agreement 106, via web portal 116 or otherwise. Method 800 then proceeds to step 819 to potentially process a new request to add a user 112 to group 114, as described above.

Of course, portions of method 800 may be repeated as requests to add additional users 112 to group 114 or as other information is updated. For example, group charter 204 may be modified, which, in certain embodiments, may result in each user 112 being required to sign a new version of group pledge 206 to continue as a group member of group 114. As another example, a user 112 may change subgroups.

Figure 9A:
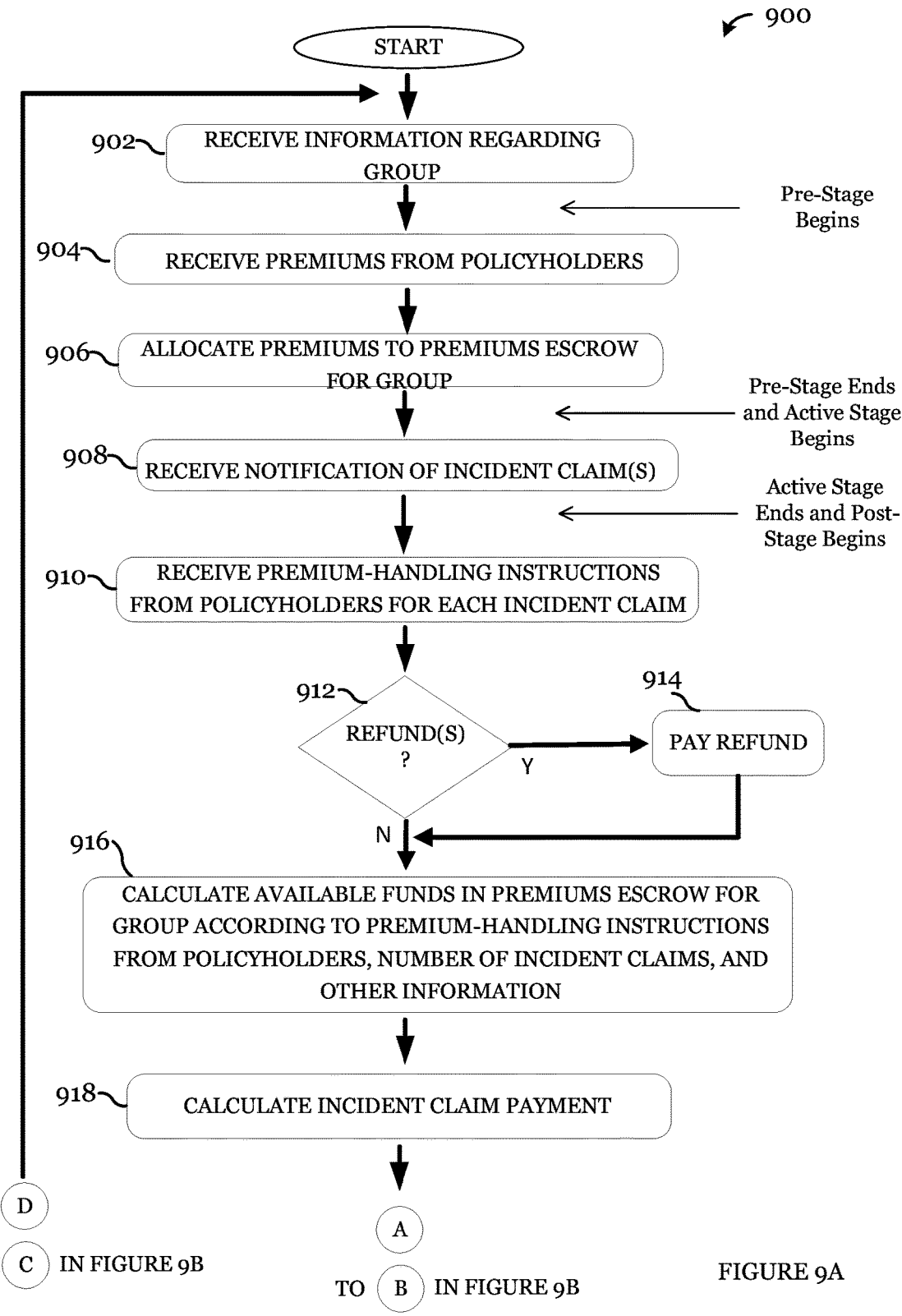
FIGS. 9A-9B illustrate an example method for providing group coverage for and creating a record of an incident using a self-executing agreement and distributed ledger, according to certain embodiments of this disclosure.
Figure 9B:
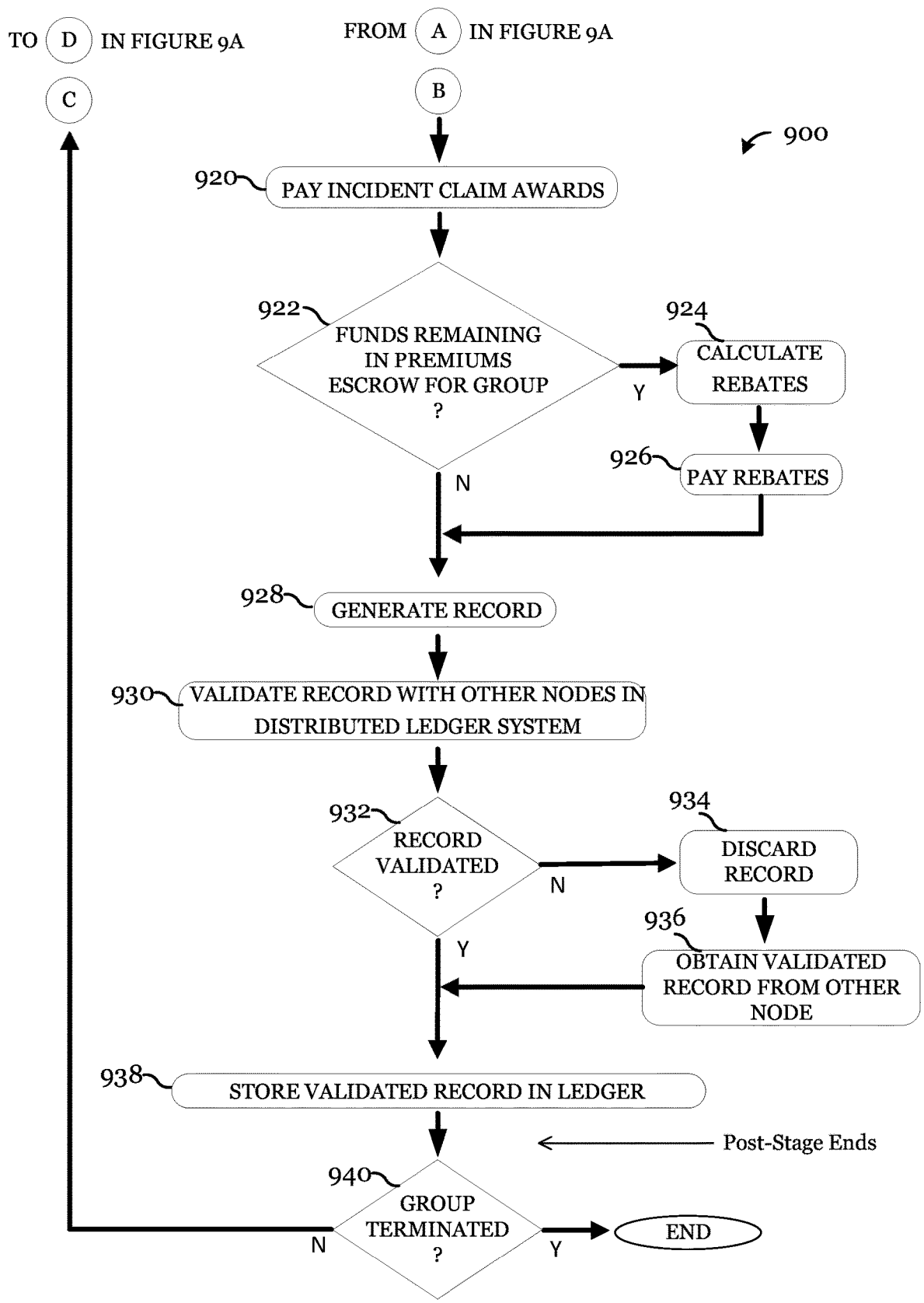

FIGS. 9A-9B illustrate an example method 900 for providing group coverage for and creating a record of an incident using a self-executing agreement 106 and distributed ledger 124, according to certain embodiments of this disclosure. In certain embodiments, method 900 is performed by distributed ledger system 108. For example, some or all of method 900 may be executed by self-executing agreement 106. This disclosure, however, contemplates any suitable components of system 100 performing operations associated with method 900.

At step 902, self-executing agreement 106 receives information regarding group 114. For example, self-executing agreement 106 may receive the information regarding group 114 from group management processing system 104. The information may include the group ID, an identification of the group members (which, in certain embodiments, are addresses of users 112 on distributed ledger system 108), a number of group members, information associating group members with sub-groups, information from group charter 204 for group 114, and any other suitable information that may be used by self-executing agreement 106 to implement the functions self-executing agreement 106 is designed to provide. In certain embodiments, the information from group charter 204 may include a length of a term, including a length of a premium payment stage (a pre-stage), a length of an active stage during which incident claims may be submitted), a length of a policyholder instructions and incident claim payment stage (post-stage), a predetermined incident claim payment amount, and any other suitable information.

The pre-stage during which group members can pay premiums then begins.

At step 904, self-executing agreement 106 receives premiums from users 112, which as described above are group members of group 114. In certain embodiments, as described above, a group member must be a policyholder to be able to pay a premium. Thus, in certain embodiments, self-executing agreement 106 compares an identify of a user 112 who submits a premium to the group information received by self-executing agreement 106 to ensure that the user 112 from which a premium is received is qualified to submit such a premium. For example, self-executing agreement 106 may compare the public key associated with an attempted premium-payment transaction to a list of public addresses of users 112 authorized to pay a premium to determine whether the transaction should be allowed. If self-executing agreement 106 determines that a particular user 112 is not qualified to submit a premium, then self-executing agreement 106 may reject the premium and not allocate the premium to a premiums escrow of group 114. Furthermore, in embodiments that use subgroups/overpayments, the received premiums include a base premium for allocation to a premiums escrow for group 114 and an overpayment premium for allocation to the overpayment escrow for the subgroup of the paying user 112.

At step 906, self-executing agreement 106 allocates received premiums to a premiums escrow for group 114. In certain embodiments, the premiums escrow for the group was previously established by a member of group 114. For example, as part of establishing group 114, the secretary (or another suitable group member of group 114) may have interacted with distributed ledger system 108 to create or identify an existing premiums escrow for group 114. Furthermore, in embodiments that use subgroups/overpayments, the base premium is allocated to the premiums escrow for group 114 and the overpayment premium is allocated to the overpayment escrow for the subgroup of the paying user 112.

In certain embodiments, allocating premiums to the premiums escrow for group 114 (or to the overpayment escrow for a subgroup) includes actually depositing the premiums in the premiums escrow for group 114 (or to the overpayment escrow for a subgroup). In certain other embodiments, allocating premiums to the premiums escrow for group 114 (or to the overpayment escrow for a subgroup) merely identifies those premiums as having been preliminarily indicated by the policyholder to be possibly payable to a claimant at a later time.

The pre-stage for payment of premiums then ends, and the active stage then begins. As described above, the active stage is a time during which incident claims may be submitted by a claimant (who is a policyholder) for consideration by other policyholders.

At step 908, self-executing agreement 106 receives one or more notifications of incident claims. Of course, it is possible that during a particular active stage, no incident claims are received. In certain embodiments, in such a scenario, the policyholders receive a rebate of their entire premium previously sent to the premiums escrow of group 114 at step 904, with the possibility that this rebate may be applied to a future term's premium payment. For purposes of the example described with reference to FIGS. 9A-9B, it will be assumed that at least one incident claim is received.

The active stage for submission of incident claims then ends, and the post-stage during which policyholders provide instructions and various payments are made then begins.

At step 910, self-executing agreement 106 receives premium-handling instructions for one or more policyholders for each incident claim. As described above, a policyholder may finalize a premium, meaning that the policyholder is validating the incident claim and agreeing that an appropriate portion of the policyholder's premium be paid to the claimant as an incident claim payment. As another example, a policyholder may defect, meaning that the policyholder does not agree with the secretary's decision to approve the incident claim and requests a refund of the premium.

One or more policyholders may fail to provide an explicit premium-handling instruction. In certain embodiments, if a particular policyholder does not provide premium-handling instructions for a claim, the lack of instructions will be considered a finalization of the premium such that it will be paid to the claimant. In other words, in such embodiments, self-executing agreement 106 will assume that a lack of instruction from a policyholder is an instruction to validate the incident claim (and pay an incident claim payment to the claimant).

At step 912, self-executing agreement 106 determines, based on the premium-handling instructions from policyholders, whether any refunds of premiums are requested. In other words, self-executing agreement 106 determines whether any policyholders are defecting from group 114. The request for a refund from a policyholder may be considered a defection request.

If self-executing agreement 106 determines at step 912 that one or more policyholders have requested a refund of their premium, then at step 914, self-executing agreement 106 causes those policyholders to be re-paid their respective premiums. For example, self-executing agreement 106 may cause the policyholder who requested a refund to be paid their respective premiums from the premiums escrow of group 114 by causing a payment in the amount of the premium to be transferred from the premiums escrow of group 114 to the cryptocurrency account of the policyholder. In embodiments that include subgroups/overpayments, self-executing agreement 106 may cause the policyholder who requested a refund to be paid their overpayment from the overpayment escrow (for that policyholder's subgroup) in a similar manner. Furthermore, to the extent other policyholders from that policyholder's subgroup did not request a refund, the overpayments for those remaining policyholders are transferred from the overpayment escrow for that subgroup to the premiums escrow for group 114. The method then proceeds to step 916.

If self-executing agreement 106 determines at step 912 that no policyholders have requested a refund of their premium, then the method proceeds to step 916.

At step 916, self-executing agreement 106 calculates the available funds in the premiums escrow of group 114 according to the premium-handling instructions from policyholders (received at step 910), the number of incident claims (received at step 908), and other information. In certain embodiments, calculating the available funds in the premiums escrow of group 114 includes self-executing agreement 106 subtracting the amount of refunds paid to defectors (according to the premium-handling instructions). If applicable, calculating the available funds in the premiums escrow of group 114 includes self-executing agreement 106 processing the subgroups of group 114, and adding any payments from the overpayment escrows of one or more subgroups to premiums escrow of group 114.

At step 918, self-executing agreement 106 calculates incident claim payments to be paid to the one or more claimants associated with the incident claims for which notifications were received at step 908.

At step 920, self-executing agreement 106 causes the one or more claimants to be paid the incident claim payments determined at step 918. For example, self-executing agreement 106 may cause the one or more claimants to be paid the determined incident claim payments from the premiums escrow of group 114 by causing a payment in the amount of the incident claim payment to be transferred to the respective cryptocurrency accounts of the one or more claimants.

At step 922, self-executing agreement 106 determines whether funds remain in the premiums escrow of group 114. For example, after paying refunds to defecting policyholders at step 914 (if applicable) and incident claim payments to one or more claimants at step 920, the premiums escrow of group 114 may still include funds.

If self-executing agreement 106 determines at step 922 that no funds remain in the premiums escrow of group 114, then the method proceeds to step 928, described below.

If self-executing agreement 106 determines at step 922 that funds remain in the premiums escrow of group 114, then at step 924, self-executing agreement 106 calculates rebates for one or more qualifying policyholders. At step 924, self-executing agreement 106 causes the one or more qualifying policyholders to be paid the calculated rebates from the remaining funds of the premiums escrow of group 114 by causing a payment in the amount of the rebate to be transferred to the respective cryptocurrency accounts of the qualifying policyholders. The method then proceeds to step 928.

At step 928, self-executing agreement 106 generates one or more records, such as record 700. For example, self-executing agreement 106 may generate a record 700 for each incident claim. As another example, self-executing agreement 106 may generate a record 700 that includes all of the incident claims for the current (as in just completed) active stage.

At step 930, self-executing agreement 106 validates the one or more records 700 generated at step 928 with other nodes 126 (e.g., other than the node 126 on which this instance of self-executing agreement 106 is executing) in distributed ledger system 108. For example, self-executing agreement 106 (and the associated node 126 on which this instance of self-executing agreement 106 is executing) may use any of a variety of consensus techniques for validating the one or more records 700. Such consensus techniques may include one or more of practical Byzantine fault tolerance, proof-of-work, proof-of-stake, delegated proof-of-stake, or any other suitable consensus mechanism executed by nodes 126 of distributed ledger system 108.

At step 932, if the one or more records 700 are validated, then the method proceeds to step 938. If instead, at step 932, the one or more records 700 are not validated, then the node 126 on which this instance of self-executing agreement 106 is executing discards the one or more records 700 and, at step 936, obtains a validated copy of the one or more records 700 from another node 126 in distributed ledger system 108. The method then proceeds to step 938.

At step 938, self-executing agreement 106 causes the one or more records 700 to be stored in an instance of distributed ledger 124 stored by the node 126 on which this instance of self-executing agreement 106 is executing.

For ease of illustrating the generation of one or more records 700, steps 928-938 are shown as a collection of steps toward the end of method 900. In an actual implementation of method 900, distributed ledger system 108 may generate a record 700 for each transaction performed using self-executing agreement 106 and/or distributed ledger 124. Moreover, these transactions occur throughout method 900, and records 700 would be generated in conjunction with performing those transactions. Therefore, steps 928-938 likely would be performed numerous times throughout the existence of group 114 and throughout the many transactions that occur during method 900.

The post-stage then ends.

At step 940, self-executing agreement 106 determines whether group 114 terminated. For example, self-executing agreement 106 may receive a notification that group 114 terminated prior to a next active stage for group 114.

If self-executing agreement 106 determines at step 940 that group 114 has not terminated, then the method may return to step 902 for self-executing agreement 106 to receive any updates to the information regarding group 114. If self-executing agreement 106 determines at step 940 that group 114 has terminated, then method 900 may end.

FIG. 10 is a graphic illustrating example consequences of being an honest or dishonest group member, according to certain embodiments of this disclosure. As shown in cells 1002 and 1004, honest group members are rewarded. As shown in cell 1002, for a current group (that is, the group of a current, or just completed, term), payment of valid incident claims produces group attestation that demonstrates consensus and results in group harmony. As shown in cell 1004, a minority group of defectors (first wave of defectors, who may be viewed as civil dissenters) who defect from paying a valid claim may be permitted to reorganize and build a new group while the current group collapses.

As shown in cell 1006, for a current group (that is, the group of a current, or just completed, term), a dishonest group member or set of dishonest group members are penalized. That is, dishonest defectors who withhold payment to valid incident claims are removed from the group. As shown in cell 1008, a set of group members who are a majority of a group and who collude to pay an invalid incident claim are not permitted to reorganize and build a new group once the present group collapses.

Figure 11:
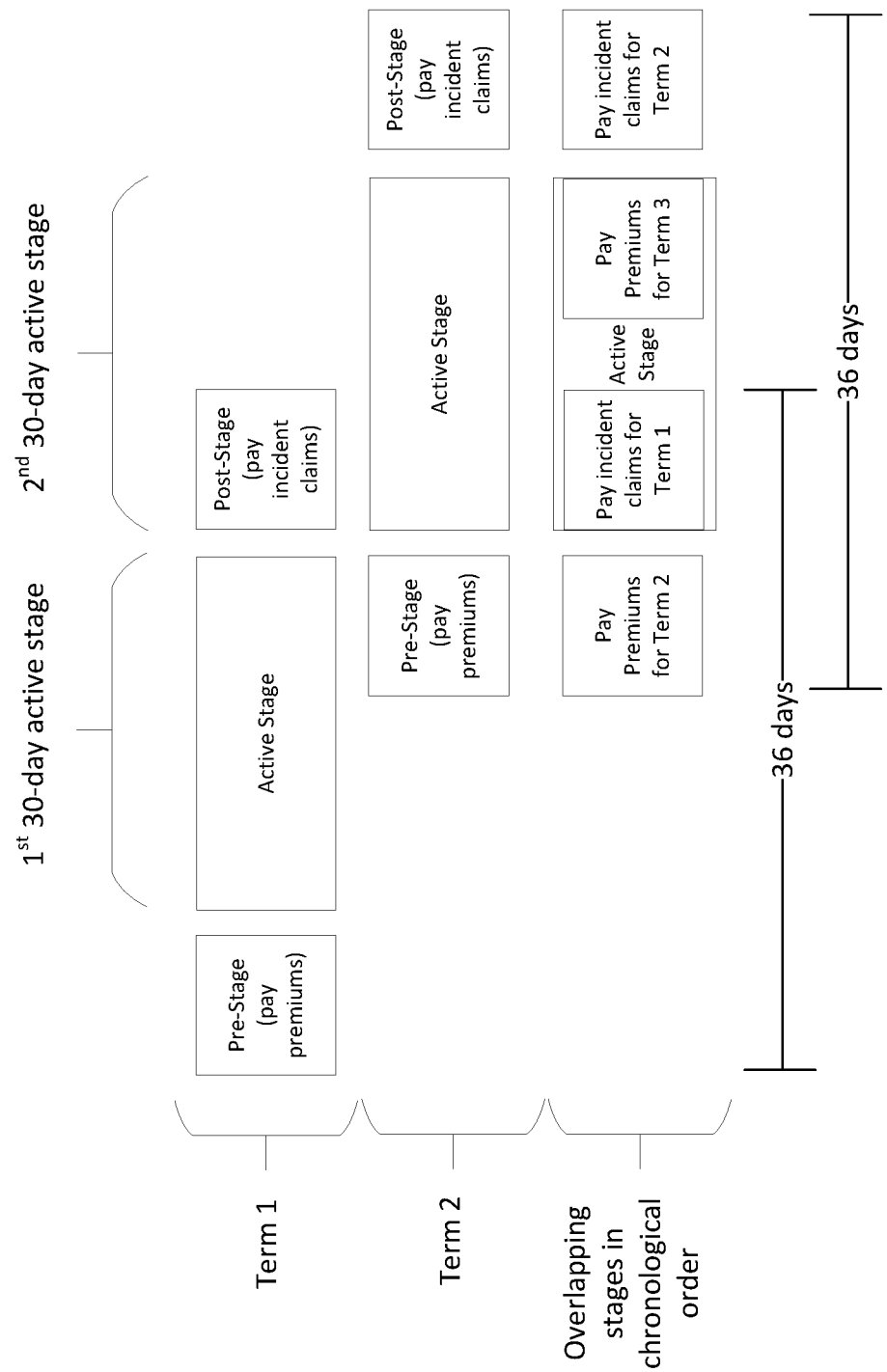
FIG. 11 illustrates an example implementation of terms and associated cryptocurrency escrows, according to certain embodiments of this disclosure.

FIG. 11 illustrates an example implementation of terms and associated cryptocurrency escrows, according to certain embodiments of this disclosure. Group charter 204 also may specify the length of a term. As described above, this disclosure contemplates a term having any suitable length, including seconds up to any suitable length.

As described above, in certain embodiments, the term is thirty-six days, and includes multiple stages, with an active stage being 30 days and the remaining 6 days overlapping with adjacent terms as follows: (1) a pre-stage of 3 days for the payment of premiums; (2) a coverage period (active stage) of 30 days in which incident claims may be submitted; and (3) a post-stage of 3 days to allow for either the defection or finalization of premiums to incident claims approved during the coverage period.

As shown in FIG. 11, term 1 includes a pre-stage (which in this example is three days), and 30-day active stage, and a post stage (which in this example is three days). Term 2 also includes a pre-stage (which in this example is three days), and 30-day active stage, and a post stage (which in this example is three days). The pre-stage of term 2 occurs during the last three days of the active stage of term 1, and the post-stage of term 1 occurs during the first three days of the active stage of term 2. Thus, when premiums are due for term 2, the outcome of term 1 is not yet known because term 1 is still in the active stage.

Thus, in certain embodiments, to accommodate these overlapping terms, multiple cryptocurrency escrows are maintained by self-executing agreement 106. For example, a premiums escrow for group 114 is maintained for term 1. As another example, multiple overpayment escrows for the multiple subgroups are maintained for term 1. As another example, a premiums escrow for group 114 is maintained for term 2 (the next term). As another example, multiple overpayment escrows for the multiple subgroups are maintained for term 2 (the next term). This means that at the time the premiums are due for term 2, the policyholder decisions for term 1 have yet to be received.

Therefore, the effects the outcomes of claim payments and defections on premiums likely is delayed one term, and policyholders essentially invest two premiums at a time for some small period of time to cover the cost of the premiums for the current term and the next term.

FIG. 12 illustrates a block diagram of an example processing system 1200, according to certain embodiments of the present disclosure. Processing system 1200 may be configured to perform methods described in this disclosure, and may be installed in a host device. As shown, processing system 1200 includes a processor 1204, a memory 1206, and interfaces 1210-1214, which may (or may not) be arranged as shown in FIG. 12. Processor 1204 may be any component or collection of components adapted to perform computations and/or other processing related tasks, and the memory 1206 may be any component or collection of components adapted to store programming and/or instructions for execution by processor 1204. In an embodiment, memory 1206 includes a non-transitory computer readable medium. The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

In some embodiments, processing system 1200 is included in a network device that is accessing, or part otherwise of, a telecommunications network. In one example, processing system 1200 is in a network-side device in a wireless or wireline telecommunications network, such as a base station, a relay station, a scheduler, a controller, a gateway, a router, an applications server, or any other device in the telecommunications network. In other embodiments, processing system 1200 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Certain embodiments may provide none, some, or all of the following technical advantages. Distributed ledger system 108 (e.g., a blockchain network) as a payment network may provide payments that have special attributes, including the creation of a record (e.g., records 700 stored on distributed ledger 124) with special properties. In certain embodiments, the record created by group 114 via distributed ledger system 108 and self-executing agreement 106 is globally accessible, tamper-proof, and immutable. That is, due to the nature of distributed ledger system 108 (e.g., a blockchain system), distributed ledger system 108 stores records that are publicly available, tamper-proof, and immutable, and these records store the non-repudiable transactions signed by users 112 using user devices 102. Distributed ledger 124 (e.g., the blockchain) is a record of transactions, and those records may be notarized and digitally time stamped. This record may allow group 114 to provide attestation to entities outside group 114.

The record created using distributed ledger system 108 may have a property of non-repudiation, using digital signatures (e.g., the user's key used to sign transactions, such as payment of premiums, finalization of premiums, or defection) provided by users 112 for example. Non-repudiation may create a definitive chain among a unique individual (user 112), a specific hardware device in their possession (e.g., user device 102), a unique private key generated by that device (e.g., user device 102), a unique digital signature generated by that private key, the ability to anonymously transact with that private key on distributed ledger system 108 (e.g., the blockchain payment network), and the ability for attestations to later be signed by that individual revealing their identity. In general, in an implementation related to whistleblower incidents, it may be desirable for whistleblower software to protect the identity of a whistleblower to reduce or eliminate the opportunity for retaliation, and the capability of filing a report that is initially anonymous but later allows the author to reveal his or her identity, if appropriate (e.g., if ordered by a court), may be beneficial.

In certain embodiments, the record created using distributed ledger system 108 (e.g., distributed ledger 124) provides particular guarantees of data integrity. Records maintained by a trusted third party are vulnerable to tampering. To establish whether a false incident claim (an incident claim that should be determined to be invalid) was submitted by a claimant, it may be useful for an outside entity to accurately determine how many policyholders defected against that incident claim, the categories of the defections (e.g., honest or dishonest), how many members in the remaining subgroups became ineligible to receive coverage (because their group was left with fewer members than a predetermined minimum—4 in one example) due to the defections, and whether group 114 collapsed because an invalid incident claim was approved.

In certain embodiments, the subgroup/overpayment mechanism is recorded in distributed ledger 124 and strictly enforced. For example, in certain embodiments, group members in subgroups falling below the required minimum threshold (e.g., of 4 members) are barred from becoming policyholders until group 114 reorganizes. Furthermore, in certain embodiments, accurate tracking and determination of the following items indicates whether group 114 collapsed: the number of honest defectors; and the number of policyholders remaining without coverage (e.g., those in a subgroup with less than the minimum threshold of, for example, 4 members).

The record created using distributed ledger system 108 (e.g., the blockchain network) may be permanent, immutable, and irreversible. Records kept by a method other than a public distributed ledger may have different guarantees for permanence and immutability. These guarantees depend on how many copies of the record are made and how all those copies are stored. Records that are globally accessible rarely have strong security guarantees for data integrity and permanence. Records that have strong security guarantees are rarely easily accessible. In certain embodiments, distributed ledger system 108 (e.g., blockchain database structures) provide both high availability and strong guarantees for data permanence.

The record created using distributed ledger system 108 may be censorship resistant. Censorship resistance is a property that arises when outside parties to a transaction have no practical way to prohibit the transaction's occurrence. If a third party (even a trusted third party) were to maintain these records, the third party can always alter the record to inaccurately reflect transactions. With distributed ledger system 108 (e.g., blockchain technology), even the record of payments and defections is censorship resistant.

Distributed ledger system 108 provides a relatively low cost of regulatory compliance, which may be particularly beneficial for small groups 114. Because of the costly overhead typically associated with regulatory compliance, it may be financially infeasible for small groups to use a third party to hold funds. Furthermore, the potential liability associated with third party custodians renders using traditional banking networks to escrow premiums for paying incident claims unworkable. Embodiments of this disclosure, which make use of distributed ledger system 108 may reduce or eliminate this legal liability.

Embodiments of this disclosure provide policyholders with a right to defect against incident claims. With conventional systems, the record of payments and defections is separate from the payments themselves. Since this separation exists there is always the possibility that the record may not accurately reflect when a payment or defection occurred. Using self-executing agreements 106 on distributed ledger system 108 to transact premium and incident claim payments, however, increases the chances that defections are recorded correctly.

Certain embodiments use subgroup membership as a prerequisite for eligibility to be a policyholder. For example, self-executing agreement 106 may enforce subgroup membership as a condition to be a policyholder (e.g., to obtain coverage). In certain embodiments, self-executing agreement 106 prevents individuals or subgroups with fewer than 4 members from paying premiums to become policyholders (e.g., to obtain coverage). In certain embodiments, members in subgroups falling below a threshold of four members are barred from participation until the group reorganizes. A third party, even a trusted third party, may fail to strictly enforce this requirement, by coercion, error, or otherwise. Self-executing agreement 106, however, may reduce or eliminate the possibility of this requirement going unenforced (in embodiments that include this requirement). For example, self-executing agreement 106 may not be coerced to make exceptions, and may be strict and inflexible.

Embodiments, thus, exploit technical characteristics of distributed ledgers and self-executing agreements to provide features that are not possible with other types of systems.

Example embodiments of this disclosure are summarized here. Other embodiments can also be understood from the entirety of the specification and the claims filed herein.

Example 1. A computer-implemented method, including creating a first premiums escrow with a zero balance. The first premiums escrow is associated with a first group that includes a first plurality of policyholders. The first premiums escrow is managed using a distributed ledger and associated self-executing agreement. The method includes, at a beginning of a first term, by the self-executing agreement: receiving a first premium payment using cryptocurrency from each of the first plurality of policyholders; and allocating each of the first premium payments to the first premiums escrow. The method includes, during the first term, receiving, by the self-executing agreement, a notification of a first incident claim associated with a first claimant of the first plurality of policyholders. The method includes, at an end of the first term, by the self-executing agreement: receiving payment instructions from the first plurality of policyholders; paying the first claimant a first incident claim payment using cryptocurrency from the first premiums escrow, the first incident claim payment being larger than the first premium payment and being determined according to the payment instructions from the first plurality of policyholders; and distributing to each of the first plurality of policyholders a first rebate payment from the first premiums escrow so that the first premiums escrow returns to a zero balance, the first rebate payment being equal to or lower than the first premium payment. The method includes storing, by the self-executing agreement, a record of the incident claim in a tamper-proof, publicly-available, non-repudiable distributed ledger.

Example 2: The computer-implemented method of Example 1, where a particular payment instruction of the payment instructions includes a defection request from a second policyholder of the first plurality of policyholders and the method further includes, after receiving the defection request and before distributing to each of the first plurality of policyholders the first rebate payment, making a first refund payment to the second policyholder from the first premiums escrow. The first refund payment is equal to the first premium payment.

Example 3: The computer-implemented method of Example 2, where the second policyholder and the first policyholder are a same policyholder.

Example 4: The computer-implemented method of any one of Examples 1-3, further including: creating a first subgroup including a second plurality of policyholders, the second plurality of policyholders being policyholders of the first group; creating a first overpayment escrow with a zero balance; and, at the beginning of the first term, receiving a first overpayment using cryptocurrency from each of the second plurality of policyholders; and depositing each of the first overpayments into the first overpayment escrow.

Example 5: The computer-implemented method of Example 4, further including, before distributing to each of the first plurality of policyholders of the first group the first rebate payment: receiving a defection request from a third policyholders of the second plurality of policyholders; and, after receiving the defection request: refunding to the third policyholders of the second plurality of policyholders the first overpayment received from the third policyholders; and making a payment from a remaining balance of the first overpayment escrow to the first premiums escrow.

Example 6: The computer-implemented method of Example 4, further including: receiving no defection requests from the second plurality of policyholders; and returning to each policyholder of the second plurality of policyholders the first overpayment.

Example 7: The computer-implemented method of any one of Examples 4-6, where the first subgroup includes between 4 and 7 policyholders.

Example 8: The computer-implemented method of any one of Examples 4-7, where the first group includes a plurality of subgroups, the plurality of subgroups including the first subgroup.

Example 9: The computer-implemented method of any one of Examples 1-8, where the first group includes at least 50 policyholders.

Example 10: The computer-implemented method of any one of Examples 1-9, where the first term is thirty-six days.

Example 11: The computer-implemented method of any one of Examples 1-10, where the first incident claim is a sexual harassment claim or a policy brutality claim or a worker's compensation claim.

Example 12: The computer-implemented method of any one of Examples 1-11, further including creating a second group including a second plurality of policyholders and creating a second premiums escrow with a zero balance. The method includes, at a beginning of a second term, receiving a second premium payment using cryptocurrency from each of the second plurality of policyholders and depositing each of the received second premium payments into the second premiums escrow. The method includes, during the second term, receiving a notification of a second incident claim from a first claimant of the second plurality of policyholders and receiving one or more additional notifications of incident claims from corresponding claimants of the second plurality of policyholders. The method includes, at an end of the second term, paying the first claimant of the second plurality of policyholders and the corresponding claimants of the second plurality of policyholders respective second incident claim payments using cryptocurrency from the second premiums escrow, a total of the respective second incident claim payments being equal to a balance of the second premiums escrow, each second incident claim payment being larger than the second premium payment.

Example 13: A system includes one or more processors and a non-transitory computer-readable medium storing instructions that, when executed by the one or more processors, cause the one or more processors to perform operations. The operations include, at a beginning of a first term, receiving a first premium payment using cryptocurrency from each of a first plurality of policyholders that are members of a first group and allocating each of the first premium payments to a first premiums escrow that is managed using a distributed ledger and associated self-executing agreement. The operations include, during the first term, receiving one or more incident claims, each incident claim received from a corresponding claimant of the first plurality of policyholders. The operations include, at an end of the first term: for each incident claim of the one or more incident claims, paying the corresponding claimant a respective incident claim payment using cryptocurrency from the first premiums escrow and, if any funds remain in the first premiums escrow, distributing to each of the first plurality of policyholders a first rebate payment from the first premiums escrow so that the first premiums escrow returns to a zero balance. The first rebate payment is equal to or lower than the first premium payment. The operations include storing at least one record for the one or more incident claims in a database operating in a distributed ledger system.

Example 14: The system of Example 13, where each respective incident claim payment is an amount agreed upon by the first plurality of policyholders prior to the beginning of the first term and specified in the self-executing agreement.

Example 15: The system of any one of Examples 13-14, where the operations further include determining, based on a total number of incident claims of the one or more incident claims during the first term and a total escrow amount remaining in the first premiums escrow, whether the first premiums escrow includes sufficient funds for each respective incident claim payment to be an amount agreed upon by the first plurality of policyholders prior to the beginning of the first term and specified in the self-executing agreement. The operations further include if the first premiums escrow includes the sufficient funds, each respective incident claim payment is the amount agreed upon by the first plurality of policyholders prior to the beginning of the first term and specified in the self-executing agreement. The operations further include if the first premiums escrow lacks the sufficient funds, each respective second payment is less than the amount agreed upon by the first plurality of policyholders prior to the beginning of the first term and specified in the self-executing agreement.

Example 16: The system of any one of Examples 13-15, where the operations further include, at the end of the first term and before distributing to each of the first plurality of policyholders the first rebate payment: receiving a defection request from a second policyholder of the first plurality of policyholders; and after receiving the defection request, making a refund payment to the second policyholder from the first premiums escrow. The refund payment is equal to the first premium payment.

Example 17: The system of any one of Examples 13-16, wherein the operations further include: creating an overpayment escrow with a zero balance: and, at the beginning of the first term: receiving an overpayment using cryptocurrency from each of a second plurality of policyholders that are members of a subgroup, the second plurality of policyholders being in the first group; and depositing each of the overpayments into the overpayment escrow.

Example 18 The system of Example 17, where the operations further include, before distributing to each of the first plurality of policyholders of the first group the first rebate payment: receiving a defection request from a third policyholder of the second plurality of policyholders; and after receiving the defection request: refunding to the third policyholder of the second plurality of policyholders the overpayment received from the third policyholder; and making a payment from a remaining balance of the overpayment escrow to the first premiums escrow.

Example 19: The system of Example 17, where the operations further include receiving no defection requests from the second plurality of policyholders and returning to each policyholder of the second plurality of policyholders the overpayment.

Example 20: The system of any one of Examples 13-19, where the first incident claim is a sexual harassment claim or a policy brutality claim or a worker's compensation claim.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A non-transitory computer-readable medium storing a program executable by at least one processor, the program comprising instructions to:
   receive, from user devices that each have a corresponding policyholder of a first plurality of policyholders of a group, public keys for the first plurality of policyholders, the public keys comprising a respective public key for each policyholder of the first plurality of policyholders, each respective public key associated with a respective public-private keypair for a corresponding cryptocurrency addresses of the policyholder;
   establish a premiums cryptocurrency address for the group;
   communicate a notification of an approved incident claim associated with a first claimant of the first plurality of policyholders; and
   communicate group information to a self-executing agreement maintained by a distributed ledger system, the group information comprising the respective public keys for the first plurality of policyholders and a fixed coverage requirement for approved incident claims, wherein communicating the group information to the self-executing agreement configures the self-executing agreement to perform operations in a manner consistent with a group charter, the operations comprising:
   in association with a first term:
      allocating, in cryptocurrency to a first premiums escrow, a respective first premium payment from each of the first plurality of policyholders, each respective first premium payment being a respective first amount according to the fixed coverage requirement and a quantity of the first plurality of policyholders;
      receiving the notification of the approved incident claim associated with the first claimant;
      receiving payment instructions from the first plurality of policyholders, each payment instruction being digitally signed by an associated policyholder and being an authorization to pay an incident claim payment for the approved incident claim using the respective first premium payment of the associated policyholder or being a defection request requesting a refund of the respective first premium payment of the associated policyholder;
      paying, using cryptocurrency from the first premiums escrow and to a cryptocurrency payment address associated with the first claimant, the first claimant a first incident claim payment according to the fixed coverage requirement, the payment instructions, the quantity of the first plurality of policyholders, and a total amount of funds allocated to the first premiums escrow;
      distributing to each non-defecting policyholder a respective rebate payment from the first premiums escrow;
      storing a record of the incident claim in a publicly-available, non-repudiable distributed ledger; and
   in association with a second term after the first term, allocating, in cryptocurrency to a second premiums escrow, a respective second premium payment from each policyholder of the non-defecting policyholders, each respective second premium payment being greater than the respective first premium payment according to at least one payment instruction being a defection request and the fixed coverage requirement.

2. The non-transitory computer-readable medium of claim 1, further comprising instructions to store a correlation between identifies of the first plurality of policyholders and the public keys for the plurality of policyholders.

3. The non-transitory computer-readable medium of claim 1, wherein the group information further comprises:
   a group identifier (ID) of the group;
   a number of group members; and
   a term length.

4. The non-transitory computer-readable medium of claim 1, wherein, for each policyholder of the first plurality of policyholders, a public-private key pair that comprises the public key and the private key is generated by the user device corresponding to the policyholder, the private key not being shared by the user device.

5. The non-transitory computer-readable medium of claim 1, wherein the program further comprises instructions to:
   receive a request to establish the group;
   generate a group identifier (ID) and group information for the group;
   receive a group charter and group pledge; and
   store the group charter and the group pledge.

6. The non-transitory computer-readable medium of claim 1, wherein the program further comprises instructions to:
   receive a request to add a new user to the group;
   facilitate establishing an account for the new user;
   add, in response to determining to add the new user to the group, the new user to the group; and
   communicate updated group information to self-executing agreement to reflect addition of the new user to the group, the updated group information comprising a public key for the new user.

7. The non-transitory computer-readable medium of claim 1, wherein:
   the group comprises a plurality of subgroups, a first subgroup of the plurality of subgroups comprising a second plurality of policyholders, the second plurality of policyholders being policyholders of the group;
   the program further comprises instructions to:

receive subgroup information from at least a portion of the user devices, the subgroup information indicating a subgroup to which the corresponding policyholder of the user device belongs; and the group information comprises respective indications of the respective subgroups to which the policyholders belong.

8. The non-transitory computer-readable medium of claim 7, wherein, at least in part due to the group information comprising the respective indications of the respective subgroups to which the policyholders belong, the operations that the self-executing agreement is configured to perform in a manner consistent with the group charter further comprise in association with the first term, allocating, in cryptocurrency to an overpayment escrow, a respective first overpayment from each of the second plurality of policyholders.

9. The non-transitory computer-readable medium of claim 8, wherein:
the premiums escrow initially has a zero balance; and
the overpayment escrow initially has a zero balance.

10. The non-transitory computer-readable medium of claim 8, wherein the program further comprises instructions to:
provide an interface for establishing the premiums escrow for the group and the overpayment escrow for the group; and
provide an interface for submitting the group information to configure the self-executing agreement in a manner consistent with the group charter.

11. The non-transitory computer-readable medium of claim 1, wherein, to communicate the group information to the self-executing agreement to configure the self-executing agreement to perform operations in a manner consistent with a group charter, the program further includes instructions to digitally sign a transaction request to modify the self-executing agreement according to the group information to configure the self-executing agreement to perform the operations in a manner consistent with the group charter.

12. A computer-implemented method, comprising:
receiving, by a processing system from user devices that each have a corresponding policyholder of a first plurality of policyholders of a group, public keys for the first plurality of policyholders, the public keys comprising a respective public key for each policyholder of the first plurality of policyholders, each respective public key associated with a respective public-private keypair for a corresponding cryptocurrency addresses of the policyholder;
establishing, by the processing system, a premiums cryptocurrency address for the group;
communicating, by the processing system, a notification of an approved incident claim associated with a first claimant of the first plurality of policyholders; and
communicating, by the processing system, group information to a self-executing agreement maintained by a distributed ledger system, the group information comprising the respective public keys for the first plurality of policyholders and a fixed coverage requirement for approved incident claims, wherein communicating the group information to the self-executing agreement configures the self-executing agreement to perform operations in a manner consistent with a group charter, the operations comprising:
in association with a first term:
allocating, in cryptocurrency to a first premiums escrow, a respective first premium payment from each of the first plurality of policyholders, each respective first premium payment being a respective first amount according to the fixed coverage requirement and a quantity of the first plurality of policyholders;
receiving the notification of the approved incident claim associated with the first claimant;
receiving payment instructions from the first plurality of policyholders, each payment instruction being digitally signed by an associated policyholder and being an authorization to pay an incident claim payment for the approved incident claim using the respective first premium payment of the associated policyholder or being a defection request requesting a refund of the respective first premium payment of the associated policyholder;
paying, using cryptocurrency from the first premiums escrow and to a cryptocurrency payment address associated with the first claimant, the first claimant a first incident claim payment according to the fixed coverage requirement, the payment instructions, the quantity of the first plurality of policyholders, and a total amount of funds allocated to the first premiums escrow;
distributing to each non-defecting policyholder a respective rebate payment from the first premiums escrow;
storing a record of the incident claim in a publicly-available, non-repudiable distributed ledger; and
in association with a second term after the first term, allocating, in cryptocurrency to a second premiums escrow, a respective second premium payment from each policyholder of the non-defecting policyholders, each respective second premium payment being greater than the respective first premium payment according to at least one payment instruction being a defection request and the fixed coverage requirement.

13. The computer-implemented method of claim 12, further comprising storing a correlation between identifies of the first plurality of policyholders and the public keys for the plurality of policyholders.

14. The computer-implemented method of claim 12, wherein the group information further comprises:
a group identifier (ID) of the group;
a number of group members; and
a term length.

15. The computer-implemented method of claim 12, wherein, for each policyholder of the first plurality of policyholders, a public-private key pair that comprises the public key and the private key is generated by the user device corresponding to the policyholder, the private key not being shared by the user device.

16. The computer-implemented method of claim 12, further comprising:
receiving a request to establish the group;
generating a group identifier (ID) and group information for the group;
receiving a group charter and group pledge; and
storing the group charter and the group pledge.

17. The computer-implemented method of claim 12, further comprising:
receiving a request to add a new user to the group;
facilitating establishing an account for the new user;
adding, in response to determining to add the new user to the group, the new user to the group; and
communicating updated group information to self-executing agreement to reflect addition of the new user to the group, the updated group information comprising a public key for the new user.

18. The computer-implemented method of claim 12, wherein:
the group comprises a plurality of subgroups, a first subgroup of the plurality of subgroups comprising a second plurality of policyholders, the second plurality of policyholders being policyholders of the group;
the computer-implemented method further comprises receiving subgroup information from at least a portion of the user devices, the subgroup information indicating a subgroup to which the corresponding policyholder of the user device belongs; and
the group information comprises respective indications of the respective subgroups to which the policyholders belong.

19. The computer-implemented method of claim 18, wherein, at least in part due to the group information comprising the respective indications of the respective subgroups to which the policyholders belong, the operations that the self-executing agreement is configured to perform in a manner consistent with the group charter further comprise in association with the first term, allocating, in cryptocurrency to an overpayment escrow, a respective first overpayment from each of the second plurality of policyholders.

20. The computer-implemented method of claim 19, wherein:
the premiums escrow initially has a zero balance; and
the overpayment escrow initially has a zero balance.

21. The computer-implemented method of claim 19, further comprising:
providing an interface for establishing the premiums escrow for the group and the overpayment escrow for the group; and
providing an interface for submitting the group information to configure the self-executing agreement in a manner consistent with the group charter.

22. The computer-implemented method of claim 12, wherein communicating the group information to the self-executing agreement to configure the self-executing agreement to perform operations in a manner consistent with a group charter further comprises digitally signing a transaction request to modify the self-executing agreement according to the group information to configure the self-executing agreement to perform the operations in a manner consistent with the group charter.

23. A system, comprising:
one or more processors; and
one or more non-transitory computer-readable storage media storing programming for execution by the one or more processors, the programming comprising instructions to:
receive, from user devices that each have a corresponding policyholder of a first plurality of policyholders of a group, public keys for the first plurality of policyholders, the public keys comprising a respective public key for each policyholder of the first plurality of policyholders, each respective public key associated with a respective public-private keypair for a corresponding cryptocurrency addresses of the policyholder;
establish a premiums cryptocurrency address for the group;
communicate a notification of an approved incident claim associated with a first claimant of the first plurality of policyholders; and
communicate group information to a self-executing agreement maintained by a distributed ledger system, the group information comprising the respective public keys for the first plurality of policyholders and a fixed coverage requirement for approved incident claims, wherein communicating the group information to the self-executing agreement configures the self-executing agreement to perform operations in a manner consistent with a group charter, the operations comprising:
in association with a first term:
allocating, in cryptocurrency to a first premiums escrow, a respective first premium payment from each of the first plurality of policyholders, each respective first premium payment being a respective first amount according to the fixed coverage requirement and a quantity of the first plurality of policyholders;
receiving the notification of the approved incident claim associated with the first claimant;
receiving payment instructions from the first plurality of policyholders, each payment instruction being digitally signed by an associated policyholder and being an authorization to pay an incident claim payment for the approved incident claim using the respective first premium payment of the associated policyholder or being a defection request requesting a refund of the respective first premium payment of the associated policyholder;
paying, using cryptocurrency from the first premiums escrow and to a cryptocurrency payment address associated with the first claimant, the first claimant a first incident claim payment according to the fixed coverage requirement, the payment instructions, the quantity of the first plurality of policyholders, and a total amount of funds allocated to the first premiums escrow;
distributing to each non-defecting policyholder a respective rebate payment from the first premiums escrow;
storing a record of the incident claim in a publicly-available, non-repudiable distributed ledger; and
in association with a second term after the first term, allocating, in cryptocurrency to a second premiums escrow, a respective second premium payment from each policyholder of the non-defecting policyholders, each respective second premium payment being greater than the respective first premium payment according to at least one payment instruction being a defection request and the fixed coverage requirement.

24. The system of claim 23, wherein the programming further comprises instructions to store a correlation between identifies of the first plurality of policyholders and the public keys for the plurality of policyholders.

25. The system of claim 23, wherein the group information further comprises:
a group identifier (ID) of the group;
a number of group members; and
a term length.

26. The system of claim 23, wherein, for each policyholder of the first plurality of policyholders, a public-private key pair that comprises the public key and the private key is generated by the user device corresponding to the policyholder, the private key not being shared by the user device.

27. The system of claim 23, wherein the programming further comprises instructions to:

receive a request to establish the group;

generate a group identifier (ID) and group information for the group;

receive a group charter and group pledge; and store the group charter and the group pledge.

28. The system of claim 23, wherein the programming further comprises instructions to:

receive a request to add a new user to the group;

facilitate establishing an account for the new user;

add, in response to determining to add the new user to the group, the new user to the group; and communicate updated group information to self-executing agreement to reflect addition of the new user to the group, the updated group information comprising a public key for the new user.

29. The system of claim 23, wherein:

the group comprises a plurality of subgroups, a first subgroup of the plurality of subgroups comprising a second plurality of policyholders, the second plurality of policyholders being policyholders of the group;

the programming further comprises instructions to:

receive subgroup information from at least a portion of the user devices, the subgroup information indicating a subgroup to which the corresponding policyholder of the user device belongs; and the group information comprises respective indications of the respective subgroups to which the policyholders belong.

30. The system of claim 29, wherein, at least in part due to the group information comprising the respective indications of the respective subgroups to which the policyholders belong, the operations that the self-executing agreement is configured to perform in a manner consistent with the group charter further comprise in association with the first term, allocating, in cryptocurrency to an overpayment escrow, a respective first overpayment from each of the second plurality of policyholders.

31. The system of claim 30, wherein:

the premiums escrow initially has a zero balance; and the overpayment escrow initially has a zero balance.

32. The system of claim 30, wherein the programming further comprises instructions to:

provide an interface for establishing the premiums escrow for the group and the overpayment escrow for the group; and provide an interface for submitting the group information to configure the self-executing agreement in a manner consistent with the group charter.

33. The system of claim 23, wherein, to communicate the group information to the self-executing agreement to configure the self-executing agreement to perform operations in a manner consistent with a group charter, the programming further comprises instructions to digitally sign a transaction request to modify the self-executing agreement according to the group information to configure the self-executing agreement to perform the operations in a manner consistent with the group charter.

\* \* \* \* \*

UNITED STATES PATENT AND TRADEMARK OFFICE
CERTIFICATE OF CORRECTION

PATENT NO. : 12,079,879 B2  
APPLICATION NO. : 18/160822  
DATED : September 3, 2024  
INVENTOR(S) : Joshua Paul Davis Page 1 of 1

It is certified that error appears in the above-identified patent and that said Letters Patent is hereby corrected as shown below:

In the Claims

In Column 50, in Claim 2, Line 31, delete "identifies" and insert -- identities --.

In Column 50, in Claim 6, Lines 55-56, delete ", the new user to the group" from the phrase "the new user to the group, the new user to the group".

In Column 52, in Claim 13, Line 39, delete "identifies" and insert -- identities --.

In Column 54, in Claim 24, Line 54, delete "identifies" and insert -- identities --.

Signed and Sealed this  
Twentieth Day of May, 2025

Coke Morgan Stewart  
*Acting Director of the United States Patent and Trademark Office*